(12) United States Patent
Kishida et al.

(10) Patent No.: US 9,020,774 B2
(45) Date of Patent: Apr. 28, 2015

(54) ENCODER SYSTEM, SIGNAL PROCESSING METHOD, AND TRANSMISSION SIGNAL GENERATION AND OUTPUT DEVICE

(75) Inventors: Hiroyuki Kishida, Yachiyo (JP); Toru Morita, Yokohama (JP); Yoshiji Takahashi, Natori (JP); Kou Ohno, Sendai (JP); Takashi Nagase, Iruma (JP); Kenji Omata, Utsunomiya (JP); Hirofumi Takeuchi, Natori (JP)

(73) Assignee: Nikon Corporation, Tokyo (JP)

( * ) Notice: Subject to any disclaimer, the term of this patent is extended or adjusted under 35 U.S.C. 154(b) by 1074 days.

(21) Appl. No.: 13/033,924

(22) Filed: Feb. 24, 2011

(65) Prior Publication Data

US 2011/0202308 A1 Aug. 18, 2011

Related U.S. Application Data

(63) Continuation of application No. PCT/JP2009/004126, filed on Aug. 26, 2009.

(30) Foreign Application Priority Data

Aug. 26, 2008 (JP) .................. 2008-216773
Sep. 11, 2008 (JP) .................. 2008-233793
Oct. 3, 2008 (JP) .................. 2008-258603
Oct. 22, 2008 (JP) .................. 2008-271628
Apr. 6, 2009 (JP) .................. 2009-092036

(51) Int. Cl.
*G01B 7/30* (2006.01)
*G01D 5/244* (2006.01)
(Continued)

(52) U.S. Cl.
CPC ............. *G01B 7/30* (2013.01); *G01D 5/2449* (2013.01); *G01B 21/22* (2013.01); *G01D 5/3473* (2013.01); *G01D 5/58* (2013.01); *G01D 5/56* (2013.01); *G01D 5/145* (2013.01)

(58) Field of Classification Search
CPC ............ G01B 7/30; G01B 21/22; G01D 5/56; G01D 5/58; G01D 5/145; G01D 5/2449; G01D 5/3473
USPC .................. 702/151; 250/231.13; 324/207.25
See application file for complete search history.

(56) References Cited

U.S. PATENT DOCUMENTS 4,572,951 A * 2/1986 Toda et al. ............... 250/231.18
4,740,690 A * 4/1988 Mosier ..................... 250/231.18
(Continued)

FOREIGN PATENT DOCUMENTS

CN 101153807 A 4/2008
EP 1 321 745 A1 6/2003
(Continued)

OTHER PUBLICATIONS

Jun. 3, 2013 Chinese Office Action issued in Chinese Patent Application No. CN 200980133250.X (with translation).
(Continued)

*Primary Examiner* — Mohamed Charioui
*Assistant Examiner* — John Kuan
(74) *Attorney, Agent, or Firm* — Oliff PLC

(57) ABSTRACT

An encoder system includes: a first single-rotation absolute encoder that outputs a first signal corresponding to an angular position of a first rotatable shaft; a power transmission device that transmits the power of the first shaft to a second rotatable shaft with a predetermined transmission ratio; a second single-rotation absolute encoder that outputs a second signal corresponding to an angular position of the second shaft; and a signal processing section that generates data related to the rotation count of the first shaft based on at least the first signal and the second signal.

13 Claims, 27 Drawing Sheets

(51) Int. Cl.
*G01B 21/22* (2006.01)
*G01D 5/347* (2006.01)
*G01D 5/58* (2006.01)
*G01D 5/56* (2006.01)
*G01D 5/14* (2006.01)

(56) References Cited

U.S. PATENT DOCUMENTS

| | | | |
|---|---|---|---|
| 5,350,955 A | | 9/1994 | Street |
| 5,786,781 A | * | 7/1998 | Taniguchi et al. ............ 341/111 |
| 6,304,825 B1 | * | 10/2001 | Nowak et al. .................... 702/94 |
| 7,375,487 B2 | * | 5/2008 | Miyashita et al. ............ 318/602 |
| 7,471,080 B2 | | 12/2008 | Sasaki et al. |
| 2003/0177649 A1 | | 9/2003 | Ito et al. |
| 2004/0222764 A1 | * | 11/2004 | Miura et al. .................. 318/638 |
| 2006/0033643 A1 | * | 2/2006 | Okamuro et al. ............... 341/14 |
| 2006/0192517 A1 | | 8/2006 | Miyashita et al. |
| 2008/0030381 A1 | * | 2/2008 | Taylor et al. .................... 341/50 |
| 2008/0051961 A1 | | 2/2008 | Ebashi et al. |
| 2008/0079624 A1 | | 4/2008 | Taniguchi et al. |
| 2008/0157705 A1 | | 7/2008 | Sasaki et al. |
| 2008/0189934 A1 | * | 8/2008 | Henshaw ..................... 29/602.1 |

FOREIGN PATENT DOCUMENTS

| | | | |
|---|---|---|---|
| EP | 1 906 154 A1 | | 4/2008 |
| JP | A-60-133131 | | 7/1985 |
| JP | A-64-12222 | | 1/1989 |
| JP | A-01-297512 | | 11/1989 |
| JP | A-2-231523 | | 9/1990 |
| JP | A-4-25388 | | 1/1992 |
| JP | A-7-139968 | | 6/1995 |
| JP | A-07-242355 | | 9/1995 |
| JP | A-07-509566 | | 10/1995 |
| JP | A-09-105644 | | 4/1997 |
| JP | A-9-311725 | | 12/1997 |
| JP | A-11-132792 | | 5/1999 |
| JP | A-2000-105133 | | 4/2000 |
| JP | A-2001-057710 | | 2/2001 |
| JP | A-2002-98522 | | 4/2002 |
| JP | A-2002-116057 | | 4/2002 |
| JP | A-2004-163133 | | 6/2004 |
| JP | A-2005-037285 | | 2/2005 |
| JP | A-2006-271189 | | 10/2006 |
| JP | 2007010608 A | * | 1/2007 |
| JP | A-2007-120970 | | 5/2007 |
| JP | A-2007-255942 | | 10/2007 |
| JP | 2008039737 A | * | 2/2008 |
| JP | A-2008-51668 | | 3/2008 |
| JP | 2008-183716 A | | 8/2008 |
| JP | A-2008-180698 | | 8/2008 |

OTHER PUBLICATIONS

Oct. 8, 2013 Office Action issued in Japanese Application No. 2010-526542 (with translation).
International Search Report issued in International Application No. PCT/JP2009/004126 on Dec. 15, 2009 (with translation).
Written Opinion of the International Searching Authority Report issued in International Application No. PCT/JP2009/004126 on Dec. 15, 2009 (with translation).
Dec. 3, 2013 Office Action issued in Japanese Patent Application No. 2012-264752 (with translation).
Chon Yun et al. "Research on the Encoding Method of Single Ring Absolute Code Disk", ACTA Pllotonica Sinica, vol. 35, No. 3 Mar. 2006, pp. 460-463. (with Abstract).
Mar. 25, 2014 Office Action issued in Japanese Patent Application No. 2012-264752 (with translation).
Apr. 25, 2014 Office Action issued in Chinese Patent Application No. 200980133250.X (with translation).
May 14, 2014 Office Action issued in Taiwanese Patent Application No. 098128602 (with translation).
Jul. 15, 2014 Office Action issued in Japanese Patent Application No. 2013-254572 (with translation).
Jul. 29, 2014 Office Action issued in Japanese Patent Application No. 2013-254573 (with translation).
Jul. 29, 2014 Office Action issued in Japanese Patent Application No. 2013-254574 (with translation).
Feb. 24, 2015 Office Action issued in Japanese Application No. 2013-254574.

* cited by examiner

FIG. 9

| m | 10 | 11 | 12 |
|---|----|----|----|

| P1 | 0 | 131071 | 0 | 131071 | 0 | 131071 |
|---|---|---|---|---|---|---|

SHIFT AMOUNT

FIG. 10

| P1 (POSITION OF MOTOR SHAFT) | m AS CALCULATED | CORRECTION VALUE Δm |
|---|---|---|
| 0~32767 | ANTERIOR HALF | 0 |
| | POSTERIOR HALF | +1 |
| 32768~98303 | — | 0 |
| 98304~131071 | ANTERIOR HALF | −1 |
| | POSTERIOR HALF | 0 |

INITIAL POSITION OUTPUT METHOD

FIG. 20

| P1 (POSITION OF MOTOR SHAFT) | MULTIPLE -ROTATION SIGNAL | | CORRECTION VALUE |
|---|---|---|---|
| | A | B | |
| 0~32767 | H | L | 0 |
| | L | L | +1 |
| 32768~98303 | — | — | 0 |
| 98304~131071 | H | L | −1 |
| | L | L | 0 |

FIG. 22

| P1 (POSITION OF MOTOR SHAFT) | MULTIPLE -ROTATION SIGNAL ||  MULTIPLE -ROTATION CORRECTION VALUE | CORRECTED MOTOR POSITION WITHIN ONE ROTATION |
|---|---|---|---|---|
| | A | B | | |
| 0~32767 | H | L | 0 | 131071~98305 |
| | L | L | +1 | |
| 32768~98303 | – | – | 0 | 98304~32769 |
| 98304~131071 | H | L | –1 | 32768~0 |
| | L | L | 0 | |

FIG. 23

| MULTIPLE -ROTATION A SIGNAL | MULTIPLE -ROTATION B SIGNAL | ROTATION DIRECTION |
|---|---|---|
| ↑ | L | INCREASE |
| H | ↑ | INCREASE |
| ↓ | H | INCREASE |
| L | ↓ | INCREASE |
| ↑ | H | DECREASE |
| L | ↑ | DECREASE |
| ↓ | L | DECREASE |
| H | ↓ | DECREASE |

ENCODER SYSTEM, SIGNAL PROCESSING METHOD, AND TRANSMISSION SIGNAL GENERATION AND OUTPUT DEVICE

This is a Continuation Application of International Application No. PCT/JP2009/004126, filed Aug. 26, 2009, which claims priority to Japanese Patent Application Nos. 2008-216773 filed on Aug. 26, 2008, 2008-233793 filed on Sep. 11, 2008, 2008-258603 filed on Oct. 3, 2008, 2008-271628 filed on Oct. 22, 2008, and 2009-092036 filed on Apr. 6, 2009, the contents of which are hereby incorporated by reference in their entirety.

BACKGROUND

1. Field of the Invention

The present invention relates to an encoder system as a control system which includes an actuator such as an AC servo motor, for example, used in industrial robots, a position sensor such as an encoder for detecting the positional displacement of the actuator, and a controller.

2. Description of Related Art

Conventionally, in an encoder system, an encoder was generally disposed on an input shaft side of a motor, and it was necessary to use a multiple-rotation absolute encoder having an external battery in order to obtain multiple-rotation information (namely, multiple-rotation data) which represents the number of rotations of a shaft of the motor. As an example of such conventional art, Japanese Patent Application, Publication No. H04-025388 A is known.

Moreover, as an example of an encoder system (encoder device) of the conventional art, there is known an encoder system in which a planetary reduction gear, for example, is disposed on an output shaft of a servo motor having an encoder mounted thereon, and a servo driver controls the servo motor based on a rotation command signal. There is also known a technique in which, when the planetary reduction gear has a transmission angle error, a rotation angle error of the planetary reduction gear and the input rotation command signal are corrected using an input synchronization correction circuit (for example, see Japanese Patent Application, Publication No. H09-311725 A).

SUMMARY

As described above, in the conventional art, when a robot is not operated, and a main power supply (+5 V) is OFF, in order to keep track of an absolute position, an encoder system using the multiple-rotation absolute encoder needed to have an external battery for storing the absolute position information. Moreover, it was necessary to supply a very small current constantly to the encoder from the external battery.

The external battery has to be replaced for every predetermined period mainly as a part of periodic maintenance, which is a great limitation during the maintenance.

That is, in the maintenance of such an encoder system, it is generally necessary to set a predetermined period in advance with a sufficient margin with respect to the MTBF (Mean Time Between Failure) of a consumable component and perform replacement of the external battery, for example, as so-called "periodic maintenance."

A purpose of aspects of the present invention is to provide an encoder system and a signal processing method capable of obtaining multiple-rotation information without using an external battery.

According to an aspect of the present invention, there is provided an encoder system including: a motor that rotates an input shaft; a first absolute position encoder that is a single-rotation absolute encoder and that outputs a first detection signal corresponding to a positional displacement in the rotation of the input shaft; a power transmission device that rotates an output shaft at a predetermined transmission ratio in response to the rotation of the input shaft; a second absolute position encoder that is a single-rotation absolute encoder and that outputs a second detection signal corresponding to a positional displacement in the rotation of the output shaft; and a signal processing circuit that processes the first and second detection signals corresponding to the positional displacements detected by the first and second absolute position encoders, wherein the signal processing circuit includes: a first position data detection circuit that detects first position data representing the positional displacement in the rotation of the input shaft through first predetermined signal processing based on the first detection signal input from the first absolute position encoder; a second position data detection circuit that detects second position data representing the positional displacement in the rotation of the output shaft through second predetermined signal processing based on the second detection signal input from the second absolute position encoder; a position data combination circuit that combines the first position data detected by the first position data detection circuit and the second position data detected by the second position data detection circuit to generate combined position data representing the number of rotations of the input shaft and the positional displacement within one rotation of the input shaft; and a position data comparing and collating circuit that compares and collates the first position data detected by the first position data detection circuit and the second position data detected by the second position data detection circuit.

According to another aspect of the present invention, there is provided a signal processing method used in an encoder system which includes: a motor that rotates an input shaft; a first absolute position encoder that is a single-rotation absolute encoder and that outputs a first detection signal corresponding to a positional displacement in the rotation of the input shaft; a power transmission device that rotates an output shaft at a predetermined transmission ratio in response to the rotation of the input shaft; a second absolute position encoder that is a single-rotation absolute encoder and that outputs a second detection signal corresponding to a positional displacement in the rotation of the output shaft; and a signal processing circuit that processes the first and second detection signals corresponding to the positional displacements detected by the first and second absolute position encoders, wherein the signal processing circuit performing processing including: a first position data detection step of detecting first position data representing the positional displacement in the rotation of the input shaft through first predetermined signal processing based on the first detection signal input from the first absolute position encoder; a second position data detection step of detecting second position data representing the positional displacement in the rotation of the output shaft through second predetermined signal processing based on the second detection signal input from the second absolute position encoder; a position data combination step of combining the first position data detected in the first position data detection step and the second position data detected in the second position data detection step to generate combined position data representing the number of rotations of the input shaft and a positional displacement within one rotation of the input shaft; and a position data comparing and collating step of comparing and collating the first position data detected in the first position data detection step and the second position data detected in the second position data detection step.

According to a further aspect of the present invention, there is provided an encoder system including: a motor that rotates an input shaft; a first absolute position encoder that is a single-rotation absolute encoder and that outputs a first detection signal corresponding to an angular position of the input shaft; a power transmission device that rotates an output shaft at a predetermined transmission ratio in response to the rotation of the input shaft; a second absolute position encoder that is a single-rotation absolute encoder and that outputs a second detection signal corresponding to an angular position of the output shaft; a first position data detection circuit that detects first position data representing the angular position of the input shaft through first predetermined signal processing based on the first detection signal input from the first absolute position encoder; a second position data detection circuit that detects second position data representing the angular position of the output shaft through second predetermined signal processing based on the second detection signal input from the second absolute position encoder; a transmission signal generation and output section that generates and outputs a transmission signal corresponding to the rotation of the input shaft based on the second position data detected by the second position data detection circuit; and a position data combination circuit that measures a rotation count of the input shaft based on the transmission signal input from the transmission signal generation and output section and combines the measured rotation count and the first position data detected by the first position data detection circuit to generate combined position data representing the rotation count of the input shaft and the angular position of the input shaft.

According to a still further aspect of the present invention, there is provided a signal processing method used in an encoder system which includes: a motor that rotates an input shaft; a first absolute position encoder that is a single-rotation absolute encoder and that outputs a first detection signal corresponding to an angular position of the input shaft; a power transmission device that rotates an output shaft at a predetermined transmission ratio in response to the rotation of the input shaft; and a second absolute position encoder that is a single-rotation absolute encoder and that outputs a second detection signal corresponding to an angular position of the output shaft, the method including the steps of: detecting first position data representing the angular position of the input shaft through first predetermined signal processing based on the first detection signal input from the first absolute position encoder; detecting second position data representing the angular position of the input shaft through second predetermined signal processing based on the second detection signal input from the second absolute position encoder; generating and outputting a transmission signal corresponding to the rotation of the input shaft based on the second position data detected by the second position data detection circuit; and measuring a rotation count of the input shaft based on the input transmission signal and combining the measured rotation count and the first position data detected by the first position data detection circuit to generate combined position data representing the rotation count of the input shaft and the angular position of the input shaft.

According to a still further aspect of the present invention, there is provided a transmission signal generation and output device used in an encoder system which includes: a motor that rotates an input shaft; a first absolute position encoder that is a single-rotation absolute encoder and that outputs a first detection signal corresponding to an angular position of the input shaft; a power transmission device that rotates an output shaft at a predetermined transmission ratio in response to the rotation of the input shaft; a second absolute position encoder that is a single-rotation absolute encoder and that outputs a second detection signal corresponding to an angular position of the output shaft, in which the encoder system combines the first position data detected by the first position data detection circuit and a transmission signal input thereto to generate combined position data representing the rotation count of the input shaft and the angular position of the input shaft, wherein the transmission signal generation and output device generates and outputs a transmission signal corresponding to the rotation of the input shaft based on the second position data detected by the second position data detection circuit.

According to a still further aspect of the present invention, there is provided an encoder system including: a motor that rotates an input shaft; a first absolute position encoder that is a single-rotation absolute encoder and that outputs a first detection signal corresponding to an angular position of the input shaft; a power transmission device that rotates an output shaft at a predetermined transmission ratio in response to the rotation of the input shaft; a second absolute position encoder that is a single-rotation absolute encoder and that outputs a second detection signal corresponding to an angular position of the output shaft; a first position data detection circuit that detects first position data representing the angular position of the input shaft through first predetermined signal processing based on the first detection signal input from the first absolute position encoder; a second position data detection circuit that detects second position data representing the angular position of the input shaft through second predetermined signal processing based on the second detection signal input from the second absolute position encoder; a position data combination circuit that combines the first position data detected by the first position data detection circuit and the second position data detected by the second position data detection circuit to generate combined position data representing a multiple-rotation count of the input shaft and the angular position within one rotation of the input shaft; and a rotation direction detection section that detects whether a rotation direction of the input shaft detected based on the displacement of the first position data and a rotation direction of the output shaft detected based on the displacement of the second position data are the same directions or reverse directions.

According to a still further aspect of the present invention, there is provided a signal processing method used in an encoder system which includes: a motor that rotates an input shaft; a first absolute position encoder that is a single-rotation absolute encoder and that outputs a first detection signal corresponding to an angular position of the input shaft; a power transmission device that rotates an output shaft at a predetermined transmission ratio in response to the rotation of the input shaft; and a second absolute position encoder that is a single-rotation absolute encoder and that outputs a second detection signal corresponding to an angular position of the output shaft, the method including: a first position data detection step of detecting first position data representing the angular position of the input shaft through first predetermined signal processing based on the first detection signal input from the first absolute position encoder; a second position data detection step of detecting second position data representing the angular position of the input shaft through second predetermined signal processing based on the second detection signal input from the second absolute position encoder; a position data combination step of combining the first position data detected in the first position data detection step and the second position data detected in the second position data detection step to generate combined position data representing a multiple-rotation count of the input shaft and the angular position within one rotation of the input shaft; and a rotation direction detection step of detecting whether a rotation direction of the input shaft detected based on the displacement of the first position data and a rotation direction of the output shaft detected based on the displacement of the second position data are the same directions or reverse directions.

According to a still further aspect of the present invention, there is provided an encoder system including: a motor that rotates an input shaft; a controller that controls the rotation of the motor using a rotation control signal; a first absolute position encoder that is a single-rotation absolute encoder and that outputs a first detection signal corresponding to an angular position of the input shaft; a power transmission device that rotates an output shaft at a predetermined transmission ratio in response to the rotation of the input shaft; a second absolute position encoder that is a single-rotation absolute encoder and that outputs a second detection signal corresponding to an angular position of the output shaft; a first position data detection circuit that detects first position data representing the angular position of the input shaft through first predetermined signal processing based on the first detection signal input from the first absolute position encoder; a second position data detection circuit that detects second position data representing the angular position of the input shaft through second predetermined signal processing based on the second detection signal input from the second absolute position encoder; a position data combination circuit that combines the first position data detected by the first position data detection circuit and the second position data detected by the second position data detection circuit to generate combined position data representing a multiple-rotation count of the input shaft and the angular position within one rotation of the input shaft; and a failure detection section that compares an input shaft angular position which is the angular position of the input shaft calculated based on the rotation control signal from the controller and the first position data detected by the first position data detection circuit and compares an output shaft angular position which is the angular position of the output shaft calculated based on the rotation control signal from the controller and the second position data detected by the second position data detection circuit to detect a failure in accordance with a combination of the comparison results.

According to a still further aspect of the present invention, there is provided a signal processing method used in an encoder system which includes: a motor that rotates an input shaft; a controller that controls the rotation of the motor using a rotation control signal; a first absolute position encoder that is a single-rotation absolute encoder and that outputs a first detection signal corresponding to an angular position of the input shaft; a power transmission device that rotates an output shaft at a predetermined transmission ratio in response to the rotation of the input shaft; a second absolute position encoder that is a single-rotation absolute encoder and that outputs a second detection signal corresponding to an angular position of the output shaft; a first position data detection circuit that detects first position data representing the angular position of the input shaft through first predetermined signal processing based on the first detection signal input from the first absolute position encoder; a second position data detection circuit that detects second position data representing the angular position of the input shaft through second predetermined signal processing based on the second detection signal input from the second absolute position encoder; and a signal processing section that processes the rotation control signal from the controller, the first position data detected by the first position data detection circuit, and the second position data detected by the second position data detection circuit, wherein the signal processing circuit performing processing including: a position data combination step of combining the first position data detected in the first position data detection step and the second position data detected in the second position data detection step to generate combined position data representing a multiple-rotation count of the input shaft and the angular position within one rotation of the input shaft; and a failure detection step of comparing an input shaft angular position which is the angular position of the input shaft calculated based on the rotation control signal from the controller and the first position data detected by the first position data detection circuit and comparing an output shaft angular position which is the angular position of the output shaft calculated based on the rotation control signal from the controller and the second position data detected by the second position data detection circuit to detect a failure in accordance with a combination of the comparison results.

According to a still further aspect of the present invention, there is provided an encoder system including: a first absolute position encoder that is a single-rotation absolute encoder and that outputs a first detection signal corresponding to an angular position of a rotating input shaft; a second absolute position encoder that is a single-rotation absolute encoder and that outputs a second detection signal corresponding to an angular position of an output shaft rotating at a predetermined transmission ratio in response to the rotation of the input shaft; a first position data detection circuit that detects first position data representing the angular position of the input shaft through first predetermined signal processing based on the first detection signal input from the first absolute position encoder; a second position data detection circuit that detects second position data representing the angular position of the input shaft through second predetermined signal processing based on the second detection signal input from the second absolute position encoder; a position data combination circuit that combines the first position data and the second position data to generate combined position data representing a multiple-rotation count of the input shaft and the angular position within one rotation of the input shaft; an error correction value storage section in which an error correction value for correcting the combined position data is stored in advance, the error correction value being a value which is obtained by driving an entire power transmission device that rotates the output shaft in advance in a state where the entire power transmission device is incorporated into the encoder system; and an error correction circuit that corrects the combined position data to be generated by the position data combination circuit based on the error correction value read out from the error correction value storage section.

According to a still further aspect of the present invention, there is provided a signal processing method used in an encoder system which includes: a first absolute position encoder that is a single-rotation absolute encoder and that outputs a first detection signal corresponding to an angular position of a rotating input shaft; a second absolute position encoder that is a single-rotation absolute encoder and that outputs a second detection signal corresponding to an angular position of an output shaft rotating at a predetermined transmission ratio in response to the rotation of the input shaft; a first position data detection circuit that detects first position data representing the angular position of the input shaft through first predetermined signal processing based on the first detection signal input from the first absolute position encoder; and a second position data detection circuit that detects second position data representing the angular position of the input shaft through second predetermined signal processing based on the second detection signal input from the second absolute position encoder, in which: a position data combination circuit combines the first position data and the second position data to generate combined position data representing a multiple-rotation count of the input shaft and the angular position within one rotation of the input shaft; and an error correction circuit corrects the combined position data to be generated by the position data combination circuit based on an error correction value read out from an error correction value storage section in which the error correction value for correcting the combined position data is stored in advance, the error correction value being a value which is obtained by driving an entire power transmission device that rotates the output shaft in advance in a state where the entire power transmission device is incorporated into the encoder system.

According to a still further aspect of the present invention, there is provided an encoder system including: a first single-rotation absolute encoder that outputs a first signal corresponding to an angular position of a first rotatable shaft; a power transmission device that transmits the power of the first shaft to a second rotatable shaft with a predetermined transmission ratio; a second single-rotation absolute encoder that outputs a second signal corresponding to an angular position of the second shaft; and a signal processing section that generates data related to the rotation count of the first shaft based on at least the first signal and the second signal.

According to the some aspects of the present invention, it is possible to provide an encoder system and a signal processing method capable of obtaining multiple-rotation information without using an external battery.

BRIEF DESCRIPTION OF THE DRAWINGS

FIG. 7 is a waveform diagram showing the waveform of an exemplary biphasic pseudo-sinusoidal wave and the like.

FIG. 9 is a schematic diagram showing a shift between the rotation count of an input shaft and the position data of the input shaft calculated based on the position data of an output shaft.

FIG. 10 is a table showing a rotation count correction method by a second position data correction circuit when there is a shift.

FIG. 20 is a table showing the correction method in the case of FIG. 19.

FIG. 22 is a table showing the correction method in the case of FIG. 19.

FIG. 23 is a table illustrating a method of detecting a rotation direction from a biphasic signal.

DESCRIPTION OF EMBODIMENTS

Figure 1:
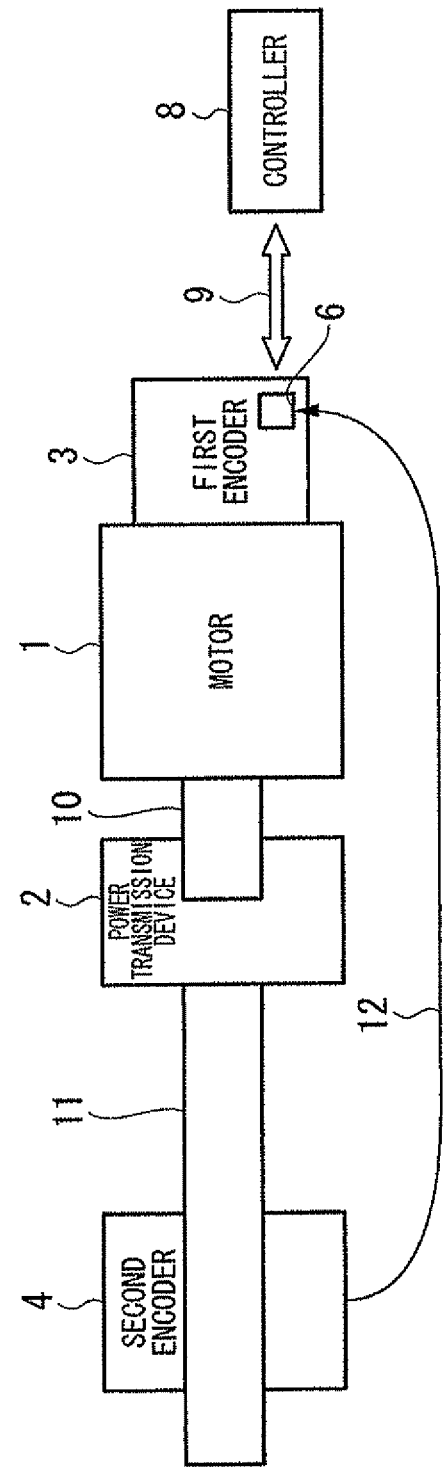
FIG. 1 is a block diagram showing a configuration of an encoder system according to an embodiment of the present invention.

Hereinafter, embodiments of the present invention will be described with reference to the drawings. FIG. 1 is a schematic block diagram showing a configuration of an encoder system according to an embodiment of the present invention.

In the present embodiment, an encoder system includes a motor 1, a power transmission device 2, a first encoder (first absolute position encoder) 3, a second encoder (second absolute position encoder) 4, an input shaft (first shaft) 10, and an output shaft (second shaft) 11. Moreover, the encoder system includes a controller 8 which is a high-order device and a communication line 9 which is a communication line between the controller 8 and the first encoder 3. In addition, the first encoder 3 and the second encoder 4 are connected at least through a communication line 12.

The motor 1 rotates the input shaft 10 in accordance with a rotation control signal input from the controller 8. The power transmission device 2 rotates the output shaft 11 by reducing the rotation speed of the output shaft 11 at a predetermined transmission ratio (power transmission ratio) in response to the rotation of the input shaft 10. The power of the input shaft 10 is transmitted to the output shaft 11 at a predetermined transmission ratio through the power transmission device 2.

That is, in this encoder system, the motor 1 rotates to the input shaft 10, and in response to the rotation of the input shaft 10, the output shaft 11 is rotated by the power transmission device 2. The power transmission device 2 includes, for example, one or plural gears, belt devices, chain devices, and drive shaft devices or a combination of these gears and devices.

The first encoder 3 is a single-rotation absolute encoder and outputs a first detection signal corresponding to a positional displacement (an angular position of the input shaft 10) in the rotation of the input shaft 10. The encoder converts a mechanical displacement amount in the rotation direction into a digital amount.

That is, the first encoder 3 is a single-rotation absolute encoder which has a function of detecting the angular position of the input shaft 10 of the motor 1 and is capable of detecting the position in terms of the mechanical angle 360°. The single-rotation absolute encoder is an encoder which is not capable of detecting so-called "multiple-rotation data/multiple-rotation information" representing "how many times a shaft has rotated" as rotation information.

The second encoder 4 is a single-rotation absolute encoder similarly to the first encoder 3 and outputs a second detection signal corresponding to the positional displacement (the angular position of the output shaft 11) in the rotation of the output shaft 11.

The first encoder 3 and the second encoder 4 include, for example, a rotating disc which has N and S poles and which rotates in response to the rotation of a corresponding shaft among the input shaft 10 and the output shaft 11 and two Hall-effect elements as magnetic sensor devices which are disposed at predetermined positions so that the mutual angle is at 90° with respect to the rotation center axis of the rotating disc.

When the input shaft 10 or the output shaft 11 rotates, the rotating disc corresponding to the rotating shaft rotates as a rotary magnet having the N and S poles, whereby a sinusoidal signal of which one pulse period corresponds to one rotation is output from the Hall-effect elements. Since the Hall-effect elements are disposed so as to have a mutual angle of 90°, a sinusoidal wave having a phase difference of 90°, namely a so-called biphasic pseudo-sinusoidal wave is output as the sinusoidal signal.

In this way, the first encoder 3 outputs a biphasic sinusoidal signal, which is made up of two sinusoidal signals of which one cycle corresponds to one rotation of the input shaft 10 and of which the phases are different by an amount of a predetermined phase, for example, as the first detection signal. Moreover, similarly to the first encoder 3, the second encoder 4 outputs a biphasic sinusoidal signal, which is made up of two sinusoidal signals of which one cycle corresponds to one rotation of the output shaft 11 and of which the phases are different by an amount of a predetermined phase, for example, as the second detection signal.

Here, for example, it is assumed that the first encoder 3 outputs N signals for one rotation, the second encoder 4 outputs M signals for one rotation, and the power transmission device 2 connects the input shaft 10 and the output shaft 11 at a ratio of 1:N. In this case, since the second encoder 4 rotates by one digit whenever the first encoder 3 makes one rotation, it is possible to detect the rotation count of the input shaft 10 and to detect the positional displacement (angular position) in the rotation of the input shaft 10. Therefore, this encoder system is capable of detecting N×M rotational positions, namely the absolute position in the rotation of the input shaft 10 until the output shaft 11 makes M rotations.

That is, this encoder system functions as a multiple-rotation absolute encoder as the whole encoder system using the first encoder 3 which is a single-rotation absolute encoder and the second encoder 4 which is a single-rotation absolute encoder. Therefore, this encoder system does not require an external battery for storing the absolute position information which was required in the encoder system of the conventional art.

In the present embodiment, the first encoder 3 has a signal processing circuit 6 therein. The signal processing circuit 6 receives the second detection signal detected by the second encoder 4 through the communication line 12. Then, the signal processing circuit 6 detects combined position data representing the number of rotations of the input shaft 10 and the positional displacement (angular position) within one rotation of the input shaft 10 based on the first detection signal detected by the first encoder 3 and the second detection signal detected by the second encoder 4. Moreover, the signal processing circuit 6 detects a failure or the like based on the first detection signal and the second detection signal and uses the detection result as error status information. Then, the signal processing circuit 6 outputs the detected combined position data and the error status information to the controller 8 through the communication line 9.

In this way, the controller 8 is able to detect the number of rotations of the input shaft and the positional displacement (angular position) within one rotation of the input shaft 10 based on the combined position data from the encoder system serving as the multiple-rotation absolute encoder. Moreover, the controller 8 is able to detect a failure of the encoder system, for example, caused by abnormalities in the rotation mechanism of the motor 1, abnormalities in the power transmission device 2, and abnormalities in a rotating disc 301 and a rotating disc 401, described later, which are included in the first encoder 3 or the second encoder 4 based on the error status information.

Figure 2:
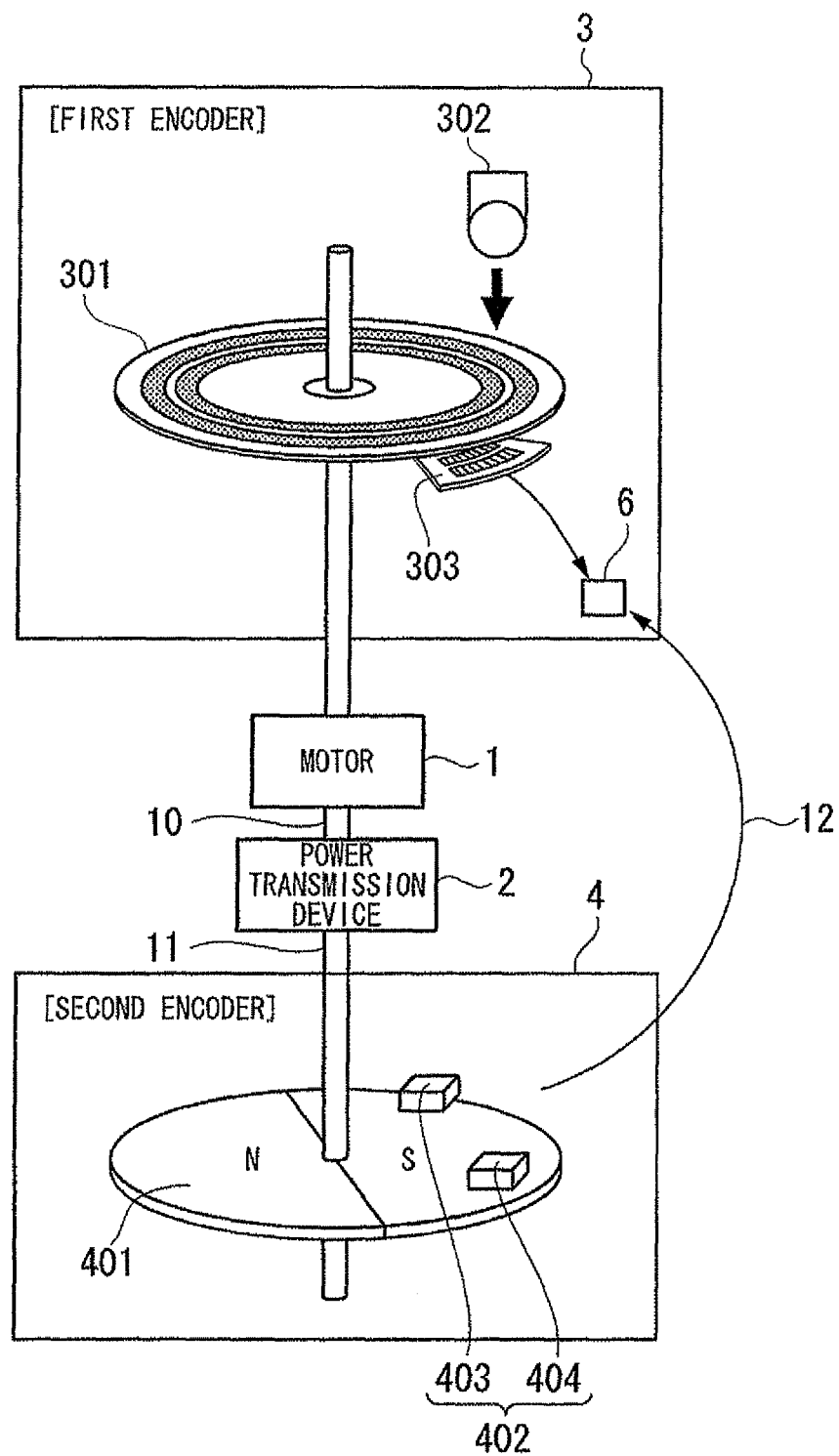
FIG. 2 is a block diagram showing a configuration of an encoder in the encoder system shown in FIG. 1.

Next, the configuration of the encoder system described using FIG. 1 will be described in detail using FIGS. 2 and 3. In the drawings, the same constituent elements as those in FIG. 1 will be denoted by the same reference numerals, and description thereof will be omitted. First, the configuration of the first and second encoders 3 and 4 will be described using FIG. 2.

<Configuration of First Encoder 3>

The first encoder 3 is a single-rotation absolute encoder which has a function of detecting the positional displacement (angular position) in the rotation of the input shaft of the motor 1 and is capable of detecting the position of a marker rotating with the rotation of the input shaft in terms of the mechanical angle 360°. The first encoder 3 is, for example, a single-rotation absolute encoder and is an optical encoder.

A specific example of the configuration of the first encoder 3 will be described. In the first encoder 3, the rotating disc 301 has a configuration in which an absolute pattern and an incremental pattern determined by a predetermined M-series code are formed on a disc rotating with the rotation of the input shaft 10. Light emitted from a light-emitting element 302 passes through the respective patterns on the rotating disc 301 and enters a light-receiving sensor 303. Then, the light-receiving sensor 303 outputs two signals including a signal detected from the absolute pattern and a signal detected from the incremental pattern to the signal processing circuit 6 as the first detection signal.

One of the two signals output from the light-receiving sensor 303, specifically the signal detected from the absolute position is input to the signal processing circuit 6 (specifically, an absolute position detection circuit 611 described later) as an absolute position detection signal (or an M-series signal).

Moreover, the other of the two signals output from the light-receiving sensor 303, specifically the signal detected from the incremental pattern is input to the signal processing circuit 6 (specifically a first interpolation circuit 612) as a first incremental signal (or a biphasic pseudo-sinusoidal wave).

<Configuration of Second Encoder 4>

The second encoder 4 has a function of detecting a displacement position, namely position information in the rotation of the output shaft 11 connected through the power transmission device 2 from the input shaft 10 of the motor 1. The second encoder outputs a pseudo-sinusoidal wave which has a phase difference of 90° and which causes a displacement of 1λ (≈phase angle: 360°) for one magnetic rotation. The second encoder 4 is, for example, a single-rotation absolute encoder and is a magnetic encoder. Therefore, the second encoder 4 has a simpler configuration and is cheaper than the first encoder 3.

A specific example of the configuration of the second encoder 4 will be described. The second encoder 4 has a rotating disc 401 in which the disc surface is divided into N and S regions, namely a rotating disc 401 having a magnetic pole configuration of N and S poles. The rotating disc 401 rotates with the rotation of the output shaft 11.

A magnetic sensor device 402 is disposed on the rotating disc 401. The magnetic sensor device 402 includes two magnetic sensors 403 and 404 disposed on the circumference on which the rotating disc 401 rotates. The two magnetic sensors 403 and 404 are, for example, Hall-effect elements which are positioned at predetermined positions so that the mutual angle is at 90° with respect to the rotation center axis of the rotating disc 401.

The magnetic sensor device 402 outputs a sinusoidal signal of which one pulse period corresponds to one rotation in response to when the rotating disc 401 having the N and S poles makes one rotation as a rotary magnet. Since the magnetic sensor device 402 has the magnetic sensors 403 and 404 having a mutual angle of 90°, a biphasic pseudo-sinusoidal wave (for example, biphasic signals of A-phase and B-phase signals) having a phase difference of 90° is output from the magnetic sensor device 402 by the respective magnetic sensors.

Moreover, the biphasic pseudo-sinusoidal wave output by the magnetic sensor device 402 is input to the signal processing circuit 6 (specifically, a second interpolation circuit 621 described later) as the second detection signal, namely the second incremental signal.

<Configuration of Signal Processing Circuit 6>

Next, the configuration of the signal processing circuit 6 will be described using FIG. 3. The signal processing circuit 6 includes a first position data detection circuit 61, a second position data detection circuit 62, a position data combination circuit 63, a position data comparing and collating circuit 64, an external communication circuit 65, a transmission ratio information storage section (transmission ratio information storage section) 66, a first resolution storage section 67, and a second resolution storage section 68.

In the transmission ratio information storage section 66, information representing the value of a predetermined transmission ratio (for example, a gear ratio) of the power transmission device 2 connecting the first encoder 3 and the second encoder 4 is stored in advance as transmission ratio information (for example, gear ratio information). In the first resolution storage section 67, the resolution of the first position data detection circuit 61 is stored in advance as a first resolution. In the second resolution storage section 68, the resolution of the second position data detection circuit 62 is stored in advance as a second resolution.

The first position data detection circuit 61 detects first position data representing the positional displacement (angular position) in the rotation of the input shaft 10 through first predetermined signal processing based on the first detection signal input from the light-receiving sensor 303.

The second position data detection circuit 62 detects second position data representing the positional displacement (angular position) in the rotation of the output shaft 11 through second predetermined signal processing based on the second detection signal input from the magnetic sensor device 402.

The position data combination circuit 63 combines the first position data detected by the first position data detection circuit 61 and the second position data detected by the second position data detection circuit 62 to generate combined position data representing the number of rotations of the input shaft 10 and the positional displacement (angular position) within one rotation of the input shaft 10. When combining the first position data detected by the first position data detection circuit 61 and the second position data detected by the second position data detection circuit 62, the position data combination circuit 63 combines the combined position data based on the transmission ratio information read out from the transmission ratio information storage section 66. Then, the position data combination circuit 63 outputs the generated combined position data to the controller 8 through the communication line 9 using the external communication circuit 65.

Specifically, when combining the first position data detected by the first position data detection circuit 61 and the second position data detected by the second position data detection circuit 62, the position data combination circuit 63 combines the combined position data by a predetermined calculation method based on the transmission ratio information read out from the transmission ratio information storage section 66, the first resolution read out from the first resolution storage section 67 and the second resolution read out from the second resolution storage section 68.

The position data comparing and collating circuit 64 compares and collates the first position data detected by the first position data detection circuit 61 and the second position data detected by the second position data detection circuit 62. When comparing and collating the first position data detected by the first position data detection circuit 61 and the second position data detected by the second position data detection circuit 62, the position data comparing and collating circuit 64 performs the comparison and collation based on the transmission ratio information read out from the transmission ratio information storage section 66. Then, the position data comparing and collating circuit 64 outputs the result of comparison and collation to the controller 8 through the communication line 9 using the external communication circuit 65 as the error status information.

The position data comparing and collating circuit 64 compares and collates the first position data detected by the first position data detection circuit 61 and the second position data detected by the second position data detection circuit 62 through the following processing.

First, the position data comparing and collating circuit 64 calculates position data corresponding to the first position data to be detected by the first position data detection circuit 61 as an estimate based on the second position data detected by the second position data detection circuit 62 and the transmission ratio information read out from the transmission ratio information storage section 66. Specifically, the position data comparing and collating circuit 64 calculates the estimate based on the second position data detected by the second position data detection circuit 62, the transmission ratio information read out from the transmission ratio information storage section 66, the first resolution read out from the first resolution storage section 67, and the second resolution read out from the second resolution storage section 68.

Subsequently, the position data comparing and collating circuit 64 calculates a difference between the calculated estimate and the first position data detected by the first position data detection circuit 61 as an error estimate.

Then, the position data comparing and collating circuit 64 compares and collates the first position data detected by the first position data detection circuit 61 and the second position data detected by the second position data detection circuit 62 by determining whether or not the calculated error estimate is within a predetermined range of values. Specifically, the position data comparing and collating circuit 64 compares and collates the first position data detected by the first position data detection circuit 61 and the second position data detected by the second position data detection circuit 62 by determining whether or not the calculated error estimate is within a predetermined range of values which are predetermined ratios determined for the first resolution read out from the first resolution storage section 67.

Here, when making determination as to the calculated error estimate, the position data comparing and collating circuit 64 uses a ratio of 1/4 or smaller, for example, as the predetermined ratio determined for the first resolution read out from the first resolution storage section 67. This is to detect whether or not there is a shift of 1/4 cycle or more when the estimate, namely the estimated value of the first position data detected by the first position data detection circuit 61 based on the second position data detected by the second position data detection circuit 62 is compared with the first position data actually detected by the first position data detection circuit 61. The ratio of 1/4 used for comparing with the absolute value of the calculated error estimate corresponds to a 1/4 cycle. The value of the ratio may be set, for example, to 1/8 so as to further decrease an allowable amount of the shift.

The external communication circuit 65 executes processing for communication with the controller 8 through the communication line 9. Moreover, the external communication circuit 65 stores the transmission ratio information received from the controller 8 through the communication line 9 in the transmission ratio information storage section 66. Furthermore, the external communication circuit 65 stores the first resolution received from the controller 8 through the communication line 9 in the first resolution storage section 67. In addition, the external communication circuit 65 stores the second resolution received from the controller 8 through the communication line 9 in the second resolution storage section 68.

<Configuration of First and Second Position Data Detection Circuits 61 and 62>

The first position data detection circuit 61 includes an absolute position detection circuit 611, a first interpolation circuit 612, a position detection circuit 613, and a conversion table storage section 614. The second position data detection circuit 62 includes a second interpolation circuit 621.

In the conversion table storage section 614, an absolute position detection signal (M-series signal) and absolute position data which has a predetermined resolution and which is information representing the absolute position within one rotation of the input shaft are stored in advance in a correlated manner. The absolute position data is information representing the absolute position in the rotation of the input shaft 10.

The absolute position detection circuit 611 detects the absolute position data by converting (decoding) the absolute position detection signal input from the light-receiving sensor 303 with the aid of the conversion table storage section 614. That is, the absolute position detection circuit 611 converts the absolute position detection signal into absolute position data by reading out absolute position data corresponding to the absolute position detection signal input from the light-receiving sensor 303 from the conversion table storage section 614, thus detecting the absolute position data.

The first interpolation circuit 612 interpolates the first incremental signal input from the light-receiving sensor 303. That is, the first interpolation circuit 612 electrically segments the first incremental signal which is the biphasic pseudo-sinusoidal wave input from the light-receiving sensor 303.

The position detection circuit 613 detects the first position data based on the absolute position data output by the absolute position detection circuit 611 and the first incremental signal interpolated by the first interpolation circuit 612. Specifically, the position detection circuit 613 calculates the first position data which is absolute position data having a higher resolution than the absolute position data detected by the absolute position detection circuit 611 by combining the absolute position data detected by the absolute position detection circuit 611 and the incremental signal segmented by the first interpolation circuit 612 while ensuring consistency.

The second interpolation circuit 621 interpolates the second incremental signal input from the magnetic sensor device 402 of the second encoder device to detect the second position data. The second interpolation circuit 621 generates the second position data which is absolute position information at a resolution close to or equal to the positional resolution detected by the first encoder 3 through predetermined interpolation processing based on the second incremental signal which is the biphasic pseudo-sinusoidal wave input from the magnetic sensor device 402.

The number of segments produced by the second interpolation circuit 621 is set to be a multiple of the transmission ratio of the power transmission device 2 that connects the first encoder 3 and the second encoder 4 (this multiple number is referred to as Np; where the multiple number Np is 2 or more). In addition, in order to realize a resolution that is close to or equal to the positional resolution of the first encoder 3, it is necessary to increase the value of the multiple number Np which is the factor of the second interpolation circuit 621 to increase the resolution.

Moreover, the transmission ratio information which is information on the value of the transmission ratio of the power transmission device 2 can be set from the outside (for example, through the communication line 9 and the external communication circuit 65), and the set transmission ratio information is set and stored in the transmission ratio information storage section 66 included in the signal processing circuit 6. The transmission ratio information storage section 66 is a nonvolatile memory, for example. Therefore, once the transmission ratio information is set, it will not be erased even when the encoder system is powered off. According to this configuration, it is possible to broaden the choices for the power transmission device 2 and the transmission ratio of the power transmission device 2 usable in the encoder system.

As described above, the second interpolation circuit 621 performs interpolation by a predetermined method based on the transmission ratio information read out from the transmission ratio information storage section 66 and the second incremental signal which is the biphasic pseudo-sinusoidal wave input from the magnetic sensor device 402 and generates the second position data which is absolute position information at a resolution close to or equal to the positional resolution detected by the first encoder 3.

The position data combination circuit 63 detects the number of rotations of the input shaft of the motor 1, namely multiple-rotation information of the first encoder 3 from the second position data obtained from the second encoder 4 and the transmission ratio information. This is because the quotient (integer part) when the second position data is divided by the factor Np of the second interpolation circuit 621 corresponds to the multiple-rotation information of the first encoder 3.

The position data combination circuit 63 enables the multiple-rotation information of the first encoder to be known from the position information of the second encoder without an external battery which was necessary mainly for storing the multiple-rotation information of the multiple-rotation absolute encoder of the conventional art.

That is, in the encoder system according to the present embodiment, the position data combination circuit 63 combines the absolute position information within one rotation obtained by the first encoder 3 and the multiple-rotation information obtained from the second encoder 4 while ensuring consistency whereby the encoder system can operate as a multiple-rotation absolute encoder which does not require a battery device.

In general, an external operation environment of a robot system using an AC servo motor to which encoders are often applied is very poor, and in many cases, the robot system operates under an environment with many electrical disturbances such as high temperature and high humidity. In particular, as a problem concerning electronic circuits, there is a possibility of malfunction due to electric/magnetic field disturbances (commonly referred to as "noise"). Moreover, once the encoder system malfunctions, the production line must be stopped for a long period, and malfunction due to noise may cause extremely extensive damages.

In the present embodiment, two systems of position data which are the first position data and the second data are constantly compared by the position data comparing and collating circuit 64, and if there is a failure in any of the two systems, the result of comparison and collation outputs a mismatch. Thus, it is possible to detect a problem in the encoder system.

Therefore, this encoder system can enhance the reliability of the position information output from the first encoder 3 or the second encoder 4 by the action of the position data comparing and collating circuit 64. Specifically, this encoder system is capable of detecting abnormalities in the rotation mechanism of the motor 1, abnormalities in the power transmission device 2, and abnormalities of the rotating disc 301 or the rotating disc 401 which is included in the first encoder 3 or the second encoder 4. In addition, this encoder system is also capable of detecting the idle running of the rotating disc 301 or the rotating disc 401 as "abnormalities," which is difficult to detect in the encoder system of the conventional art.

Figure 4:
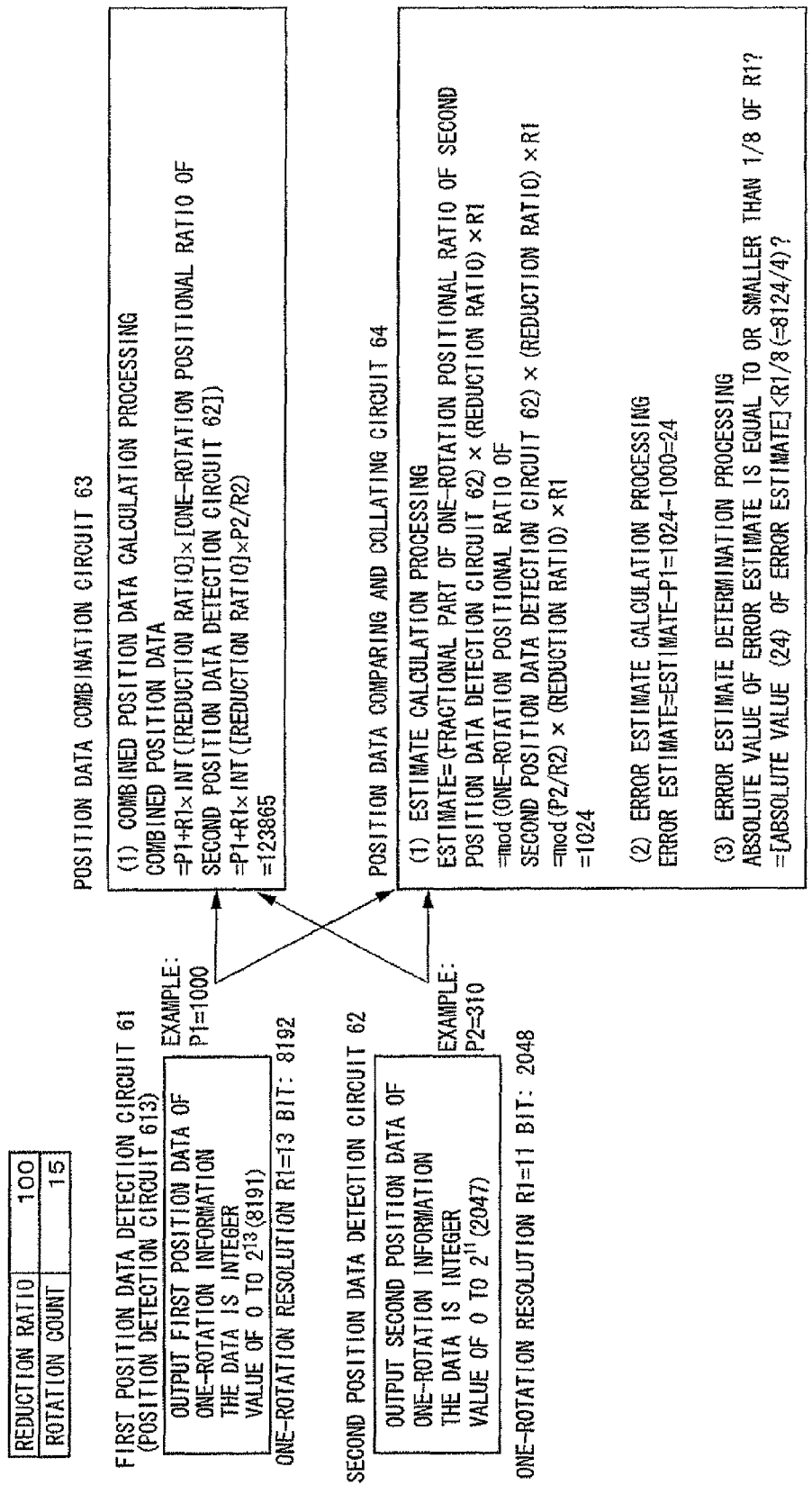
FIG. 4 is a diagram illustrating the operation of an exemplary position data combination circuit and an exemplary position data comparing and collating circuit.

Next, processing executed by the position data combination circuit 63 and the position data comparing and collating circuit 64 will be described in detail using FIG. 4. In this description, it is assumed that the resolution of the first position data detection circuit 61, namely the resolution of the position detection circuit 613 is 13 bit, and the resolution of the second position data detection circuit 62 is 11 bit. That is, the first position data detection circuit 61 outputs the first position data which is an integer value within the range of 0 to 8191 ($=2^{13}-1$). Moreover, the second position data detection circuit 62 outputs the second position data which is an integer value within the range of 0 to 2047 ($=2^{11}-1$). Moreover, it is assumed that the transmission ratio of the power transmission device 2 is 100, and the transmission ratio information having a value of 100 is stored in advance in the transmission ratio information storage section 66.

Here, a case in which the first position data detection circuit 61 outputs 1000 as the value of the first position data, and the second position data detection circuit 62 outputs 310 as the value of the second position data will be described as an example. Moreover, it is assumed that the rotation count of the input shaft 10 is 15.

First, the position data combination circuit 63 will be described. The position data combination circuit 63 calculates the combined position data using Equation 1 below.

$$\text{Combined Position Data} = P1 + INT(n \times P2/R2) \quad \text{(Equation 1)}$$

Here, P1 is the first position data, P2 is the second position data, and n is a transmission ratio. Moreover, R2 is the resolution of the second position data detection circuit 62. Moreover, INT is an operator that truncates the fractional part and extracts only the integer part.

The position data combination circuit 63 calculates a value obtained by adding the value of the first position data (P1) to the value of the integer part (INT) of a value obtained by multiplying a positional ratio (P2/R2) within one rotation of the second position data detection circuit 62 with the transmission ratio (n) as the combined position data using Equation 1.

In this case, since the value of the first position data P1 is 1000, the value of the second position data P2 is 310, the value of the transmission ratio n is 100, and the value of the resolution R2 of the second position data detection circuit 62 is 2048, the position data combination circuit 63 calculates 123865 as the value of the combined position data using Equation 1.

Next, the position data comparing and collating circuit 64 will be described. First, the position data comparing and collating circuit 64 calculates the estimate using Equation 2 below.

$$\text{Estimate} = \text{mod}(P2/R2) \times n \times R1 \quad \text{(Equation 2)}$$

Here, R1 is the resolution of the first position data detection circuit 61. Moreover, mod is an operator that truncates the integer part and extracts only the fractional part. In Equation 2, the same symbols as used in Equation 1 represent the same physical quantities as those of Equation 1.

The position data comparing and collating circuit 64 calculates a value obtained by multiplying the value of the fractional part of the positional ratio (P2/R2) within one rotation of the second position data detection circuit 62 with the transmission ratio (n) and the resolution R1 of the first position data detection circuit 61 as the estimate using Equation 2.

In this case, since the value of the second position data P2 is 310, the value of the resolution R2 of the second position data detection circuit 62 is 2048, the value of the transmission ratio n is 100, and the value of the resolution R1 of the first position data detection circuit 61 is 8192, the position data comparing and collating circuit 64 calculates 1024 as the value of the estimate using Equation 2.

Subsequently, the position data comparing and collating circuit 64 calculates an error estimate using Equation 3 below.

$$\text{Error Estimate} = \text{Estimate} - P1 \qquad \text{(Equation 3)}.$$

Here, the estimate in Equation 3 is the estimate calculated by Equation 2. The position data comparing and collating circuit 64 calculates a difference between the calculated estimate and the first position data P1 as the error estimate using Equation 3. In this case, since the value of the estimate is 1024, and the value of the first position data P1 is 1000, the position data comparing and collating circuit 64 calculates 24 as the value of the error estimate using Equation 3.

Subsequently, the position data comparing and collating circuit 64 determines whether or not the absolute value of the error estimate calculated by Equation 3 is equal to or smaller than, for example, 1/8 of the resolution R1 of the first position data detection circuit 61. In this case, since the value of the calculated error estimate is 24, the value of the resolution R1 of the first position data detection circuit 61 is 8192, and the absolute value of the calculated error estimate is equal to or smaller than 1/8 of the resolution R1 of the first position data detection circuit 61, the position data comparing and collating circuit 64 outputs normal as the determination result. If the absolute value of the calculated error estimate is not equal to or smaller than 1/8 of the resolution R1 of the first position data detection circuit 61, the position data comparing and collating circuit 64 outputs abnormal as the determination result.

As described above, in the encoder system of the present embodiment, it is assumed that the first encoder 3 which is an encoder of the input shaft 10 is a so-called "single-rotation absolute encoder," and is particularly an optical encoder among many other types of encoders.

In addition, the encoder system uses the power transmission device 2 having a predetermined transmission ratio and has the second encoder 4 on the output shaft 11.

Here, the key point is that the second encoder 4 is a so-called magnetic encoder, and the second encoder 4 is a single-rotation absolute encoder similarly to the first encoder 3.

The feature of the present invention is that since both the first encoder 3 and the second encoder 4 are single-rotation absolute encoders, they do not require an external battery. Next, detailed description of how "multiple-rotation information" is obtained using these configurations will be provided.

Here, it is assumed that the transmission ratio of the power transmission device 2 is 100. First, it should be noted that when the input shaft 10 makes 100 rotations, the second encoder 4 rotates exactly by 360°, namely makes one rotation. If the second encoder 4 is a single-rotation absolute encoder which segments one rotation of the output shaft 11 into 100 segmented areas through interpolation and read the segmented areas, by combining the data of both the first encoder 3 and the second encoder 4 together, the encoder system can be configured as a multiple-rotation absolute encoder capable of storing 100 rotations of the multiple-rotation information of the input shaft 10.

By this principle, it is possible to realize an encoder system which has multiple-rotation information and which does not require an external battery.

Moreover, as described by way of an embodiment, the first encoder 3 includes an interpolation circuit (for example, the second interpolation circuit 621 of the signal processing circuit 6) and performs so-called "segmented reading." That is, the pseudo-sinusoidal wave having a phase difference of 90° is led from the second encoder 4 into the first encoder 3 on the input shaft 10 side, and the interpolation circuit included in the first encoder 3 converts this signal into more finely segmented position signals (namely, calculates the detailed position).

<Action>

Here, the signal obtained by the interpolation circuit can be treated as substantially the same position information data as that of the first encoder 3 depending on the resolution setting. That is, this encoder system can be said to have a configuration in which there are two first encoders 3. By comparing and collating these two systems of data, when there is a failure in any of the two systems regardless of which one of the first and second encoders 3 and 4 is the actual source of the failure, it is possible to detect the failure using the comparing means.

This is what is called a dual or redundant detector system. That is, by making the detector system redundant, the reliability of the encoder system can be improved.

Although the detector system is dual, one encoder is an optical encoder, and the other encoder is a magnetic encoder. The second encoder 4 which is a magnetic encoder is cheaper than an optical encoder. Therefore, although the detector system is dual, the overall cost of the encoder system is cheaper than that when two optical encoders are mounted.

From a different perspective, the present invention has a ground for the ability to configure it advantageously for high robustness. That is its superior robustness to disturbances. Specifically, electromagnetic noise generally called electrical noise and disturbances can be roughly classified into one caused by an electric field and one caused by a magnetic field. For example, a magnetic encoder is vulnerable to a magnetic field disturbances, whereas the main cause of malfunction of an optical encoder is an electric field as in general electronic circuits.

Although as for field disturbances, all sources of disturbances should be taken into consideration, since the first encoder 3 described above is an optical encoder, it will not be affected even when it is exposed to magnetic noise. On the other hand, since the second encoder 4 is a magnetic encoder, it is a robust encoder which will not be affected by electric field disturbances.

That is, it is possible to obtain a remarkable advantage in that the first encoder 3 and the second encoder 4 complement respective robust features, thus constructing a robust encoder system.

In the description above, although the first encoder 3 has been described to have the signal processing circuit 6 therein, the present invention is not limited to this. For example, the signal processing circuit 6 may be provided in the second encoder 4, the power transmission device 2, or the like. Moreover, the signal processing circuit 6 may be configured as an independent device, and the encoder system may have the signal processing circuit 6.

In the description above, although the output shaft 11 has been described to be rotated by the input shaft 10 with its rotation speed reduced at the predetermined transmission ratio by the power transmission device 2, the power transmission device 2 is not limited to one gear. For example, a power transmission device that rotates the input shaft 10 by reducing the rotation speed of the output shaft 11 at a predetermined transmission ratio may be configured by one or plural gears, belt devices, chain devices, and drive shaft devices or a combination of these gears and devices, and this power transmission device may be used as the power transmission device 2. In this case, information representing the value of the transmission ratio of the power transmission device is stored in the transmission ratio information storage section (transmission ratio information storage section) 66 as the transmission ratio information.

It is assumed that the transmission ratio information storage section 66 or the conversion table storage section 614 is configured by a nonvolatile memory such as a hard disk device, an optomagnetic disk device, or a flash memory, a volatile memory such as a read-only storage medium (for example, CD-ROM), or RAM (Random Access Memory), or a combination thereof.

Figure 3:
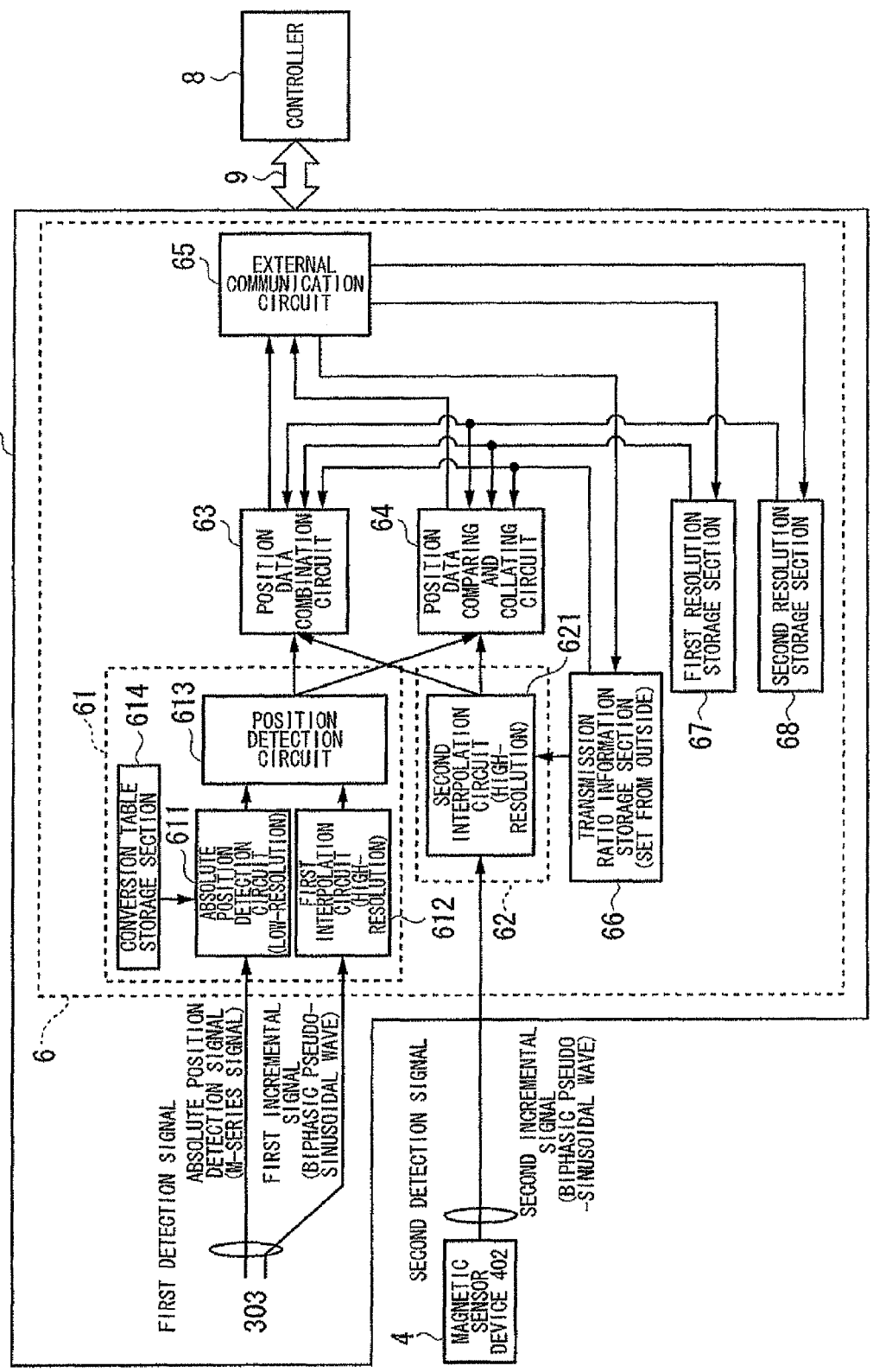
FIG. 3 is a block diagram showing a configuration of a signal processing circuit in the encoder system shown in FIG. 1.

The signal processing circuit 6 and the respective constituent circuits of the signal processing circuit 6 shown in FIG. 3 may be realized by special-purpose hardware and may be realized by memories and microprocessors.

Moreover, the signal processing circuit 6 and the respective constituent circuits of the signal processing circuit 6 may be realized by special-purpose hardware. Furthermore, the signal processing circuit 6 and the respective constituent circuits of the signal processing circuit 6 may be configured by memories and CPUs (Central Processing Unit), and programs for realizing the functions of the signal processing circuit 6 and the respective constituent circuits of the signal processing circuit 6 may be loaded into the memories and executed, whereby the functions are realized.

According to the present embodiment, it is possible to provide an encoder system and a signal processing method thereof, which does not require an external battery for storing absolute position information and which extends the intervals of periodic maintenance to reduce a workload for maintenance service.

Moreover, according to the present embodiment, it is possible to provide a robust encoder system and a signal processing method thereof, which is not greatly influenced under an environment with many disturbances and which is capable of preventing malfunctions that may stop an entire production line.

Furthermore, according to the present embodiment, it is possible to provide an encoder system and a signal processing method thereof, which is a multiple-rotation absolute encoder, which does not require an external battery for storing absolute position information, and which is capable of improving the functional stability of the entire system.

In the present embodiment, the signal processing circuit of the encoder system having the power transmission device that rotates the output shaft at a predetermined transmission ratio in response to the rotation of the input shaft is configured to: detect the first position data representing the positional displacement in the rotation of the input shaft based on the first detection signal input from the first absolute position encoder; detect the second position data representing the positional displacement in the rotation of the output shaft based on the second detection signal input from the second absolute position encoder; combine the first position data and the second position data to generate the combined position data representing the number of rotations of the input shaft and the positional displacement within one rotation of the input shaft; and compare and collate the first position data and the second position data. Therefore, it is possible to provide an encoder system and a signal processing method thereof, which is a multiple-rotation absolute encoder, which does not require an external battery for storing absolute position information, and which is capable of improving the functional stability of the entire system.

Next, another embodiment will be described. The same constituent elements as the above-described embodiment will be denoted by the same reference numerals, and description thereof will be omitted or simplified.

Figure 5:
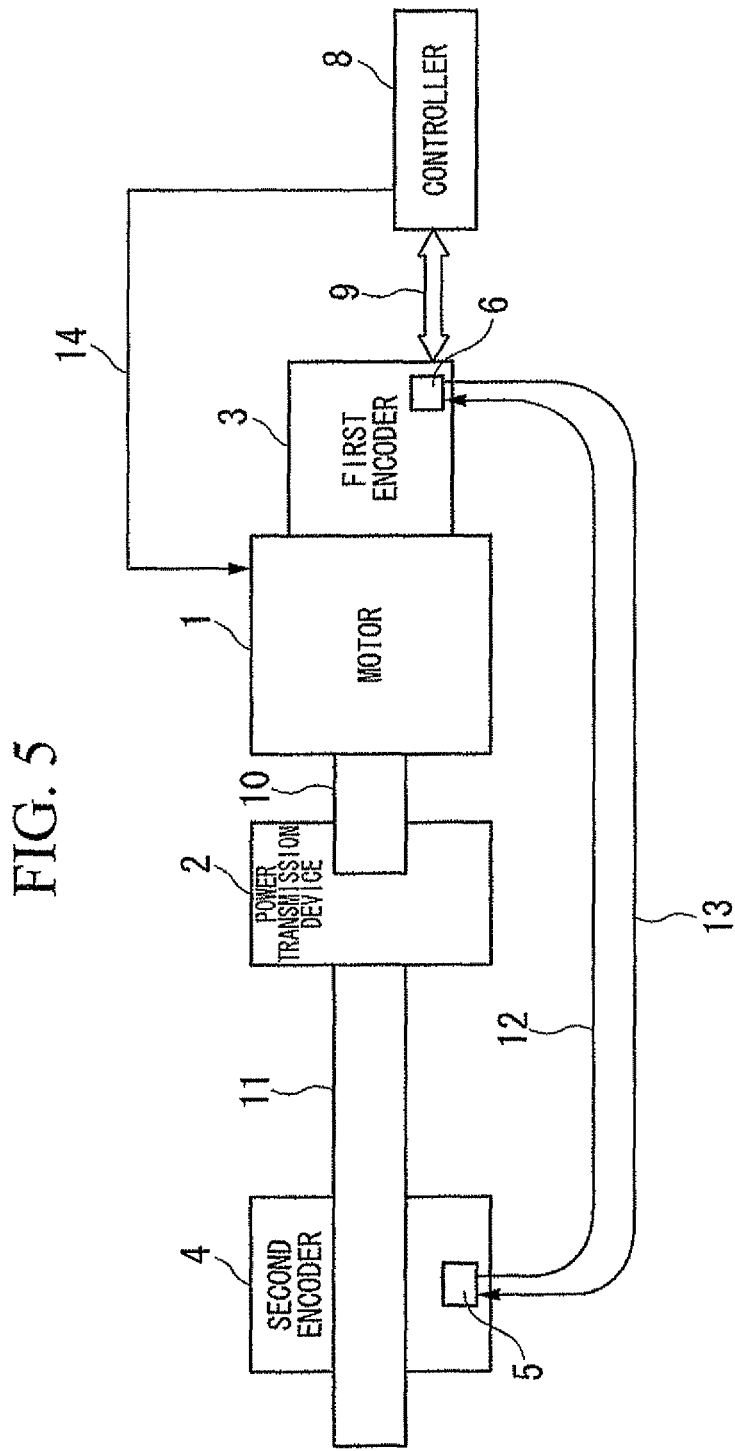
FIG. 5 is a block diagram showing a configuration of an encoder system according to another embodiment.

In the present embodiment, as shown in FIG. 5, an encoder system includes a motor 1, a power transmission device 2, a first encoder (first absolute position encoder) 3, a second encoder (second absolute position encoder) 4, an input shaft 10, an output shaft 11, and a communication line 12 for transmitting a signal representing the multiple-rotation count of the input shaft 10 from the second encoder to the first encoder 3. Moreover, the encoder system includes a controller 8 which is a high-order device, a communication line 9 which is a communication line between the controller 8 and the first encoder 3, and a motor control line 14 for connecting the controller 8 and the motor 1.

Figure 7:
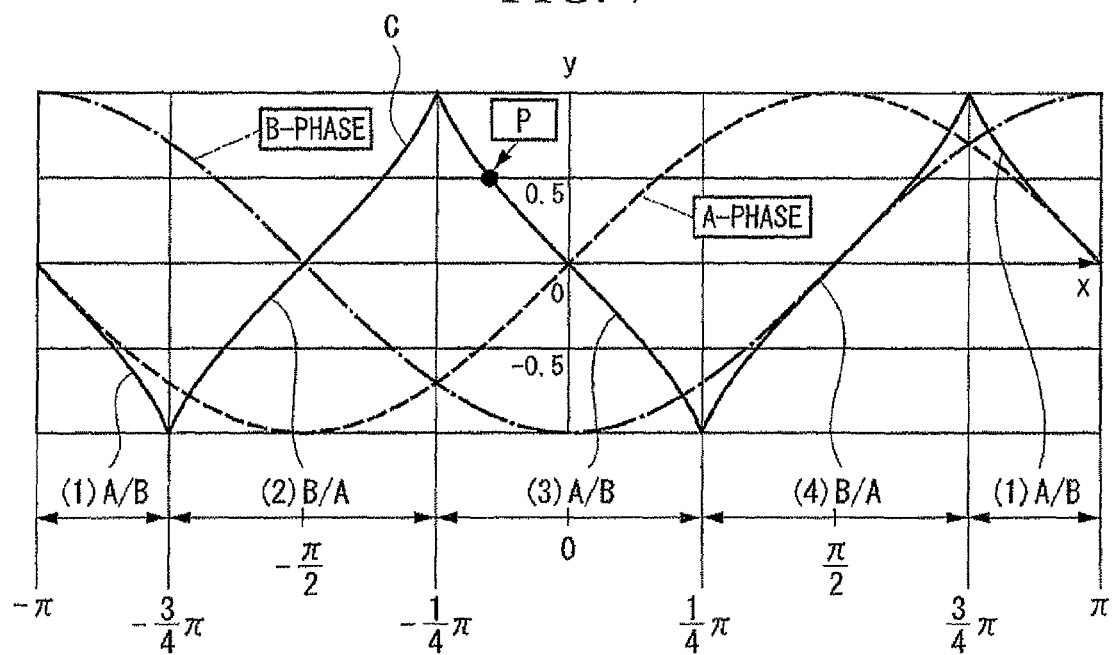

The first encoder 3 and the second encoder 4 include, for example, a rotating disc which has N and S poles and which rotates in response to the rotation of a corresponding shaft among the input shaft 10 and the output shaft 11 and two Hall-effect elements as magnetic sensor devices which are disposed at predetermined positions so that the mutual angle is at 90° with respect to the rotation center axis of the rotating disc. When the input shaft 10 or the output shaft 11 rotates, the rotating disc corresponding to the rotating shaft rotates as a rotary magnet having the N and S poles, whereby a sinusoidal signal of which one cycle (one pulse period) corresponds to one rotation is output from the Hall-effect elements. Since the Hall-effect elements are disposed so as to have a mutual angle of 90°, a sinusoidal wave having a phase difference of 90°, namely a so-called biphasic pseudo-sinusoidal wave (for example, biphasic signals of A-phase and B-phase signals) is output as the sinusoidal signal. The A-phase signal and the B-phase signal are shown in FIG. 7 as an example of the biphasic pseudo-sinusoidal wave. FIG. 7 will be described later.

For example, it is assumed that the resolution in one rotation of the second encoder 4 is M, and the power transmission device 2 connects the input shaft 10 and the output shaft 11 at a ratio of 1:N. In this case, the second encoder 4 rotates by one digit whenever the first encoder 3 makes one rotation. Therefore, it is possible to detect the rotation count in the multiple rotations of the input shaft 10 based on the angular position of the second encoder 4 and to detect the positional displacement in the rotation of the input shaft 10 based on the angular position of the first encoder 3. Moreover, this encoder system is capable of detecting N×M rotational positions, namely the absolute position in the rotation of the input shaft 10 until the output shaft 11 makes one rotation.

In the present embodiment, the encoder system also functions as a multiple-rotation absolute encoder as the whole encoder system using the first encoder 3 which is a single-rotation absolute encoder and the second encoder 4 which is a single-rotation absolute encoder. Therefore, this encoder system does not require an external battery for storing the absolute position information which was required in the encoder system of the conventional art.

In the present embodiment, the encoder system includes a first signal processing circuit 6 and a second signal processing circuit 5 (second position data detection circuit 250 described later). For example, the first encoder 3 has the first signal processing circuit 6 therein. Moreover, the second encoder 4 has the second signal processing circuit 5 therein.

The second signal processing circuit 5 receives the second detection signal detected by the second encoder 4. Moreover, the second signal processing circuit 5 detects second position data representing the positional displacement in the rotation of the output shaft 11 through predetermined signal processing (second signal processing) based on the second detection signal input from the second encoder 4. That is, the second signal processing circuit 5 interpolates the second detection signal to detect the second position data.

Moreover, the second signal processing circuit 5 outputs the detected second position data to the first encoder 3 through the communication line 12. When detecting the second position data, the second signal processing circuit 5 detects the second position data at a predetermined resolution that is, for example, at least twice of the transmission ratio of the power transmission device 2 as will be described later.

Moreover, the first encoder 3 has the first signal processing circuit 6 therein. The first signal processing circuit 6 receives the second position data detected by the second encoder 4 through the communication line 12. Moreover, the first signal processing circuit 6 interpolates the first detection signal detected by the first encoder 3 to detect first position data representing the angular position of the input shaft 10.

Moreover, the first signal processing circuit 6 detects combined position data representing the rotation count of the input shaft 10 and the positional displacement within one rotation of the input shaft 10 based on the detected first position data and the input second position data. Then, the first signal processing circuit 6 outputs the detected combined position data to the controller 8 through the communication line 9.

In this way, the controller 8 is able to detect the rotation count of the input shaft and the positional displacement within one rotation of the input shaft 10 based on the combined position data from the encoder system serving as the multiple-rotation absolute encoder. Moreover, the controller 8 controls the rotation of the motor 1 through the motor control line 14 based on the input combined position data.

The first signal processing circuit 6 and the second signal processing circuit 5 are connected by a setting control line 13. The first signal processing circuit 6 changes the setting values stored in a storage section, described later, included in the second signal processing circuit 5 through the setting control line 13.

Figure 6:
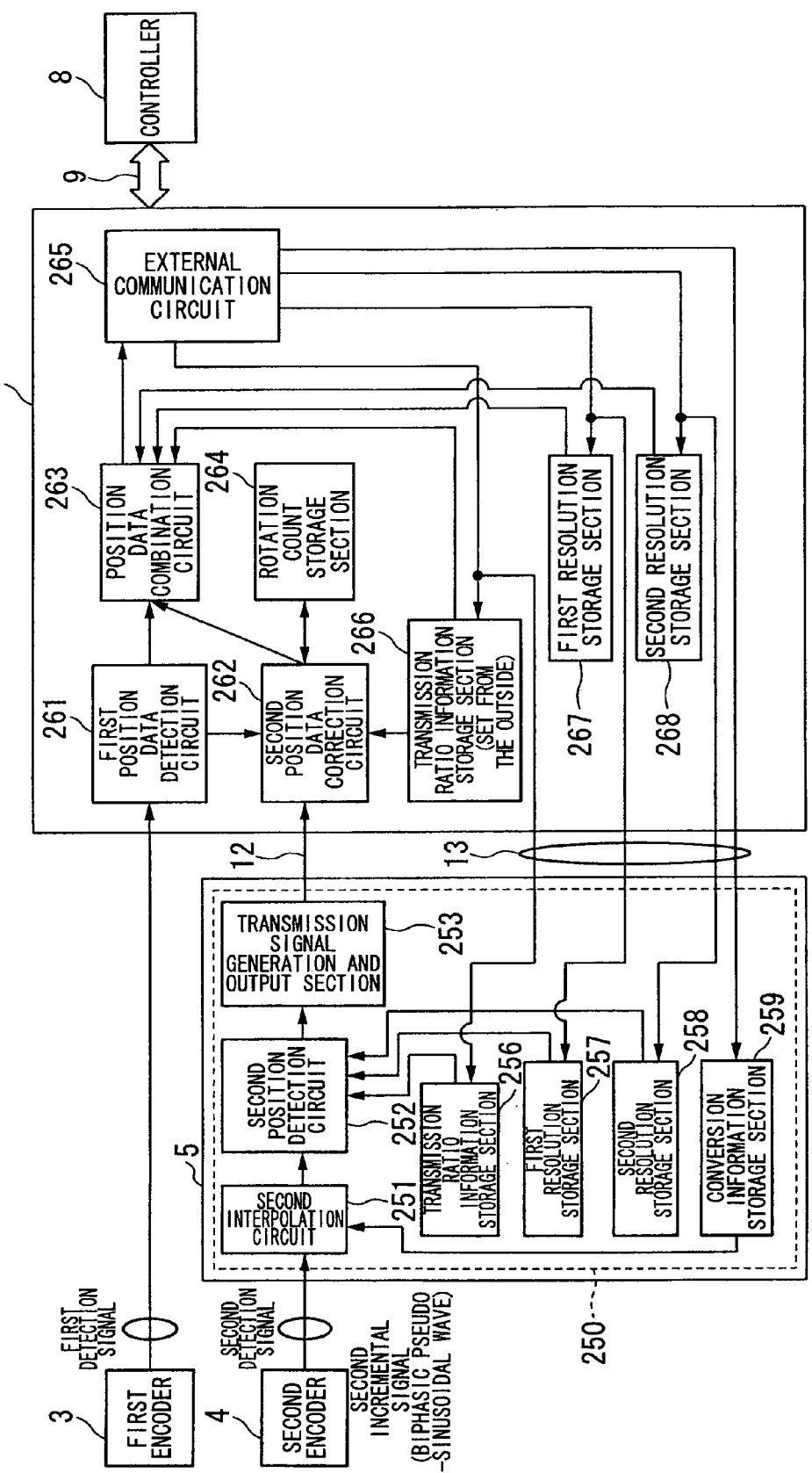
FIG. 6 is a block diagram showing a configuration of a signal processing circuit in the encoder system shown in FIG. 5.

Next, the configuration of the encoder system described using FIG. 5, particularly the configuration of the first and second signal processing circuits 6 and 5 will be described using FIG. 6. In FIG. 6, the same constituent elements as those in FIG. 5 will be denoted by the same reference numerals, and description thereof will be omitted.

<Configuration of First and Second Signal Processing Circuits 6 and 5>

The second signal processing circuit 5 includes a second position data detection circuit 250. The second position data detection circuit 250 includes a second interpolation circuit (interpolation circuit) 251, a second position detection circuit (position detection circuit) 252, a transmission signal generation and output section 253, a transmission ratio information storage section 256, a first resolution storage section 257, a second resolution storage section 258, and a conversion information storage section 259. On the other hand, the first signal processing circuit 6 includes a first position data detection circuit 261, a second position data correction circuit 262, a position data combination circuit 263, a rotation count storage section 264, an external communication circuit 265, a transmission ratio information storage section 266, a first resolution storage section 267, and a second resolution storage section 268.

<Respective Configurations of Second Position Data Detection Circuit 250>

First, the respective configurations of the second position data detection circuit 250 will be described. In the transmission ratio information storage section 256, information representing the value of a predetermined transmission ratio (for example, a gear ratio) of the power transmission device 2 connecting the first encoder 3 and the second encoder 4 is stored in advance as transmission ratio information. In the first resolution storage section 257, the resolution of the first position data detection circuit 261 is stored in advance as a first resolution. In the second resolution storage section 258, the resolution of the second position data detection circuit 250 is stored in advance as a second resolution.

The second interpolation circuit 251 interpolates the second detection signal input from the second encoder 4 to detect the second position data. The second position detection circuit 252 calculates a value of the integer part of a value obtained by dividing a value which is obtained by multiplying the second position data detected by the second interpolation circuit 251 and the transmission ratio information read out from the transmission ratio information storage section 256 by the value of the second resolution read out from the second resolution storage section 258 as the rotation count and calculates a value obtained by multiplying a value of the fractional part of the divided value and the value of the first resolution read out from the first resolution storage section 257 as the estimate. This estimate is the estimated position data of the accurate first position data detected by the first encoder 3, calculated based on the second detection signal detected by the second encoder 4.

For example, the second position detection circuit 252 calculates the rotation count (m) and the estimate using Equations 4 and 5 below.

$$\text{Rotation Count}(m) = INT(n(P2/R2)) \quad \text{(Equation 4)}$$

$$\text{Estimate} = n(P2/R2) - m \quad \text{(Equation 5)}$$

In Equations 4 and 5, P2 is the second position data detected by the second interpolation circuit 251, R2 is the second resolution stored in the second resolution storage section 258, and n is the transmission ratio information read out from the transmission ratio information storage section 256. Moreover, INT is an operator that truncates the fractional part and extracts only the integer part.

In this way, the second position data detection circuit 250 calculates the rotation count of the first encoder 3 and calculates the position data corresponding to the first position data as the estimate based on the interpolated value of the second detection signal detected by the second encoder 4 and the transmission ratio information read out from the transmission ratio information storage section 256 by using the second interpolation circuit 251 and the second position detection circuit 252.

The second position data detection circuit 250 will be described in further detail. In the conversion information storage section 259, the second detection signal and the second position data are stored in advance in a correlated manner. In addition, in the conversion information storage section 259, when the value of the first signal of the biphasic sinusoidal signal is larger than that of the second signal, the value obtained by dividing the second signal by the first signal and the second position data corresponding to the divided value are stored in advance, and when the value of the first signal is smaller than that of the second signal, the value obtained by dividing the first signal by the second signal and the second position data corresponding to the divided value are stored in advance.

The second interpolation circuit 251 reads out second position data corresponding to the second detection signal output by the second encoder 4 from the conversion information storage section 259 to detect the second position data. When the value of the first signal of the biphasic sinusoidal signal is larger than that of the second signal, the second interpolation circuit 251 detects the second position data by reading out the second position data corresponding to a value obtained by dividing the second signal by the first signal from the conversion information storage section 259. On the other hand, when the value of the first signal of the biphasic sinusoidal signal is smaller than that of the second signal, the second interpolation circuit 251 detects the second position data by reading out the second position data corresponding to a value obtained by dividing the first signal by the second signal from the conversion information storage section 259.

Here, the second detection signal and the second position data stored in advance in the conversion information storage section 259 in a correlated manner will be described using FIG. 7. In this description, it is assumed that the second detection signal is a biphasic sinusoidal signal, the first signal of the biphasic sinusoidal signal is an A-phase signal, and the other of the biphasic sinusoidal signal is a B-phase signal. In FIG. 7, the horizontal axis x corresponds to the phase 0 to $2\pi$ (in the drawing, $-\pi$ to $\pi$) in one rotation of the output shaft 11, namely the second position data. Moreover, the vertical axis y corresponds to a curve C for detecting the second position data from the A-phase signal, the B-phase signal, and the second detection signal.

Here, the A-phase signal and the B-phase signal are sinusoidal waves output from the Hall-effect elements, and since the Hall-effect elements are disposed so as to have the mutual angle of 90° in the second encoder, the phases thereof are different by 90°. Therefore, the A-phase signal and the B-phase signal have the relationship of SIN and COS, for example. In this example, the A-phase signal is described as SIN, and the B-phase signal is described as COS (in the drawing, -COS).

When the value of the A-phase signal is larger than the value of the B-phase signal, a value obtained by dividing the value of the B-phase signal by the value of the A-phase signal, namely the value of COT which is a division of COS by SIN corresponds to the value of the curve C. Conversely, when the value of the A-phase signal is smaller than the value of the B-phase signal, a value obtained by dividing the value of the A-phase signal by the value of the B-phase signal, namely the value of TAN which is a division of SIN by COS corresponds to the value of the curve C. In the conversion information storage section 259, the COT or TAN corresponding to the second detection signal and the second position data are stored in a correlated manner using the value of the curve C.

Upon receiving the second detection signal, namely the value of the A-phase signal and the value of the B-phase signal of the biphasic sinusoidal signal from the second encoder 4, first, the second interpolation circuit 251 determines which one of the value of the A-phase signal and the value of the B-phase signal is the larger. When it is determined that the value of the A-phase signal is larger than the value of the B-phase signal, the second interpolation circuit 251 divides the value of the B-phase signal by the value of the A-phase signal and reads out second position data corresponding to the divided value from the conversion information storage section 259 to detect the second position data. Conversely, when it is determined that the value of the A-phase signal is smaller than the value of the B-phase signal, the second interpolation circuit 251 divides the value of the A-phase signal by the value of the B-phase signal and reads out second position data corresponding to the divided value from the conversion information storage section 259 to detect the second position data.

The use of the conversion information storage section 259 and the second interpolation circuit 251 provides the following advantageous effects. First, there is a possibility that any one of the A-phase signal and the B-phase signal has a value close to 0 depending on the phases thereof. In this case, if the second signal is divided by the first signal having the value close to 0, since the calculated value may diverge, there is a possibility that it is unable to perform calculation properly. Moreover, even if the calculation was possible, there is a possibility that the calculation error increases.

Here, the A-phase signal and the B-phase signal of the biphasic sinusoidal signal have different phases and have the relationship of COS and SIN, for example. Therefore, the A-phase signal and the B-phase signal will not have values close to 0 at the same time. Accordingly, even when the first signal has a value close to 0, by dividing the second signal by the first signal having the larger value as described above, the division can be properly calculated. Moreover, since the division is computed using a divisor having a larger value than 0, there is no possibility that the division error increases. By doing so, the division can be properly computed, and the second interpolation circuit 251 can properly detect the second position data from the second detection signal with a reduced error.

In this way, in the present embodiment, it is possible to convert two pieces of signal information, namely the value of the A-phase signal and the value of the B-phase signal into one piece of signal information, namely the value obtained by dividing the first signal by the second signal and to detect the second position data based on one piece of signal information.

In each predetermined phase interval in one rotation of the output shaft, the second detection signal and the second position data are in a relationship such that they are identical or a relationship such that they are mirror-symmetrical about a line corresponding to the central phase of the phase interval. For example, in FIG. 7, there are four symmetrical phase intervals: that is, a first phase interval of from $-\pi$ to $-(3/4)\pi$ and from $(3/4)\pi$ to $\pi$; a second phase interval of from $-(3/4)\pi$ to $-(1/4)\pi$; a third phase interval of from $-(1/4)\pi$ to $(1/4)\pi$; and a fourth phase interval of from $(1/4)\pi$ to $(3/4)\pi$. Moreover, looking at the phase interval of the first and third phase intervals and the phase interval of the second and fourth phase intervals, the second detection signal and the second position data are in a relationship such that they are identical. Moreover, looking at the first and second phase intervals, the second detection signal and the second displacement in the first position data are in a relationship such that they are identical to the second detection signal and the second position data in the second phase interval which are mirror-symmetrical about the central phase of the second phase interval, namely $-(1/2)\pi$.

Figure 8:
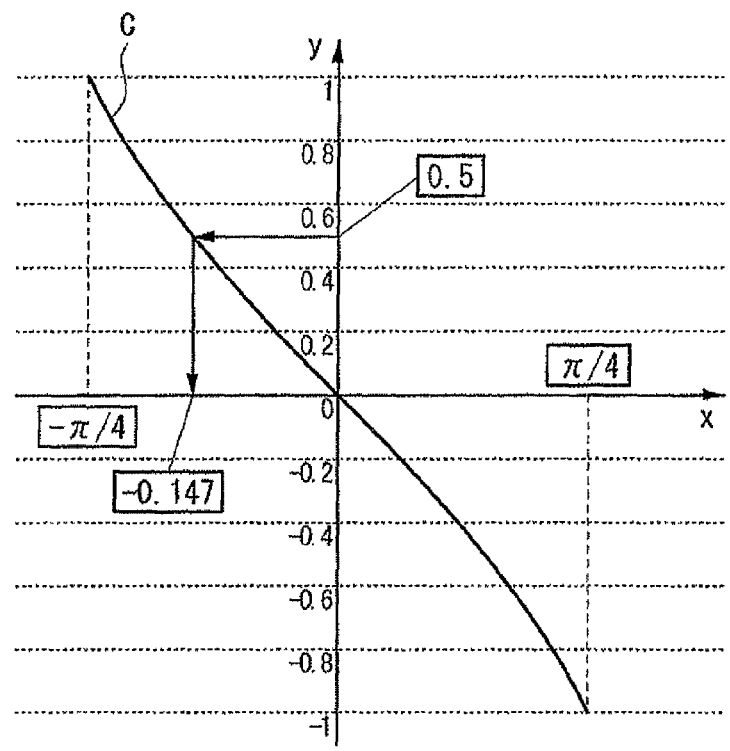
FIG. 8 is a waveform diagram showing the relationship between a second detection signal and second position data in one phase interval of FIG. 7.

As described above, since the second detection signal and the second position data in each phase interval are in a relationship such that they are identical or a relationship such that they are mirror-symmetrical, the conversion information storage section 259 is able to store the second detection signal and the second position data for only one phase interval in advance in a correlated manner. For example, as shown in FIG. 8, the second detection signal and the second position data for only one phase interval, namely in the third phase interval of from $-(1/4)\pi$ to $(1/4)\pi$ are stored in advance in a correlated manner. By doing so, the data quantity of the second detection signal and the second position data which need to be stored in advance in the conversion information storage section 259 can be decreased.

Moreover, in this case, first, the second interpolation circuit 251 determines which phase interval the rotational position of the output shaft corresponds to, among a plurality of phase intervals corresponding to one rotation of the output shaft. Then, the second interpolation circuit 251 calculates the second position data in one rotation of the rotation of the output shaft based on a predetermined reference phase corresponding to the determined phase interval and the second position data in one phase interval read out from the conversion information storage section 259 to detect the second position data. For example, the second interpolation circuit 251 adds the value of the reference phase and the value of the second position data to detect the second position data.

For example, the second interpolation circuit 251 determines which of a plurality of conditions determined in advance based on the value of the second detection signal, the input value of the second detection signal satisfies. Then, the second interpolation circuit 251 selects a phase interval correlated in advance to the satisfied condition, thus determining which phase interval, the rotational position of the output shaft corresponds to, among a plurality of phase intervals corresponding to one rotation of the output shaft.

For example, in FIG. 7, the plurality of conditions determined in advance based on the value of the second detection signal and the phase intervals correlated to the conditions have the following relationships.

(1) The first phase interval is selected when the value of the A-phase signal is smaller than the value of the B-phase signal ([A-phase signal value]<[B-phase signal value]) and the value of the B-phase signal is positive ([B-phase signal value]>0).

(2) The second phase interval is selected when the value of the A-phase signal is larger than the value of the B-phase signal ([A-phase signal value]>[B-phase signal value]) and the value of the A-phase signal is negative ([A-phase signal value]<0).

(3) The third phase interval is selected when the value of the A-phase signal is smaller than the value of the B-phase signal ([A-phase signal value]<[B-phase signal value]) and the value of the B-phase signal is negative ([B-phase signal value]<0).

(4) The fourth phase interval is selected when the value of the A-phase signal is larger than the value of the B-phase signal ([A-phase signal value]>[B-phase signal value]) and the value of the A-phase signal is positive ([A-phase signal value]<0).

For these respective phase intervals, reference phases are determined in advance. For example, the value of the central phase of each phase interval is determined in advance as the reference phase. For example, the value of the reference phase of the first phase interval is $-\pi$ (or $\pi$), the value of the reference phase of the second phase interval is $-(1/2)\pi$, the value of the reference phase of the third phase interval is 0, and the value of the reference phase of the fourth phase interval is $(1/2)\pi$.

The reference phases may be stored in advance in a reference phase storage section of the second position data detection circuit 250 so as to be correlated to the respective phase intervals, for example. In this case, as described above, the second interpolation circuit 251 selects the phase interval and reads out a reference phase corresponding to the selected phase interval from the reference phase storage section. In addition, the second interpolation circuit 251 divides the value of one of the A-phase signal and the B-phase signal of the biphasic sinusoidal signal by the value of the other one having the larger value and reads out the second position data corresponding to the divided value from the conversion information storage section 259 based on the symmetrical property of the selected phase interval. Then, the second interpolation circuit 251 adds and combines the read second position data and the read reference phase to detect the second position data.

In the description above, although the phase is divided into the four phase intervals of the first to fourth phase intervals, the phase dividing method is not limited to this. For example, as shown in FIG. 8, the second detection signal and the second position data in the interval from $-(1/4)\pi$ to $(1/4)\pi$ are point-symmetrical about the origin 0. Therefore, if only the information for the interval from 0 to $(1/4)\pi$ is given, it is possible to calculate the information for the interval from $-(1/4)\pi$ to 0 from the point symmetrical property. Accordingly, the second detection signal and the second position data which need to be stored in advance in the conversion information storage section 259 may be the information for the interval from 0 to $(1/4)\pi$, and the data quantity thereof can be further decreased.

<Respective Configurations of First Signal Processing Circuit 6>

Next, the respective configurations of the first signal processing circuit 6 shown in FIG. 6 will be described. In the transmission ratio information storage section 266, similarly to the transmission ratio information storage section 256, information representing the value of a predetermined transmission ratio (for example, a gear ratio) of the power transmission device 2 connecting the first encoder 3 and the second encoder 4 is stored in advance as transmission ratio information. In the first resolution storage section 267, similarly to the first resolution storage section 257, the resolution of the first position data detection circuit 261 is stored in advance as a first resolution. In the second resolution storage section 268, similarly to the second resolution storage section 258, the resolution of the second position data detection circuit 250 is stored in advance as a second resolution.

The first position data detection circuit 261 detects first position data representing the angular position of the input shaft 10 through first predetermined signal processing based on the first detection signal input from the first encoder 3.

The second position data correction circuit 262 corrects the second position data detected by the second position data detection circuit 250 through predetermined correction processing based on the second position data and the first position data detected by the first position data detection circuit 261.

The position data combination circuit 263 combines the first position data detected by the first position data detection circuit 261 and the second position data corrected by the second position data correction circuit 262 to generate combined position data representing the rotation count of the input shaft and the positional displacement within one rotation of the input shaft.

Next, the configuration of the second position data correction circuit 262 and the position data combination circuit 263 will be described in further detail. The second position data correction circuit 262 corrects the second position data detected by the second position data detection circuit 250 through predetermined correction processing based on the value of the second position data and the value of the first position data detected by the first position data detection circuit 261.

That is, when the value of the estimate calculated by the second position detection circuit 252 is equal to or larger than a first predetermined reference value, and the value of the first position data detected by the first position data detection circuit 261 is smaller than a second predetermined reference value, the second position data correction circuit 262 corrects the rotation count of the first encoder 3 by adding 1 to the value of the integer part of the rotation count. Moreover, when the value of the estimate calculated by the second position detection circuit 252 is smaller than a third predetermined reference value equal to or smaller than the first reference value, and the value of the first position data detected by the first position data detection circuit 261 is equal to or larger than a fourth predetermined reference value equal to or larger than the second reference value, the second position data correction circuit 262 corrects the rotation count of the first encoder 3 by subtracting 1 from the value of the integer part of the rotation count.

The predetermined first, second, third, and fourth reference values described above will be described using FIGS. 9 and 10.

Next, a rotation count correction method by the second position data correction circuit 262 will be described using FIGS. 9 and 10. In this example, a case in which the value of the first position data is 17 bit will be described.

As shown in FIG. 9, the output shaft 11 rotates with the rotation of the input shaft 10, and the rotation count m is calculated based on the value P2 of the second position data. Moreover, the value P1 of the first position data repeats the values from 0 to 131071 ($=2^{17}-1$). That is, when the value P1 of the first position data repeats the values from 0 to 131071 ($=2^{17}-1$), the rotation count m changes in the order of 10, 11, 12. There is a shift between the position of change (for example, the time when the value P1 of the first position data becomes 0) in the input shaft rotation count detected based on the value P1 of the first position data and the time when the rotation count m changes.

As shown in FIG. 10, for example, when the value P1 of the first position data is within the range of 0 to 32767 ($=2^{17}\times 1/4-1$), and the calculated rotation count m is in the posterior half region, the second position data correction circuit 262 corrects the value of the rotation count m by adding a correction value $\Delta m$ ($=1$) to the value of the rotation count m. Here, the calculated rotation count m being in the posterior half region means that the value of the calculated rotation count m is actually m but is close to m+1.

Moreover, as shown in FIG. 10, for example, when the value P1 of the first position data is within the range of 98304 ($=2^{17}\times 3/4-1$) to 131071 ($=2^{17}-1$), and the calculated rotation count m is in the anterior half region, the second position data correction circuit 262 corrects the value of the rotation count m by adding a correction value $\Delta m$ ($=-1$) to the value of the rotation count m. Here, the calculated rotation count m being in the anterior half region means that the value of the calculated rotation count m is actually m but is close to m−1.

The determination as to whether the calculated rotation count m is in the posterior half region or the anterior half region is made based on the value of the estimate. For example, when the value of the estimate calculated by the second position detection circuit 252 is smaller than 0.5 (half cycle), the second position data correction circuit 262 determines that the rotation count in is in the anterior half region. When the value of the estimate is equal to or larger than 0.5 (half cycle), the rotation count m is determined to be in the posterior half region.

In this case, the first and third reference values are 0.5, the second reference value is 32767 ($=2^{17}\times 1/4-1$), and the fourth reference value is 98304 ($=2^{17}\times 3/4-1$). That is, the second reference value is 1/4 of the value of the first resolution read out from the first resolution storage section 267. Moreover, the fourth reference value is 3/4 of the value of the first resolution read out from the first resolution storage section 267.

The first and third reference values are reference values for detecting whether the rotational position of the input shaft 10 estimated based on the value of the estimate calculated by the second position detection circuit 252 is in the anterior half region of the rotation in one rotation of the input shaft 10 or the posterior half region. Moreover, the second and fourth reference values are reference values for detecting whether the rotational position of the input shaft 10 detected based on the value of the rotation count detected by the first encoder 3 is in the posterior half region (in this case, the starting 1/4 region of one rotation) of the rotation in one rotation of the input shaft 10 or the posterior half region (in this case, the ending 1/4 region of one rotation).

In this way, the second position data correction circuit 262 determines whether the rotational position of the input shaft 10 estimated based on the value of the estimate calculated by the second position detection circuit 252 is in the anterior half region of the rotation in one rotation of the input shaft 10 or the posterior half region and determines whether the rotational position of the input shaft 10 detected based on the value of the rotation count detected by the first encoder 3 is in the anterior half region of the rotation in one rotation of the input shaft 10 or the posterior half region. Moreover, when the two determination results are different, the second position data correction circuit 262 corrects the value of the rotation count calculated by the second position detection circuit 252.

Specifically, when the rotational position of the input shaft 10 estimated based on the value of the estimate calculated by the second position detection circuit 252 is in the posterior half region of the rotation in one rotation of the input shaft 10, and the rotational position of the input shaft 10 detected based on the value of the first position data detected by the first position data detection circuit 261 is in the anterior half region of the rotation in one rotation of the input shaft 10, the second position data correction circuit 262 corrects the value of the rotation count calculated by the second position detection circuit 252 by adding 1 to the value of the rotation count.

On the other hand, when the rotational position of the input shaft 10 estimated based on the value of the estimate calculated by the second position detection circuit 252 is in the anterior half region of the rotation in one rotation of the input shaft 10, and the rotational position of the input shaft 10 detected based on the value of the first position data detected by the first position data detection circuit 261 is in the posterior half region of the rotation in one rotation of the input shaft 10, the second position data correction circuit 262 corrects the value of the rotation count calculated by the second position detection circuit 252 by adding −1 to the value of the rotation count, namely by subtracting 1 from the value of the rotation count.

For the second position data correction circuit 262 to correct the value of the rotation count calculated by the second position detection circuit 252, it is necessary to determine whether the rotational position of the input shaft 10 estimated based on the value of the estimate calculated by the second position detection circuit 252 is in the anterior half region of the rotation in one rotation of the input shaft 10 or the posterior half region. That is, the second position detection circuit 252 needs to detect the second position data at a predetermined resolution that is, for example, at least twice of the transmission ratio of the power transmission device 2. Therefore, the second position detection circuit 252 needs to output the rotation count to the second position data correction circuit 262 so that it can determine whether or not the rotational position is in the anterior half region of the rotation in one rotation of the input shaft 10 or the posterior half region. This transmission method will be described in conjunction with the transmission signal generation and output section 253 described later.

The position data combination circuit 263 generates combined position data based on the value of the rotation count of the first encoder 3 corrected by the second position data correction circuit 262 and the value of the first position data detected by the first position data detection circuit 261. When combining the first position data detected by the first position data detection circuit 261 and the second position data detected by the second position data detection circuit 250, the position data combination circuit 263 generates the combined position data based on the transmission ratio information read out from the transmission ratio information storage section 266.

Moreover, specifically, when combining the first position data detected by the first position data detection circuit 261 and the second position data detected by the second position data detection circuit 250, the position data combination circuit 263 generates the combined position data by a predetermined calculation method based on the transmission ratio information read out from the transmission ratio information storage section 266, the first resolution read out from the first resolution storage section 267, and the second resolution read out from the second resolution storage section 268.

The position data combination circuit 263 outputs the combined position data generated by the position data combination circuit 263 to the controller 8 through the communication line 9 using the external communication circuit 265.

Moreover, the external communication circuit 265 executes processing for communication with the controller 8 through the communication line 9. For example, the external communication circuit 265 stores the transmission ratio information received from the controller 8 through the communication line 9 in the transmission ratio information storage section 266 and stores the transmission ratio information to the transmission ratio information storage section 256 through the setting control line 13.

Moreover, the external communication circuit 265 stores the first resolution received from the controller 8 through the communication line 9 in the first resolution storage section 267 and stores the first resolution in the first resolution storage section 257 through the setting control line 13. Furthermore, the external communication circuit 265 stores the second resolution received from the controller 8 through the communication line 9 in the second resolution storage section 268 and stores the second resolution in the second resolution storage section 258 through the setting control line 13.

The transmission ratio information storage sections 266 and 256 are nonvolatile memories, for example. Therefore, once the value of the transmission ratio information stored in the transmission ratio information storage section 266 is set, it will not be erased even when the encoder system is powered off. According to this configuration, it is possible to broaden the choices for the power transmission device 2 and the transmission ratio of the power transmission device 2 usable in the encoder system.

Moreover, the first resolution storage sections 257 and 267 and the second resolution storage sections 258 and 268 are also nonvolatile memories, for example, similarly to the transmission ratio information storage sections 266 and 256. Therefore, it is possible to broaden the choices for the power transmission device 2 and the transmission ratio of the power transmission device 2 usable in the encoder system.

Next, the transmission signal generation and output section 253 of the second position data detection circuit 250 will be described using FIG. 11. The transmission signal generation and output section 253 generates a transmission signal representing the value of the rotation count and whether the rotational position of the input shaft corresponding to the rotation count is in the anterior half region of the rotation in one rotation of the input shaft or the posterior half region based on the estimate calculated by the second position detection circuit 252 and outputs the transmission signal to the second position data correction circuit 262. For example, the transmission signal generation and output section 253 of the second position data detection circuit 250 generates the transmission signal representing whether or not the value of the calculated estimate is equal to or smaller than the first reference value and whether or not the value of the calculated estimate is smaller than the third reference value based on the calculated estimate and outputs the generated transmission signal to the second position data correction circuit 262.

Figure 11:
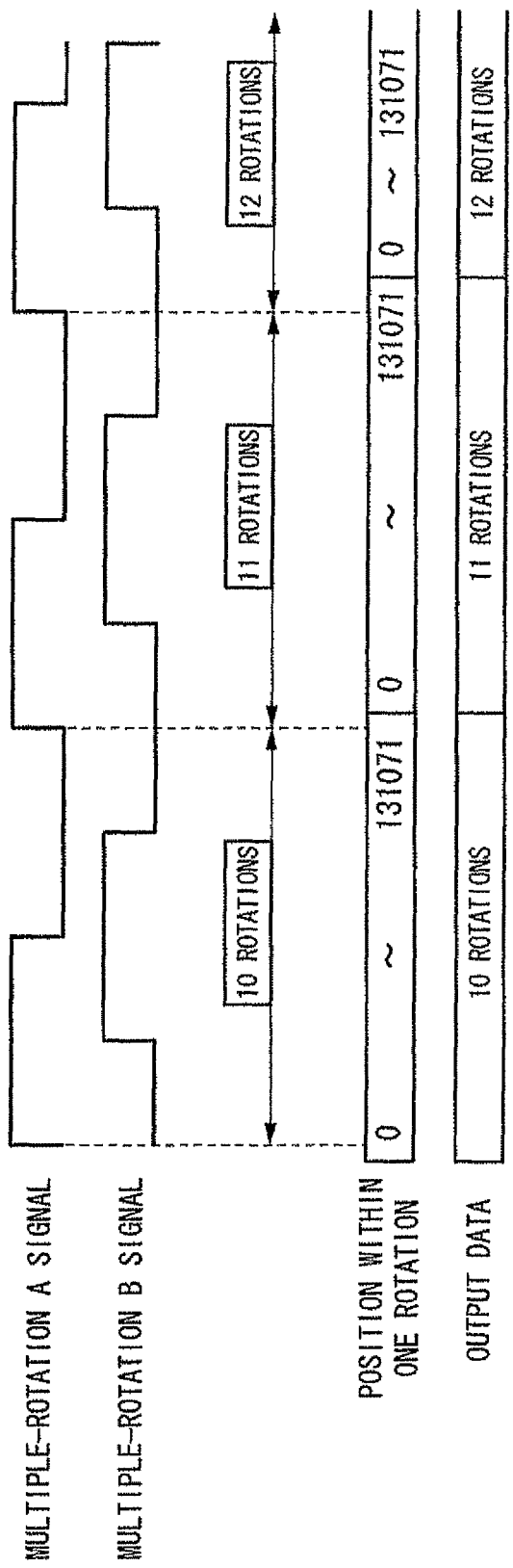
FIG. 11 is a waveform diagram showing the waveform of an exemplary transmission signal output to the second position data correction circuit by a transmission signal generation and output section.

The transmission signal generation and output section 253 generates and outputs multiple-rotation A and B signals which are first and second rectangular signals of which the phases are different by 90°, for example, as the transmission signal (see FIG. 11).

In FIG. 11, when the input shaft makes one rotation, namely when the first position data assumes the values from 0 to 131071, the multiple-rotation A signal and the multiple-rotation B signal change in the signal pattern of H and L; H and H; L and H, and L and L. Here, H and L are the potentials of an electrical signal and are, for example, high and low levels, respectively. Moreover, whenever the input shaft makes one rotation, the multiple-rotation A signal and the multiple-rotation B signal repeat the above-described signal pattern.

The multiple-rotation A and B signals generated by the transmission signal generation and output section 253 have the following reliability in accordance with the transmission ratio n and the resolution R2 of the second position data detection circuit 250 in one rotation of the input shaft.

The multiple-rotation A signal is H in a period where the residue of R2/4n is 0 to 2n and is L in the other periods. On the other hand, the multiple-rotation B signal is H in a period where the residue of R2/4n is n to 3n and is L in the other periods.

For example, the transmission signal generation and output section 253 generates the above-described multiple-rotation A and B signals in the following manner. The transmission signal generation and output section 253 outputs H for the multiple-rotation A signal when a value obtained by subtracting 4n from a value obtained by multiplying the resolution R2 of the second position data detection circuit 250 with the estimate calculated by the second position detection circuit 252 is within the range of 0 to 2n, and outputs L for the multiple-rotation A signal when the value is outside the range. Moreover, the transmission signal generation and output section 253 outputs H for the multiple-rotation B signal when a value obtained by subtracting 4n from a value obtained by multiplying the resolution R2 of the second position data detection circuit 250 with the estimate calculated by the second position detection circuit 252 is within the range of 1n to 3n, and outputs L for the multiple-rotation B signal when the value is outside the range.

In this way, the transmission signal generation and output section 253 generates and outputs the transmission signal corresponding to the rotation of the input shaft 10 based on the second position data detected by the second position data detection circuit 250. The transmission signal generation and output section 253 generates a plurality of signals, of which one cycle corresponds to one rotation of the input shaft 10, and of which the phases are different, as the transmission signal.

The transmission signal is a biphasic rectangular wave of which one cycle corresponds to one rotation of the input shaft 10.

Moreover, in this way, the transmission signal generation and output section 253 generates and outputs the transmission signal based on the estimate (the residue of R2/4n) calculated by the second position data detection circuit 250. Moreover, since the estimate is based on the transmission ratio information, the transmission signal is based on the transmission ratio information. That is, the transmission signal generation and output section 253 generates and outputs the transmission signal based on the transmission ratio information.

Therefore, even when the transmission ratio of the power transmission device is changed, by changing the value of the transmission ratio information stored in the transmission ratio information storage section 256, the transmission signal generation and output section 253 is able to generate and output the transmission signal described above. Accordingly, the encoder system can use a power transmission device having an arbitrary transmission ratio.

Then, the second position data correction circuit 262 determines whether the rotational position of the input shaft corresponding to the rotation count is in the anterior half region of the rotation in one rotation of the input shaft or the posterior half region based on the transmission signal input from the transmission signal generation and output section 253 of the second position data detection circuit 250 and corrects the value of the rotation count. For example, the second position data correction circuit 262 determines whether or not the value of the calculated estimate is equal to or smaller than the first reference value and whether or not the value of the calculated estimate is smaller than the third reference value based on the transmission signal input from the transmission signal generation and output section 253 of the second position data detection circuit 250 and corrects the value of the rotation count.

For example, the multiple-rotation A and B signals change in the signal pattern of H and L; H and H; L and H; and L and L whenever the input shaft makes one rotation, Therefore, when the multiple-rotation A and B signals are H and L, or H and H, respectively, the second position data correction circuit 262 determines that the rotational position is in the anterior half region of the rotation in one rotation of the input shaft. On the other hand, when the multiple-rotation A and B signals are L and H, or L and L, respectively, the second position data correction circuit 262 determines that the rotational position is in the posterior half region of the rotation in one rotation of the input shaft.

More specifically, when the multiple-rotation A and B signals are H and L, respectively, the second position data correction circuit 262 determines that the rotational position is in the starting 1/4 region of the rotation in one rotation of the input shaft. Moreover, when the multiple-rotation A and B signals are L and L, respectively, the second position data correction circuit 262 determines that the rotational position is in the ending 1/4 region of the rotation in one rotation of the input shaft.

Moreover, the second position data correction circuit 262 detects that the input shaft has made one rotation by detecting that the input multiple-rotation A and B signals have changed sequentially in the signal pattern of H and L; H and H; L and H; and L and L. On the other hand, the second position data correction circuit 262 detects that the input shaft has made one rotation in a reverse direction, namely −1 rotation, by detecting that the input multiple-rotation A and B signals have changed sequentially in the signal pattern of L and L; L and H; H and H; and H and L.

That is, the second position data correction circuit 262 receives the transmission signal as the plurality of signals, detects an increment or a decrement of the number of rotations of the input shaft 10 based on a combination of the plurality of received signals, and adds the detected increment or decrement of the number of rotations to the value of the rotation count of the input shaft 10 read out from the rotation count storage section 264, thus calculating the rotation count of the input shaft 10.

<Setting Method During Startup>

The transmission signal described above enables transmission of the interference fringe representing that the value of the rotation count has increased by 1 or the value of the rotation count has decreased by 1, from the second signal processing circuit 5 to the first signal processing circuit 6, but it is not possible to transmit the value of the rotation count itself. Therefore, when the encoder system is powered ON, the initial value of the rotation count is output from the second signal processing circuit 5 to the first signal processing circuit 6, and the initial value is stored in the first signal processing circuit 6. After that, the first signal processing circuit 6 increases or decreases the initial value by 1 in response to reception of the transmission signal from the second signal processing circuit 5, thus detecting the value of the rotation count.

Figure 12:
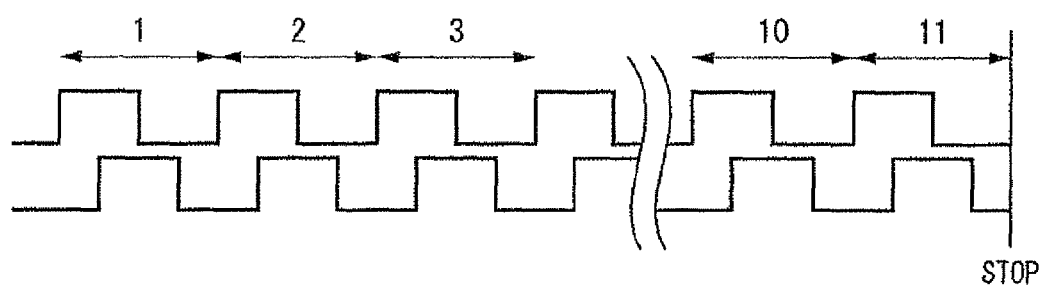
FIG. 12 is a waveform diagram showing the waveform of an exemplary transmission signal output to the second position data correction circuit by the transmission signal generation and output section at the time of startup.

For example, when the encoder system is powered ON, the transmission signal generation and output section 253 of the second signal processing circuit 5 outputs a multiple-rotation signal which repeats the signal pattern of the above-described multiple-rotation A and B signals at a cycle of 1 KHz as an initial value setting signal. Moreover, the transmission signal generation and output section 253 of the second signal processing circuit 5 outputs a signal corresponding to the value of the second position data detected by the second position data detection circuit 250 and then stops this outputting. That is, the transmission signal generation and output section 253 of the second signal processing circuit 5 outputs the initial value setting signal as the pulse count of the multiple-rotation signal corresponding to the value of the second position data (see FIG. 12). For example, FIG. 12 shows the multiple-rotation signal output by the transmission signal generation and output section 253 when the value of the rotation count is as shown in FIG. 11.

Moreover, the second position data correction circuit 262 stores a value corresponding to the initial value setting signal received from the transmission signal generation and output section 253 of the second signal processing circuit 5 in the rotation count storage section 264. As a result, the rotation count information is set in the first signal processing circuit 6.

As described above, in order to set the rotation count information in the rotation count storage section 264 at the time of power-ON, for example, the second signal processing circuit 5 has a transmission-side initialization setting section that generates and outputs the transmission signal for cycles corresponding to the rotation count of the input shaft 10 based on the second position data detected by the second position data detection circuit 250 when power is on. Moreover, the first signal processing circuit 6 has a reception-side initialization setting section that stores the value of the rotation count of the input shaft 10 measured based on the received transmission signal for the cycles in the rotation count storage section 264 upon receiving the transmission signal for cycles corresponding to the rotation count of the input shaft 10 from the transmission-side initialization setting section.

The transmission-side initialization setting section may be included in the transmission signal generation and output section 253 and may be integrated with the transmission signal generation and output section 253. Moreover, the reception-side initialization setting section may be included in the second position data correction circuit 262 or the position data combination circuit 263 and may be integrated with the second position data correction circuit 262 or the position data combination circuit 263.

After that, the second position data correction circuit 262 detects the value of the rotation count by increasing or decreasing the value of the rotation count stored in the rotation count storage section 264 by 1 in response to reception of the transmission signal from the second signal processing circuit 5.

<When Transmission Signal is Serial Signal>

For example, in order for the second signal processing circuit 5 to transmit the position of 10 rotations at a resolution, for example, of 8n (8 times of the transmission ratio), specifically, a resolution of 800 using 100 as the value of n, it is necessary to transmit a value of 80 to the first signal processing circuit 6.

If the transmission signal is a serial signal, when the power is ON, a position data transmission request signal is transmitted from the first signal processing circuit 6 to the second signal processing circuit 5 as 8-bit serial data and 3-bit CRC data. Here, CRC is an abbreviation of Cyclic Redundancy Check, and when it is appended to transmission data, the receiver side is able to recognize the presence of an error in the serial data using the CRC bit.

If there is no error, upon receiving the position data transmission request signal, the second signal processing circuit 5 transmits 16-bit position information of the second encoder 4 and 8-bit CRC data to the first signal processing circuit 6 at three different times. Transmitting the same data at three different times is to ensure the reliability of data. At that time, if the data transmitted at three different times are not identical, the first signal processing circuit 6 transmits information indicative of an error to the controller 8. In this way, the controller 8 can detect an error in the initialization.

In the case of a serial signal, the transmission signal generation and output section 253 generates and outputs serial data corresponding to the number of rotations of the input shaft 10 as the transmission signal.

<Compatibility with Conventional Transmission Method>

The conventional multiple-rotation absolute encoder performs waveform-shaping of the signal from a magnetic sensor such as a Hall-effect element to generate signals like the multiple-rotation A and B signals shown in FIG. 11. Then, a signal processing device generates output data based on the generated signals while ensuring consistency with one-rotation data of the motor shaft.

In the present embodiment, the second signal processing circuit 5 generates the above-described transmission signal (multiple-rotation A and B signals) and outputs the transmission signal to a signal processing device, namely the first signal processing circuit 6 similarly to the multiple-rotation signal of the conventional multiple-rotation absolute encoder. Therefore, the first signal processing circuit 6 receives the same signal as that of the conventional signal processing device.

As a result, according to the present embodiment, although no battery is used, the first signal processing circuit 6 can handle the transmission signal, namely the multiple-rotation A and B signals which are multiple-rotation signals in the same manner as the conventional multiple-rotation absolute encoder. However, the processing of the transmission signal, detection of the rotation count, correction processing, and the like are performed differently in the internal sections of the first signal processing circuit 6.

Moreover, although the transmission signal generation and output section 253 may output the output signal as an analog signal, in the present embodiment, as described above, the output signal is output as the biphasic rectangular wave, namely the multiple-rotation A and B signals. Analog signals are weak to disturbance noise, and the cost for countermeasures against noise may increase if the encoder system is operated in a real situation. Contrary to the analog signal, in the present embodiment, since the output signal is output as the biphasic rectangular wave as described above, the output signal is robust to disturbance noise and does not increase the cost.

Moreover, as described above, when data are transmitted from the second encoder to the first encoder by a serial communication method, similarly to the biphasic rectangular wave, the reliability of its noise resistance level is high. However, in the case of the serial communication method, the second encoder needs to have a circuit for converting the position data into serial data and a decoding circuit for enabling the first encoder to process the serial data from the second encoder, and this may increase a cost. In contrast, since the output signal is output as the biphasic rectangular wave, the circuit for converting to the serial data and the decoding circuit are not required, and it is possible to suppress the increase of costs.

As described above, in the present embodiment, by using the biphasic rectangular wave, it is possible to suppress the increase of costs without decreasing the noise resistance of the communication method used for transmitting data from the second encoder to the first encoder.

In the conventional encoder, a signal representing information on rotation was output from a device corresponding to the second detection section to a device corresponding to the first detection section as the biphasic rectangular wave. However, the biphasic rectangular wave is a signal of which one cycle corresponds to one rotation of the output shaft.

According to the present embodiment, as described above, although the biphasic rectangular wave is output from the second detection section to the first detection section, the biphasic rectangular wave is a signal of which one cycle corresponds to one rotation of the input shaft.

The biphasic rectangular wave used in the conventional encoder is a signal of which one cycle corresponds to one rotation of the output shaft whereas the biphasic rectangular wave used in the present embodiment is a signal of which one cycle corresponds to one rotation of the output shaft. However, the two biphasic rectangular waves have the same signal format.

Therefore, according to the present embodiment, the second detection section transmits a signal having the same format as the multiple-rotation signal of the conventional multiple-rotation absolute encoder to the position data combination circuit. Accordingly, it is possible to construct a multiple-rotation absolute encoder system with no battery without altering the controller of a multiple-rotation absolute encoder system with a backup battery.

<Operation of Encoder System>

Next, the operation of the encoder system will be described using FIG. 13. First, the output shaft 11 rotates with the rotation of the input shaft 10 (step S801). In response to the rotation of the output shaft 11, the second encoder 4 outputs the second detection signal (the A and B-phase signals which are biphasic pseudo-rectangular waves) to the second position data detection circuit 250 (step S802).

In response to the reception of the second detection signal, the second interpolation circuit 251 of the second position data detection circuit 250 determines a corresponding phase region based on the values of the A and B-phase signals (step S803). Subsequently, the second interpolation circuit 251 divides the second signal by the first signal having the larger value using the values of the A and B-phase signals (step S804). After that, the second interpolation circuit 251 reads out second position data corresponding to the divided value from the conversion information storage section 259 to detect the second position data (step S805).

Subsequently, the second position detection circuit 252 of the second position data detection circuit 250 calculates a rotation count and an estimate based on the second position data detected by the second interpolation circuit 251 (step S806). After that, the transmission signal generation and output section 253 of the second position data detection circuit 250 generates a transmission signal based on the calculated estimate and outputs the transmission signal to the second position data correction circuit 262 (step S807).

On the other hand, in response to the rotation of the input shaft 10 in step S801, the first encoder 3 outputs the first detection signal to the first position data detection circuit 261 (step S812). In response to the reception of the first detection signal, the first position data detection circuit 261 detects the value of the first position data through interpolation (step S813).

Subsequently, the second position data correction circuit 262 corrects the value of calculated estimate based on the value of the first position data detected by the first position data detection circuit 261 and the estimate calculated by the second position data detection circuit 250 received as the transmission signal by increasing or decreasing the value of the calculated estimate by 1 (step S821).

Subsequently, the position data combination circuit 263 generates combined position data based on the value of the rotation count of the first encoder 3 corrected by the second position data correction circuit 262 and the value of the first position data detected by the first position data detection circuit 261 (step S822) and outputs the generated combined position data to the controller 8 through the external communication circuit 265. Then, the controller 8 controls the operation of the motor 1 through the motor control line 14.

In the conventional example, the above-described operation may be performed as follows. A power transmission device such as a gear rotates the output shaft at a predetermined transmission ratio in response to the rotation of the input shaft. The angular position of the input shaft and the angular position of the output shaft are detected, and the rotation count of the input shaft is detected based on the detected angular position of the output shaft. Then, the detected angular position of the input shaft and the rotation count detected based on the positional displacement of the output shaft are combined, whereby a combined position which is the absolute position in multiple rotations of the input shaft is generated.

Figures 16, 17:
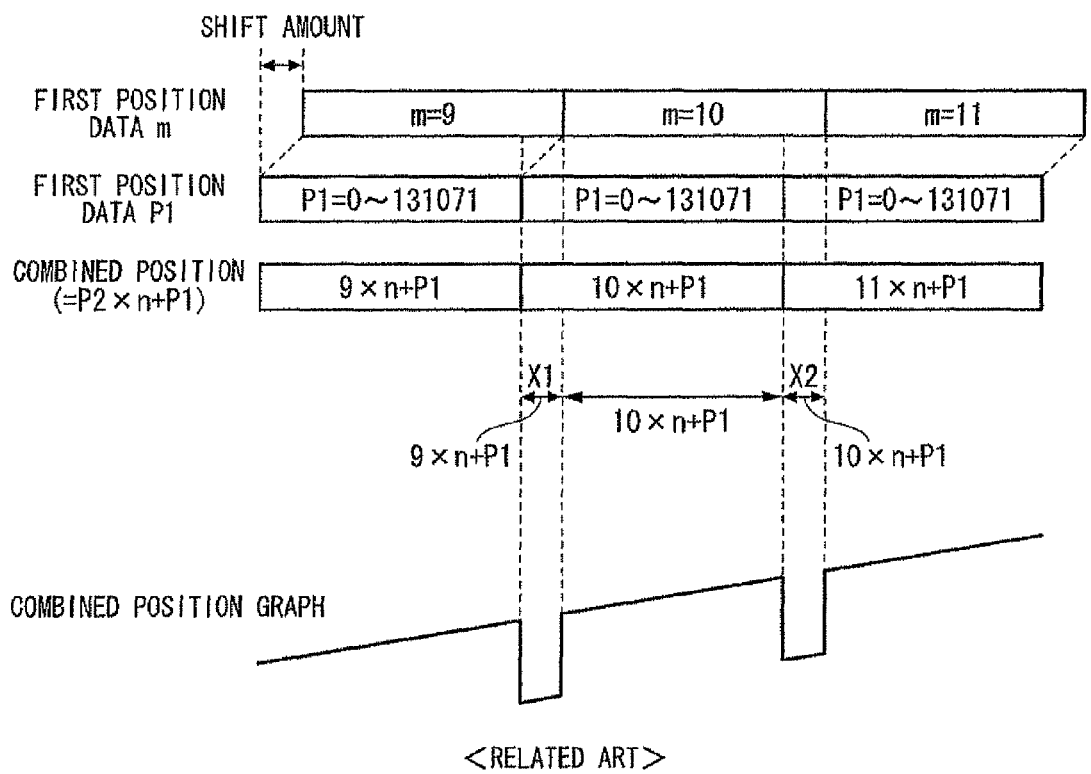
FIG. 16 is a diagram illustrating a combined position in an encoder system according to the conventional art when there is no shift.
FIG. 17 is a diagram illustrating a combined position in an encoder system according to the conventional art when there is a shift.

As one conventional example, a combined position generation method will be described with reference to FIG. 16. As shown in FIG. 16, when there is no shift between the information representing the rotation of the input shaft and the information representing the rotation of the output shaft, there is no shift between the value P1 of the first position data representing the angular position of the input shaft and the rotation count m of the input shaft detected based on the angular position of the output shaft. In this case, the combined position can be properly generated, for example, using Equation 6 below. In this case, as shown in FIG. 16, the combined position changes continuously with the rotation of the input shaft.

$$\text{Combined Position} = m \times \alpha + P1 \qquad \text{(Equation 6)}$$

In Equation 6, m is the rotation count of the input shaft calculated based on the angular position of the output shaft, P1 is the angular position of the input shaft, and α is the resolution of the first encoder. For example, in FIG. 16, the value of α is 131072.

However, in general, as shown in FIG. 17, there is a shift between the information representing the rotation of the input shaft and the interference fringe representing the rotation of the output shaft. This shift results from the engagement between the input shaft and a gear and the engagement between a gear and the output shaft and occurs physically.

When there is such a shift, for example, as indicated by reference sign X1 in FIG. 17, the value of the rotation count m of the input shaft which is to be calculated as 10 may be calculated as 9. Moreover, for example, as indicated by reference sign X2 in FIG. 17, the value of the rotation count m of the input shaft which is to be calculated as 11 may be calculated as 10. In such a case, as shown in FIG. 17, there is a problem in that the combined position changes discontinuously with the rotation of the input shaft.

Moreover, in the method above, since it is necessary to detect the positional displacement in rotation of the input shaft and the positional displacement in rotation of the output shaft, a device that detects one of the input shaft and the output shaft needs to output the detection signal properly to the other device.

Although this output needs to be an output method capable of generating the combined position through this output and correcting the shift, there was a problem in that no such output method is known in the conventional art.

Figure 13:
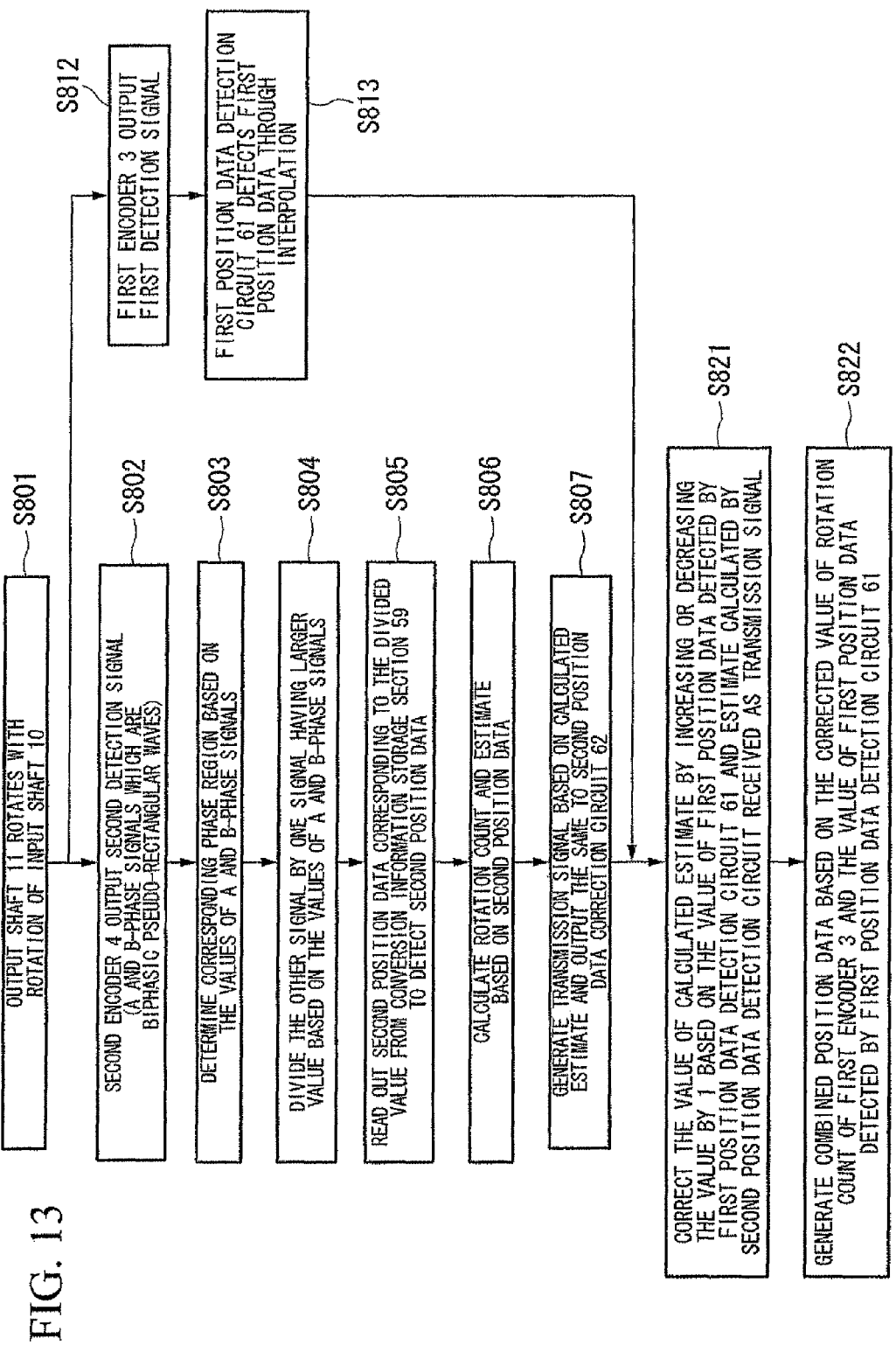
FIG. 13 is a flowchart showing the operation of the encoder system.
Figure 14:
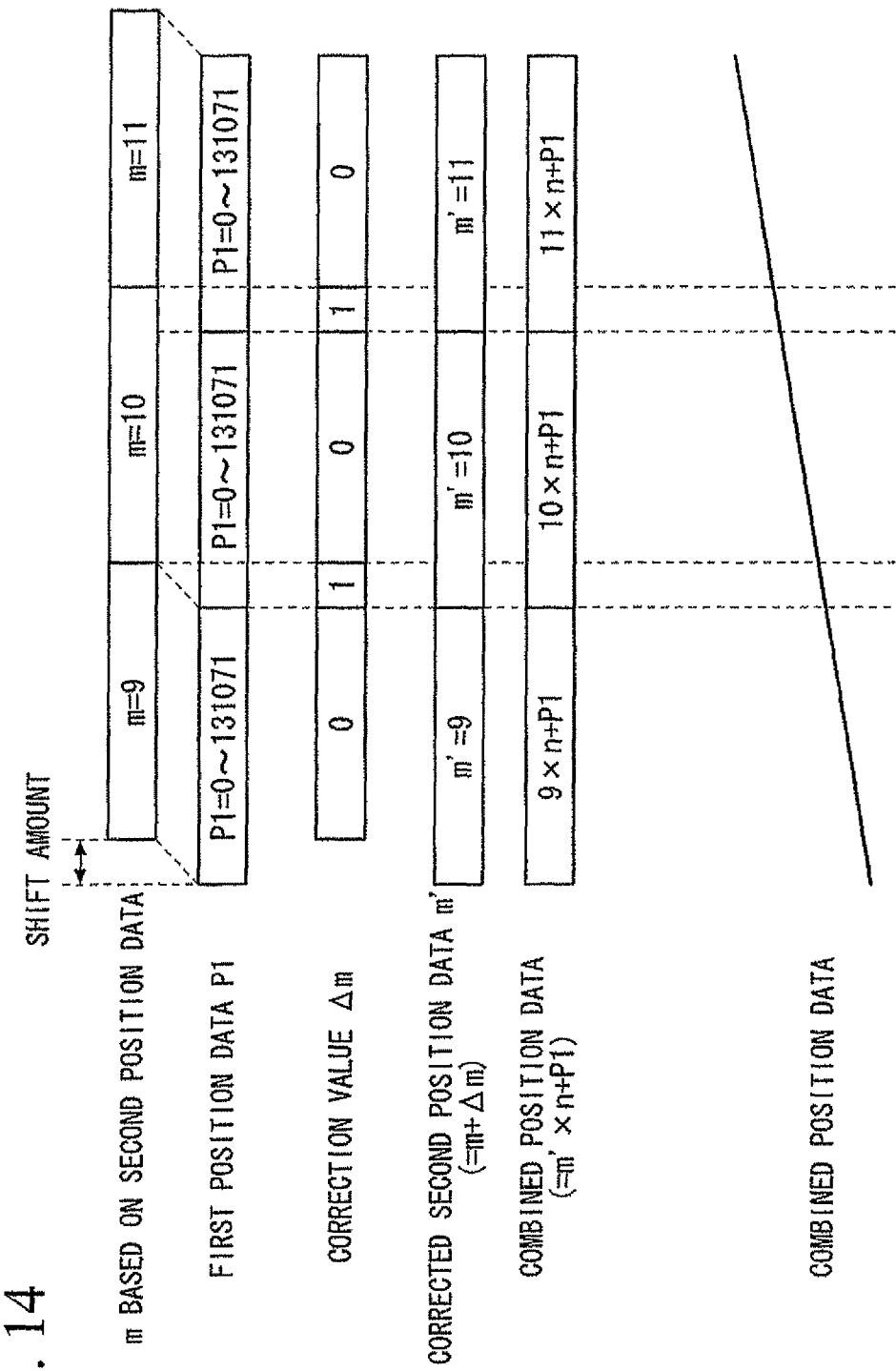
FIG. 14 is a diagram illustrating combined position data generated by the encoder system.

In the present embodiment, through the operation of the encoder system described using FIG. 13, the encoder system can correct the value of the rotation count m even when there is a shift between the rotation count m and the estimate calculated based on the value P2 of the second position data and the value P1 of the first position data as shown in FIG. 14. Therefore, even when there is a physical shift caused by the power transmission device 2 between the rotation of the input shaft 10 and the rotation of the output shaft 11, it is possible to combine properly the displacement position in rotation of the input shaft 10 and the displacement position in rotation of the output shaft 11 to generate the combined position which is the absolute position in multiple rotations of the input shaft 10. Therefore, the combined position data will not be discontinuous as shown in FIG. 17.

Moreover, the transmission signal generation and output section 253 of the second position data detection circuit generates the transmission signal representing the value of the rotation count and whether the rotational position of the input shaft corresponding to the rotation count is in the anterior half region of the rotation in one rotation of the input shaft or the posterior half region and outputs the transmission signal to the second position data correction circuit 262. In this way, the second signal processing circuit 5 which is the device that detects one of the input shaft 10 and the output shaft 11 can properly output the detection signal to the first signal processing circuit 6 which is the other device.

According to the present embodiment, it is possible to provide an encoder system, a signal processing method, and a transmission signal generation and output device capable of outputting the detection signal properly from the device that detects one of the input shaft and the output shaft to the other device, combining the combined position based on this output, and correcting the shift.

According to the present embodiment, it is possible to provide an encoder system, a signal processing method, and a transmission signal generation and output device capable of combining the displacement position in rotation of the input shaft and the displacement position in rotation of the output shaft properly even when there is a physical shift caused by the power transmission device between the rotation of the input shaft and the rotation of the output shaft to generate the combined position which is the absolute position in multiple rotations of the input shaft.

In the present embodiment, the transmission signal generation and output section of the second position data detection circuit generates and outputs the transmission signal corresponding to the rotation of the input shaft based on the second position data detected by the second position data detection circuit. Therefore, it is possible to output the detection signal properly from the device that detects one of the input shaft and the output shaft to the other device, to combine the combined position based on this output, and to correct the shift.

In the present embodiment, the second position data correction circuit corrects the second position data detected by the second position data detection circuit, and the position data combination circuit combines the first position data and the corrected second position data. Therefore, an external battery for storing the absolute position information is not required. Moreover, even when there is a physical shift caused by the power transmission device between the rotation of the input shaft and the rotation of the output shaft, it is possible to combine the displacement position in rotation of the input shaft and the displacement position in rotation of the output shaft properly to generate the combined position which is the absolute position in multiple rotations of the input shaft.

<Configuration for Improving Reliability and Stability>

Next, a configuration of an embodiment that improves the reliability and stability will be described using the block diagram shown in FIG. 15. In the embodiment described using FIGS. 1 to 10, the signal transmitted from the second signal processing circuit 5 is input to the first signal processing circuit 6 and is subjected to signal processing by a substrate circuit in the first signal processing circuit 6. After that, the processed signal is transmitted from the first signal processing circuit 6 to the controller 8 which is a high-order device through the communication line 9 which is a single cable.

If there is a failure in a component on the substrate of the first signal processing circuit 6, there is a fault in the connector connecting the substrate and the cable, or the cable connecting the first signal processing circuit 6 and the controller 8 is broken, it is unable to transmit the signal from the second signal processing circuit 5 to the controller 8. Thus, there is a possibility that the reliability and standby state of the overall circuit of the encoder system is impaired.

Figure 15:
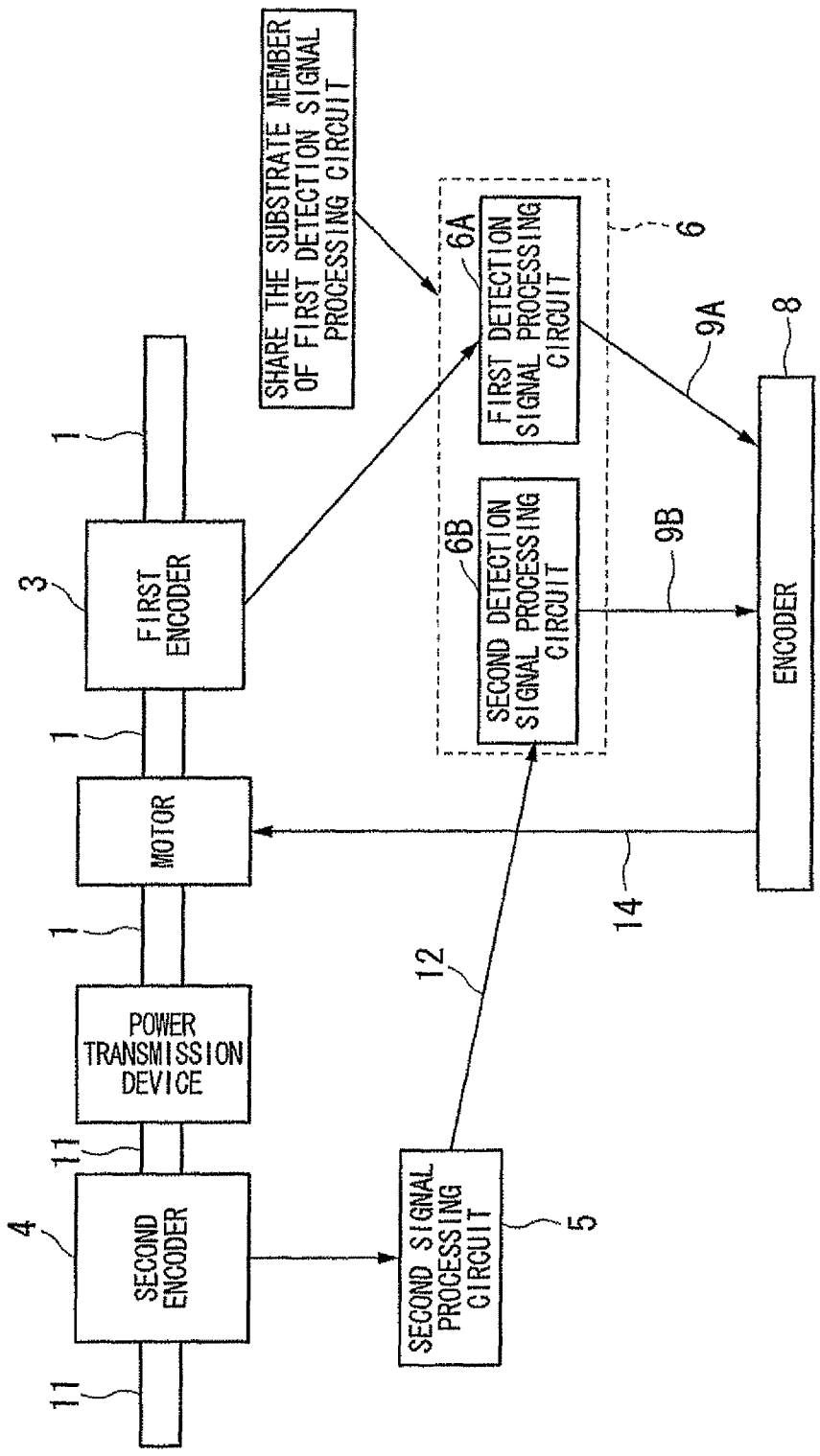
FIG. 15 is a diagram showing a configuration for improving the reliability and stability of the encoder system.

Therefore, the configuration shown in FIG. 15 eliminates such a problem and improves the reliability and stability. That is, the first signal processing circuit 6 has a configuration in which the signal from the first encoder 3 and the signal from the second encoder 4 are not processed on the same substrate but are transmitted to the controller 8 through separated substrates, separate connectors, and separate cables.

For example, a first detection signal processing circuit 6A (first processing circuit) that has at least the first position data detection circuit 261 has a first external communication circuit that outputs the first position data detected by the first position data detection circuit 261 to the controller 8 which is a high-order device through a communication line 9A which is a first communication line. Moreover, a second detection signal processing circuit 613 (second processing circuit) that has at least the second position data correction circuit 262 has a second external communication circuit that outputs the second position data detected by the second position data correction circuit 262 to the controller 8 which is a high-order device through a communication line 9B which is a second communication line. Moreover, the first detection signal processing circuit 6A and the second detection signal processing circuit 6B are formed on different substrates.

Therefore, the detection signal detected by the first encoder 3 and the detection signal detected by the second encoder 4 are processed by totally different systems and are independent. Even when a failure occurs in one of the two detection and processing sections and it is unable to transmit one of the two detection signals, the failure will not have any influence on the transmission of the detection signal from the other detection section. In this way, the controller 8 can detect the failure in one of the two detection sections by comparing the two detection signals. Therefore, it is possible to improve the reliability and stability of the encoder system.

Due to space reasons, as shown by a dotted frame in the drawing, only a substrate member of the first signal processing circuit 6 may be shared so that the first detection signal processing circuit 6A and the second detection signal processing circuit 6B are completely separated in the shared substrate.

In order to improve the reliability and stability of the encoder system as described above, the following configuration may be used. That is, the first signal processing circuit 6 that has at least the first position data detection circuit 261 has a third external communication circuit (the external communication circuit 265) that outputs the first position data detected by the first position data detection circuit 261 to the controller 8 which is a high-order device. Moreover, the second signal processing circuit 5 that has at least the second position data detection circuit 250 has a fourth external communication circuit that outputs the second position data detected by the second signal processing circuit 250 to the controller 8 which is a high-order device. Moreover, the first external communication circuit and the second external communication circuit are formed on different substrates.

The first encoder 3 and the second encoder 4 may be a magnetic encoder or may be an optical encoder.

The same kinds of information are stored in the transmission ratio information storage sections 256 and 266, the first resolution storage sections 257 and 267, and the second resolution storage sections 258 and 268, respectively. Therefore, the transmission ratio information storage sections 256 and 266, the first resolution storage sections 257 and 267, and the second resolution storage sections 258 and 268 may be configured as an integrated section, respectively, and the respective integrated storage sections may be provided in any one of the first and second signal processing circuits 6 and 5 or the encoder system. Moreover, the first and second signal processing circuits 6 and 5 may read out information from these respective integrated storage sections, respectively.

In the description above, the second position data correction circuit 262 has been described to measure the rotation count of the input shaft 10 based on the transmission signal input from the transmission signal generation and output section 253 and to correct the measured rotation count through predetermined correction processing based on the measured rotation count and the first position data detected by the first position data detection circuit.

However, the transmission signal input from the transmission signal generation and output section 253 may be input to the position data combination circuit 263. In this case, the position data combination circuit 263 measures the rotation count of the input shaft 10 based on the transmission signal input from the transmission signal generation and output section 253 and combines the measured rotation count and the first position data detected by the first position data detection circuit to generate the combined position data representing the rotation count of the input shaft 10 and the angular position of the input shaft 10.

Moreover, in this case, the position data combination circuit 263 receives the transmission signal as the plurality of signals, detects an increment or a decrement of the number of rotations of the input shaft 10 based on a combination of the plurality of received signals, and adds the detected increment or decrement of the number of rotations to the value of the rotation count of the input shaft 10 read out from the rotation count storage section 264, thus calculating the rotation count of the input shaft 10.

It is assumed that these storage sections are configured by a nonvolatile memory such as a hard disk device, an opto-magnetic disk device, or a flash memory, a volatile memory such as a read-only storage medium (for example, CD-ROM), or RAM (Random Access Memory), or a combination thereof.

The respective constituent circuits of the first signal processing circuit 6 and the second signal processing circuit 5 shown in FIG. 6 may be realized by special-purpose hardware and may be realized by memories and microprocessors.

Moreover, the respective constituent circuits of the first signal processing circuit 6 and the second signal processing circuit 5 may be realized by special-purpose hardware. Furthermore, the respective constituent circuits of the first signal processing circuit 6 and the second signal processing circuit 5 may be configured by memories and CPUs (Central Processing Unit), and programs for realizing the functions of the respective constituent circuits of the first signal processing circuit 6 and the second signal processing circuit 5 may be loaded into the memories and executed, whereby the functions are realized.

Next, a further embodiment will be described. The same constituent elements as the above-described embodiment will be denoted by the same reference numerals, and description thereof will be omitted or simplified.

In the present embodiment, as shown in FIG. 5, an encoder system includes a motor 1, a power transmission device 2, a first encoder (first absolute position encoder) 3, a second encoder (second absolute position encoder) 4, an input shaft (first shaft) 10, and an output shaft (second shaft) 11. Moreover, the encoder system includes a controller 8 which is a high-order device, a communication line 9 which is a communication line between the controller 8 and the first encoder 3, and a motor control line 14 for connecting the controller 8 and the motor 1. Furthermore, the first encoder 3 and the second encoder 4 are connected by a communication line 12 and a setting control line 13.

In the present embodiment, the encoder system also functions as a multiple-rotation absolute encoder as the whole encoder system using the first encoder 3 which is a single-rotation absolute encoder and the second encoder 4 which is a single-rotation absolute encoder. Therefore, this encoder system does not require an external battery for storing the absolute position information which was required in the encoder system of the conventional art.

In the present embodiment, the encoder system includes a first signal processing circuit 6 and a second signal processing circuit 5 (second position data detection circuit 350 described later). For example, the first encoder 3 has the first signal processing circuit 6 therein. Moreover, the second encoder 4 has the second signal processing circuit 5 therein.

The second signal processing circuit 5 receives the second detection signal detected by the second encoder 4. Moreover, the second signal processing circuit 5 detects second position data representing the positional displacement in the rotation of the output shaft 11 through predetermined signal processing (second signal processing) based on the second detection signal input from the second encoder 4. That is, the second signal processing circuit 5 interpolates the second detection signal to detect the second position data.

Moreover, the second signal processing circuit 5 outputs the detected second position data to the first encoder 3 through the communication line 12. When detecting the second position data, the second signal processing circuit 5 detects the second position data at a predetermined resolution that is, for example, at least twice of the transmission ratio of the power transmission device 2. Here, the reason why the resolution is made at least twice of the transmission ratio is to enable determining whether the rotation represented by the second position data is in the anterior half region of the rotation or the posterior half region as will be described later.

Moreover, the first encoder 3 has the first signal processing circuit 6 therein. The signal processing circuit 6 receives the second position data detected by the second encoder 4 through the communication line 12. Moreover, the first signal processing circuit 6 interpolates the first detection signal detected by the first encoder 3 to detect first position data representing the angular position of the input shaft 10.

Moreover, the first signal processing circuit 6 detects combined position data representing the rotation count of the input shaft 10 and the angular position within one rotation of the input shaft 10 based on the detected first position data and the input second position data. Then, the first signal processing circuit 6 outputs the detected combined position data to the controller 8 through the communication line 9.

In this way, the controller 8 is able to detect the rotation count of the input shaft and the angular position within one rotation of the input shaft 10 based on the combined position data from the encoder system serving as the multiple-rotation absolute encoder. Moreover, the controller 8 controls the rotation of the motor 1 through the motor control line 14 based on the input combined position data.

Moreover, the first signal processing circuit 6 determines whether the rotation direction of the input shaft 10 and the rotation direction of the output shaft 11 are the same directions or the reverse directions based on the first position data and the second position data. That is, the first signal processing circuit 6 determines whether the rotation direction of the input shaft 10 and the rotation direction of the output shaft 11 are in a normal rotational relationship. Depending on the setting of a predetermined transmission method of the power transmission device 2, the normal direction in which the output shaft 11 rotates with the rotation of the input shaft 10 may be the same direction or may be the reverse direction.

Therefore, depending on the setting of the predetermined transmission method of the power transmission device 2, the first signal processing circuit 6 may determine whether or not the rotation direction of the input shaft 10 and the rotation direction of the output shaft 11 are the same directions, thus determining whether the two rotation directions are in the normal rotational relationship. Moreover, conversely, depending on the setting of the predetermined transmission method of the power transmission device 2, the first signal processing circuit 6 may determine whether or not the rotation direction of the input shaft 10 and the rotation direction of the output shaft 11 are the reverse directions, thus determining whether the two rotation directions are in the normal rotational relationship.

The first signal processing circuit 6 and the second signal processing circuit 5 are connected by a setting control line 13. The first signal processing circuit 6 changes the setting values stored in a storage section, described later, included in the second signal processing circuit 5 through the setting control line 13.

Figure 18:
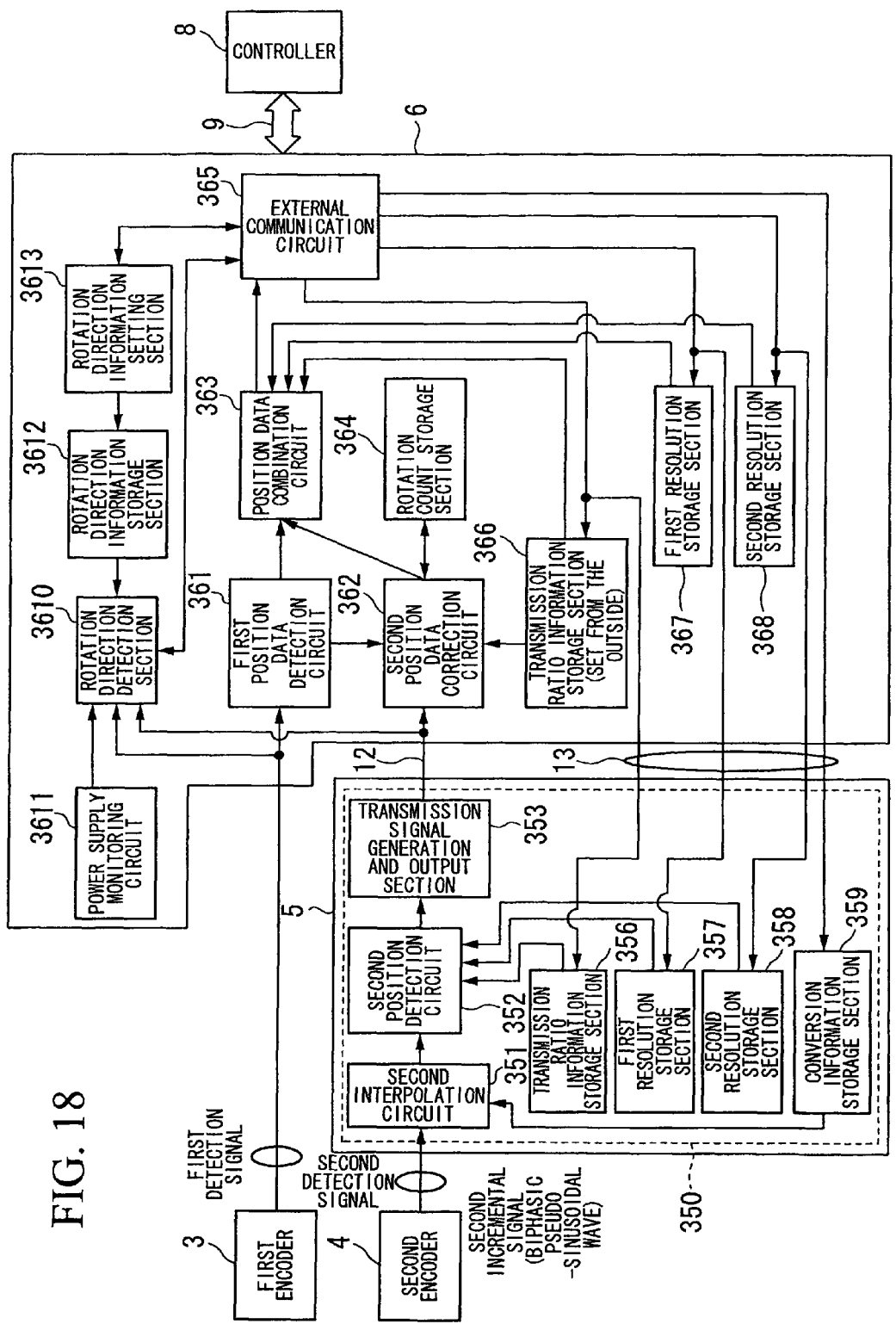
FIG. 18 is a block diagram showing a configuration of a signal processing circuit in an encoder system according to another embodiment.

Next, the configuration of the encoder system described using FIG. 5, particularly the configuration of the first and second signal processing circuits 6 and 5 will be described using FIG. 18. In FIG. 18, the same constituent elements as those in FIG. 5 will be denoted by the same reference numerals, and description thereof will be omitted.

<Configuration of First and Second Signal Processing Circuits 6 and 5>

The second signal processing circuit 5 includes a second position data detection circuit 350. The second position data detection circuit 350 includes a second interpolation circuit 351, a second position detection circuit 352, a transmission signal generation and output section 353, a transmission ratio information storage section 356, a first resolution storage section 357, and a second resolution storage section 358. On the other hand, the first signal processing circuit 6 includes a first position data detection circuit 361, a second position data correction circuit 362, a position data combination circuit 363, a rotation count storage section 364, an external communication circuit 365, a transmission ratio information storage section 366, a first resolution storage section 367, a second resolution storage section 368, a rotation direction detection section 3610, a power supply monitoring circuit 3611, a rotation direction information storage section 3612, and a rotation direction information setting section 3613.

<Respective Configurations of Second Signal Processing Circuit 5>

First, the respective configurations of the second position data detection circuit 350 of the second signal processing circuit 5 will be described. In the transmission ratio information storage section 356, information representing the value of a predetermined transmission ratio (for example, a gear ratio) of the power transmission device 2 connecting the first encoder 3 and the second encoder 4 is stored in advance as transmission ratio information. In the first resolution storage section 357, the resolution of the first position data detection circuit 361 is stored in advance as a first resolution. In the second resolution storage section 358, the resolution of the second position data detection circuit 350 is stored in advance as a second resolution.

The second interpolation circuit 351 interpolates the second detection signal input from the second encoder 4 to detect the second position data. The second position detection circuit 352 calculates a value of the integer part of a value obtained by dividing a value which is obtained by multiplying the second position data detected by the second interpolation circuit 351 and the transmission ratio information read out from the transmission ratio information storage section 356 by the value of the second resolution read out from the second resolution storage section 358 as the rotation count and calculates a value obtained by multiplying a value of the fractional part of the divided value and the value of the first resolution read out from the first resolution storage section 357 as the estimate. This estimate is the estimated position data of the accurate first position data detected by the first encoder 3, calculated based on the second detection signal detected by the second encoder 4.

For example, the second position detection circuit 352 calculates the rotation count m and the estimate s using Equations 7 and 8 below.

$$m = \text{INT}(n(P2/R2)) \quad \text{(Equation 7)}$$

$$s = R1 \times (n(P2/R2) - m) \quad \text{(Equation 8)}$$

In Equations 7 and 8, P2 is the second position data detected by the second interpolation circuit 351, R1 is the first resolution stored in the first resolution storage section 357, R2 is the second resolution stored in the second resolution storage section 358, and n is the transmission ratio information read out from the transmission ratio information storage section 356. Moreover, INT is an operator that truncates the fractional part and extracts only the integer part.

In this way, the second position data detection circuit 350 calculates the rotation count of the first encoder 3 and calculates the position data corresponding to the first position data as the estimate based on the interpolated value of the second detection signal detected by the second encoder 4 and the transmission ratio information read out from the transmission ratio information storage section 356 by using the second interpolation circuit 351 and the second position detection circuit 352.

The transmission signal generation and output section 353 generates a transmission signal representing the value of the rotation count of the input shaft 10 based on the estimate calculated by the second position detection circuit 352 and outputs the transmission signal to the second position data correction circuit 362. The transmission signal generation and output section 353 generates and outputs biphasic signals which are multiple-rotation A and B signals which are first and second rectangular signals of which the phases are different by 90°, for example, as the transmission signal (see FIG. 11). The biphasic signals are preferably biphasic rectangular signals which have a rectangular waveform so as to have resistance to external noise or the like.

In FIG. 11, when the input shaft makes one rotation, namely when the first position data assumes the values from 0 to 131071, the multiple-rotation A signal and the multiple-rotation B signal change in the signal pattern of H and L; H and H; L and H, and L and L. Here, H and L are the potentials of an electrical signal and are, for example, high and low levels, respectively. Moreover, whenever the input shaft makes one rotation, the multiple-rotation A signal and the multiple-rotation B signal repeat the above-described signal pattern.

The multiple-rotation A and B signals generated by the transmission signal generation and output section 353 have the following reliability in accordance with the transmission ratio n and the resolution R2 of the second position data detection circuit 350 in one rotation of the input shaft.

The multiple-rotation A signal is H in a period where the residue of R2/4n is 0 to 2n and is L in the other periods. On the other hand, the multiple-rotation B signal is H in a period where the residue of R2/4n is n to 3n and is L in the other periods.

For example, the transmission signal generation and output section 353 generates the above-described multiple-rotation A and B signals in the following manner. The transmission signal generation and output section 353 outputs H for the multiple-rotation A signal when a value obtained by subtracting 4n from a value obtained by multiplying the resolution R2 of the second position data detection circuit 350 with the estimate calculated by the second position detection circuit 352 is within the range of 0 to 2n, and outputs L for the multiple-rotation A signal when the value is outside the range. Moreover, the transmission signal generation and output section 353 outputs H for the multiple-rotation B signal when a value obtained by subtracting 4n from a value obtained by multiplying the resolution R2 of the second position data detection circuit 350 with the estimate calculated by the second position detection circuit 352 is within the range of 1n to 3n, and outputs L for the multiple-rotation B signal when the value is outside the range.

<Respective Configurations of First Signal Processing Circuit 6>

Next, the respective configurations of the first signal processing circuit 6 will be described. In the transmission ratio information storage section 366, similarly to the transmission ratio information storage section 356, information representing the value of a predetermined transmission ratio (for example, a gear ratio) of the power transmission device 2 connecting the first encoder 3 and the second encoder 4 is stored in advance as transmission ratio information. In the first resolution storage section 367, similarly to the first resolution storage section 357, the resolution of the first position data detection circuit 361 is stored in advance as a first resolution. In the second resolution storage section 368, similarly to the second resolution storage section 358, the resolution of the second position data detection circuit 350 is stored in advance as a second resolution.

The first position data detection circuit 361 detects first position data representing the angular position of the input shaft 10 through first predetermined signal processing (interpolation) based on the first detection signal input from the first encoder 3.

The second position data correction circuit 362 corrects the second position data detected by the second position data detection circuit 350 through predetermined correction processing based on the second position data and the first position data detected by the first position data detection circuit 361.

The position data combination circuit 363 generates combined position data based on the value of the rotation count of the first encoder 3 corrected by the second position data correction circuit 362 and the value of the first position data detected by the first position data detection circuit 361. When combining the first position data detected by the first position data detection circuit 361 and the second position data detected by the second position data detection circuit 350, the position data combination circuit 363 generates the combined position data based on the transmission ratio information read out from the transmission ratio information storage section 366.

Specifically, when combining the first position data detected by the first position data detection circuit 361 and the second position data detected by the second position data detection circuit 350, the position data combination circuit 363 generates the combined position data by a predetermined calculation method based on the transmission ratio information read out from the transmission ratio information storage section 366, the first resolution read out from the first resolution storage section 367, and the second resolution read out from the second resolution storage section 368.

For example, the position data combination circuit 363 calculates the combined position data using Equation 9 below.

$$\text{Combined Position Data} = P1 + R1 \times \text{INT}(n \times P2/R2) \quad \text{(Equation 9)}$$

Here, P1 is the first position data, P2 is the second position data, and n is a gear ratio. Moreover, R1 is the resolution of the first position data detection circuit 361, and R2 is the resolution of the second position data detection circuit 350. Moreover, INT is an operator that truncates the fractional part and extracts only the integer part.

The position data combination circuit 363 calculates a value obtained by adding the value of the first position data (P1) to the value of the integer part (INT) of a value obtained by multiplying a positional ratio (P2/R2) within one rotation of the second position data detection circuit 350 with the gear ratio (n) as the combined position data using Equation 9.

Moreover, the position data combination circuit 363 outputs the combined position data generated by the position data combination circuit 363 to the controller 8 through the communication line 9 using the external communication circuit 365.

The rotation direction detection section 3610 detects whether the rotation direction of the input shaft 10 detected based on the displacement of the first position data and the rotation direction of the output shaft 11 detected based on the displacement of the second position data are the same directions or the reverse directions.

The external communication circuit 365 receives information representing whether the rotation direction of the input shaft 10 and the rotation direction of the output shaft 11 are determined to be the same directions or the reverse directions from the controller 8 as a control signal. For example, the controller 8 transmits the control signal to the external communication circuit 365 through the communication line 9. Then, in response to the reception of the control signal by the external communication circuit 365, the rotation direction detection section 3610 detects whether the rotation direction of the input shaft 10 and the rotation direction of the output shaft 11 are the same directions or the reverse directions.

In this way, by transmitting the control signal from the controller 8, it is possible to execute the detection by the rotation direction detection section 3610. The transmission of the control signal from the controller 8 may be performed every predetermined period, for example, and may be performed manually by the operation of an operator. Therefore, the encoder system of the present embodiment is able to execute the detection by the rotation direction detection section 3610 periodically or at an arbitrary time.

The power supply monitoring circuit 3611 detects whether power is supplied to the encoder system. Then, when the supply of power is detected by the power supply monitoring circuit 3611, the rotation direction detection section 3610 detects whether or not the rotation direction of the input shaft 10 and the rotation direction of the output shaft 11 are the same directions or the reverse directions. In this way, it is possible to execute the detection by the rotation direction detection section 3610 whenever the encoder system is started up.

In the rotation direction information storage section 3612, information representing whether the rotation direction of the input shaft 10 and the rotation direction of the output shaft 11 is stored in advance as rotation direction information. When the rotation direction information read out from the rotation direction information storage section 3612 represents that the rotation direction of the input shaft 10 and the rotation direction of the output shaft 11 are the same directions, the rotation direction detection section 3610 detects whether or not the detected rotation direction of the input shaft 10 and the detected rotation direction of the output shaft 11 are the same directions. When the rotation direction information read out from the rotation direction information storage section 3612 represents that the rotation direction of the input shaft 10 and the rotation direction of the output shaft 11 are the reverse directions, the rotation direction detection section 3610 detects whether or not the detected rotation direction of the input shaft 10 and the detected rotation direction of the output shaft 11 are the reverse directions.

In this way, even when the rotation direction of the input shaft 10 and the rotation direction of the output shaft 11 are the same directions or the reverse directions, the rotation direction detection section 3610 can properly detect the relationship in the rotation directions of the input shaft 10 and the output shaft 11.

Moreover, the external communication circuit 365 receives information representing whether or not the rotation direction of the input shaft 10 and the rotation direction of the output shaft 11 are the same directions or the reverse directions from the controller 8 as setting information. For example, the controller 8 transmits the setting information to the external communication circuit 365 through the communication line 9. Then, the rotation direction information setting section 3613 stores the setting information received by the external communication circuit 365 in the rotation direction information storage section 3612 as the rotation direction information.

In this way, the controller 8 can set the setting information. Therefore, even when the rotation direction of the input shaft 10 and the rotation direction of the output shaft 11 are the same directions or the reverse directions, it is possible to change the setting easily. Therefore, it is possible to make changes of the power transmission device 2 easy.

Moreover, when the rotation direction information read out from the rotation direction information storage section 3612 represents that the rotation direction of the input shaft 10 and the rotation direction of the output shaft 11 are the same directions, and the detection result shows that the rotation direction of the input shaft 10 and the rotation direction of the output shaft 11 are not the same directions, the rotation direction detection section 3610 transmits the detection result to the controller 8 through the communication line 9 using the external communication circuit 365 as an abnormality signal. Moreover, when the rotation direction information read out from the rotation direction information storage section 3612 represents that the rotation direction of the input shaft 10 and the rotation direction of the output shaft 11 are the reverse directions, and the detection result shows that the rotation direction of the input shaft 10 and the rotation direction of the output shaft 11 are not the reverse directions, the rotation direction detection section 3610 transmits the detection result to the controller 8 as an abnormality signal. In this way, the controller 8 or the operator operating the controller 8 can detect abnormalities in the rotation of the encoder system.

In response to reception of the abnormality signal, the controller 8 stops the rotation of the motor 1 through the motor control line 14. In this way, by allowing the controller 8 to stop the rotation of the motor 1 in response to reception of the abnormality signal, it is possible to prevent failures of the encoder system or secondary problems caused by abnormal operations.

The external communication circuit 365 executes processing for communication with the controller 8 through the communication line 9. Moreover, the external communication circuit 365 stores the transmission ratio information received from the controller 8 through the communication line 9 in the transmission ratio information storage section 366 and stores the transmission ratio information in the transmission ratio information storage section 356 through the setting control line 13.

Furthermore, the external communication circuit 365 stores the first resolution received from the controller 8 through the communication line 9 in the first resolution storage section 367 and stores the first resolution in the first resolution storage section 357 through the setting control line 13. In addition, the external communication circuit 365 stores the second resolution received from the controller 8 through the communication line 9 in the second resolution storage section 368 and stores the second resolution in the second resolution storage section 358 through the setting control line 13.

The transmission ratio information storage sections 366 and 356 are nonvolatile memories, for example. Therefore, once the value of the transmission ratio information stored in the transmission ratio information storage section 366 is set, it will not be erased even when the encoder system is powered off. According to this configuration, it is possible to broaden the choices for the power transmission device 2 and the transmission ratio of the power transmission device 2 usable in the encoder system.

Moreover, the first resolution storage sections 357 and 367 and the second resolution storage sections 358 and 368 are also nonvolatile memories, for example, similarly to the transmission ratio information storage sections 366 and 356. Therefore, it is similarly possible to broaden the choices for the values of the resolutions of the first and second position data detection circuits 361 and 350 usable in the encoder system.

In the rotation count storage section 364, the value of the rotation count of the input shaft 10 detected by the second encoder 4 is stored. Moreover, the second position data correction circuit 362 detects the value of the rotation count by increasing or decreasing the value of the rotation count stored in the rotation count storage section 364 by 1 in response to the reception of the transmission signal from the second signal processing circuit 5.

In the rotation count storage section 364, the value of the rotation count of the input shaft 10 detected by the second encoder 4 at the startup time of the encoder system is stored. For example, when the encoder system is started up, the transmission signal generation and output section 353 of the second signal processing circuit 5 outputs a multiple-rotation signal corresponding to the rotation count, which repeats the signal pattern of the multiple-rotation A and B signals described using FIG. 11 at a cycle of 1 KHz as an initial value setting signal. Moreover, the second position data correction circuit 362 stores a value corresponding to the initial value setting signal received from the transmission signal generation and output section 353 of the second signal processing circuit 5 in the rotation count storage section 364. As a result, the rotation count information is stored in the rotation count storage section 364.

After that, the second position data correction circuit 362 detects the value of the rotation count by increasing or decreasing the value of the rotation count stored in the rotation count storage section 364 in response to the reception of the transmission signal from the second signal processing circuit 5.

In this way, the second signal processing circuit 5 is able to transmit the value of the rotation count itself to the first signal processing circuit 6 using the transmission signal which is biphasic signal representing the value of the rotation count is increased or decreased.

<Details of Second Position Data Correction Circuit 362>

Next, the configuration of the second position data correction circuit 362 will be described in further detail. For example, there is a possibility that a shift occurs between the first position data representing the rotational position of the input shaft 10 and the second position data representing the rotational position of the output shaft 11. This shift results, for example, from the engagement between the input shaft 10 and the power transmission device 2 and the engagement between the power transmission device 2 and the output shaft 11 and occurs physically.

Therefore, as shown in FIG. 9, there is a possibility that a shift occurs between the time when the rotation count (m) calculated based on the second position data changes and the time when the first position data (P1) representing the rotational position of the input shaft 10 changes. When there is such a shift, the position data combination circuit 363 is unable to generate the combined position data properly. Therefore, the second position data correction circuit 362 calculates a correction value Δm and corrects the rotation count (m) by adding the calculated correction value Δm to the rotation count as shown in FIG. 10 so that the position data combination circuit 363 can generate the combined position data properly even when there is such a shift.

Next, a rotation count correction method by the second position data correction circuit 362 will be described using FIGS. 9 and 10. In this example, a case in which the value of the first position data is 17 bit will be described.

As shown in FIG. 9, the output shaft 11 rotates with the rotation of the input shaft 10, and the rotation count m is calculated based on the value P2 of the second position data. Moreover, the value P1 of the first position data repeats the values from 0 to 131071 ($=2^{17}-1$). That is, when the value P1 of the first position data repeats the values from 0 to 131071 ($=2^{17}-1$), the rotation count m changes in the order of 10, 11, 12. There is a shift between the position of change (for example, the time when the value P1 of the first position data becomes 0) in the input shaft rotation count detected based on the value P1 of the first position data and the time when the rotation count m changes.

As shown in FIG. 10, for example, when the value P1 of the first position data is within the range of 0 to 32767 ($=2^{17}\times1/4-1$), and the calculated rotation count m is in the posterior half region, the second position data correction circuit 362 corrects the value of the rotation count m by adding a correction value Δm ($=1$) to the value of the rotation count m. Here, the calculated rotation count m being in the posterior half region means that the value of the calculated rotation count m is actually m but is close to m+1.

Moreover, as shown in FIG. 10, for example, when the value P1 of the first position data is within the range of 98304 ($=2^{17}\times3/4-1$) to 131071 ($=2^{17}-1$), and the calculated rotation count m is in the anterior half region, the second position data correction circuit 362 corrects the value of the rotation count m by adding a correction value Δm ($=-1$) to the value of the rotation count m. Here, the calculated rotation count m being in the anterior half region means that the value of the calculated rotation count m is actually m but is close to m−1.

The determination as to whether the calculated rotation count m is in the posterior half region or the anterior half region is made based on the value of the estimate. For example, when the value of the estimate calculated by the second position detection circuit 352 is smaller than 0.5 (half cycle), the second position data correction circuit 362 determines that the rotation count m is in the anterior half region. When the value of the estimate is equal to or larger than 0.5 (half cycle), the rotation count m is determined to be in the posterior half region.

In FIG. 10, it was determined whether the rotational position of the input shaft 10 detected based on the value of the rotation count detected by the first encoder 3 in the anterior 1/4 region (0 to 32767) of the rotation in one rotation of the input shaft 10 or the posterior 1/4 region (98304 to 131071). However, in order to detect the shift, it may be determined whether the rotational position of the input shaft 10 detected based on the value of the rotation count detected by the first encoder 3 is in the anterior half region of the rotation in one rotation of the input shaft 10 or the posterior half region.

Therefore, the second position data correction circuit 362 may determine whether the rotational position of the input shaft 10 estimated based on the value of the estimate calculated by the second position detection circuit 352 is in the anterior half region of the rotation in one rotation of the input shaft 10 or the posterior half region and determine whether the rotational position of the input shaft 10 detected based on the value of the rotation count detected by the first encoder 3 is in the anterior half region of the rotation in one rotation of the input shaft 10 or the posterior half region. Moreover, when the two determination results are different, the second position data correction circuit 362 may correct the value of the rotation count calculated by the second position detection circuit 352.

Specifically, when the rotational position of the input shaft 10 estimated based on the value of the estimate calculated by the second position detection circuit 352 is in the posterior half region of the rotation in one rotation of the input shaft 10, and the rotational position of the input shaft 10 detected based on the value of the first position data detected by the first position data detection circuit 361 is in the anterior half region of the rotation in one rotation of the input shaft 10, the second position data correction circuit 362 corrects the value of the rotation count calculated by the second position detection circuit 352 by adding 1 to the value of the rotation count.

On the other hand, when the rotational position of the input shaft 10 estimated based on the value of the estimate calculated by the second position detection circuit 352 is in the anterior half region of the rotation in one rotation of the input shaft 10, and the rotational position of the input shaft 10 detected based on the value of the first position data detected by the first position data detection circuit 361 is in the posterior half region of the rotation in one rotation of the input shaft 10, the second position data correction circuit 362 corrects the value of the rotation count calculated by the second position detection circuit 352 by adding −1 to the value of the rotation count, namely by subtracting 1 from the value of the rotation count.

Then, the second position data correction circuit 362 determines whether the rotational position of the input shaft 10 corresponding to the rotation count is in the anterior half region of the rotation in one rotation of the input shaft 10 or the posterior half region based on the transmission signal input from the transmission signal generation and output section 353 of the second position data detection circuit 350 and corrects the value of the rotation count.

For example, as shown in FIG. 11, the multiple-rotation A and B signals change in the signal pattern of H and L; H and H; L and H; and L and L whenever the input shaft makes one rotation. Therefore, when the multiple-rotation A and B signals are H and L, or H and H, respectively, the second position data correction circuit 362 determines that the rotational position is in the anterior half region of the rotation in one rotation of the input shaft. On the other hand, when the multiple-rotation A and B signals are L and H, or L and L, respectively, the second position data correction circuit 362 determines that the rotational position is in the posterior half region of the rotation in one rotation of the input shaft.

More specifically, when the multiple-rotation A and B signals are H and L, respectively, the second position data correction circuit 362 determines that the rotational position is in the starting 1/4 region of the rotation in one rotation of the input shaft. Moreover, when the multiple-rotation A and B signals are L and L, respectively, the second position data correction circuit 362 determines that the rotational position is in the ending 1/4 region of the rotation in one rotation of the input shaft.

Moreover, the second position data correction circuit 362 detects that the input shaft has made one rotation by detecting that the input multiple-rotation A and B signals have changed sequentially in the signal pattern of H and L; H and H; L and H; and L and L. On the other hand, the second position data correction circuit 362 detects that the input shaft has made one rotation in a reverse direction, namely −1 rotation, by detecting that the input multiple-rotation A and B signals have changed sequentially in the signal pattern of L and L; L and H; H and H; and H and L.

Next, the operation of the second position data correction circuit 362 and the position data combination circuit 363 will be described with respect to cases in which the rotation direction of the input shaft 10 and the rotation direction of the output shaft 11 are normally in the same directions and are normally in the reverse directions using FIGS. 19 to 22.

Figure 19:
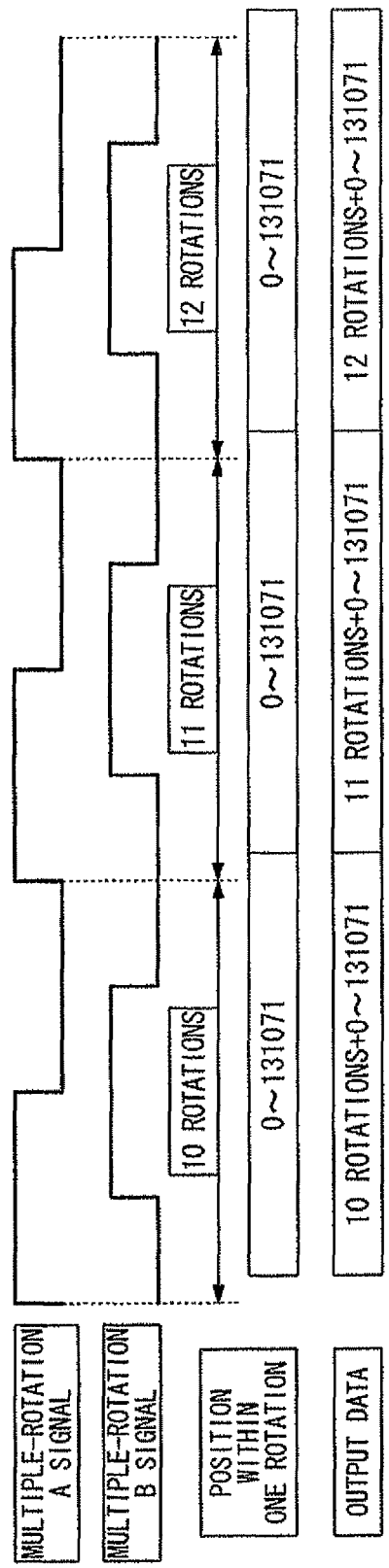
FIG. 19 is a waveform diagram showing a biphasic signal and the like when the rotation direction of an input shaft is identical to the rotation direction of an output shaft.

First, the case where the rotation direction of the input shaft 10 and the rotation direction of the output shaft 11 are normally in the same directions will be described using FIGS. 19 and 20. In this case, for example, as shown in FIG. 19, when the value of the first position data (the position within one rotation is shown in the drawing) changes from 0 to 131017 with the rotation of the input shaft 10, the transmission signal generation and output section 353 of the second encoder 4 outputs multiple-rotation A and B signals which change sequentially in the signal pattern of H and L; H and H; L and H; and L and L to the second position data correction circuit 362 of the first encoder 3.

Moreover, the second position data correction circuit 362 of the first encoder 3 detects that the input shaft 10 has made 10 rotations based on changes in the multiple-rotation A and B signals. After that, in response to a further rotation of the input shaft 10, the second position data correction circuit 362 similarly detects that the input shaft 10 has made 11 rotations and 12 rotations.

In this case, the second position data correction circuit 362 corrects the value of the rotation count at based on a correction table shown in FIG. 20. This correction is the same as the correction described using FIG. 10.

Moreover, in this case, the position data combination circuit 363 generates combined position data representing that the data have values of 0 to 131017 after 10 rotations, 0 to 131017 after 11 rotations, and 0 to 131017 after 12 rotations.

Figure 21:
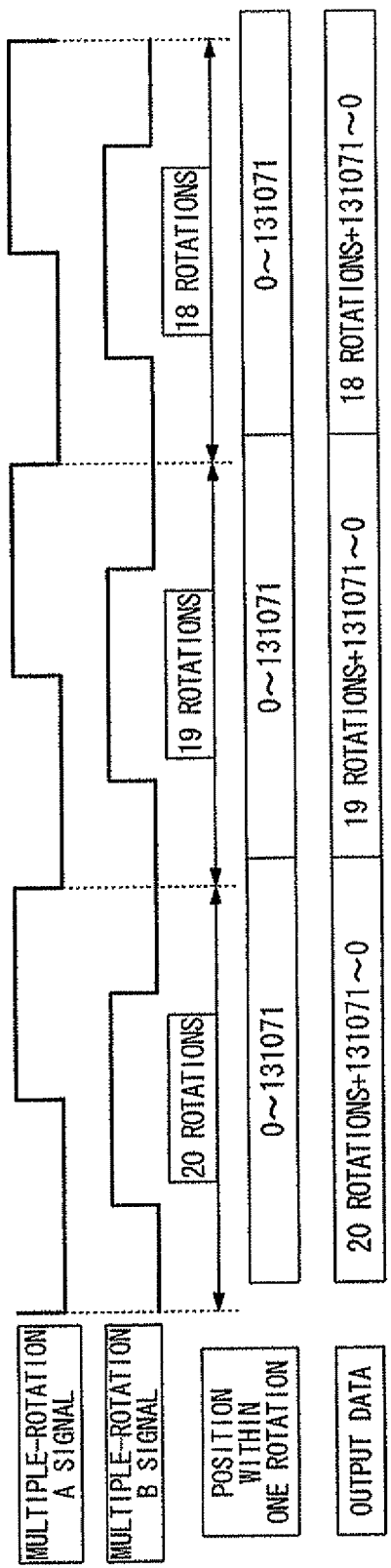
FIG. 21 is a waveform diagram showing a biphasic signal and the like when the rotation direction of an input shaft is reverse to the rotation direction of an output shaft.

First, the case where the rotation direction of the input shaft 10 and the rotation direction of the output shaft 11 are normally in the reverse directions will be described using FIGS. 21 and 22. In this case, for example, as shown in FIG. 21, when the value of the first position data (the position within one rotation is shown in the drawing) changes from 0 to 131017 with the reverse rotation of the input shaft 10, the transmission signal generation and output section 353 of the second encoder 4 outputs multiple-rotation A and B signals which change sequentially in the signal pattern of L and L; L and H; H and H; and H and L to the second position data correction circuit 362 of the first encoder 3.

Moreover, the second position data correction circuit 362 of the first encoder 3 detects that the input shaft 10 has made 20 rotations based on changes in the multiple-rotation A and B signals. After that, in response to a further rotation of the input shaft 10, the second position data correction circuit 362 similarly detects that the input shaft 10 has made 19 rotations and 18 rotations.

As described above, when the rotation direction of the input shaft 10 and the rotation direction of the output shaft 11 are reverse to each other, the rotation count decreases from the second position data based on the output shaft 11 whereas the rotation count increases from the first position data based on the input shaft 10. In this example, in order to make the combined position data generated by the position data combination circuit 363 comply with the rotation direction of the output shaft 11, the first position data is converted as denoted by "corrected motor position within one rotation" in FIG. 22.

As shown in FIG. 22, when the rotation direction of the input shaft 10 and the rotation direction of the output shaft 11 are reverse to each other, the first position data are converted so that 0 is changed to 131071 and 131071 is changed to 0. That is, the first position data is converted so that a value obtained by subtracting the value of the first position data from the maximum value of the first position data substitutes the value of the first position data.

In this case, the second position data correction circuit 362 corrects the value of the rotation count m based on a correction table shown in FIG. 22. This correction is the same as the correction described using FIG. 10.

Moreover, in this case, the position data combination circuit 363 generates combined position data representing that the data have values of 0 to 131017 after 20 rotations, 0 to 131017 after 19 rotations, and 0 to 131017 after 18 rotations.

<Details of Rotation Direction Detection Section 3610>

Next, a method of detecting the rotation direction of the output shaft 11 based on the multiple-rotation A and B signals received by the rotation direction detection section 3610 will be described using FIG. 23. In FIG. 23, the rising edge of a signal is denoted by a symbol ↑ (up arrow), and the falling edge of a signal is denoted by a symbol ↓ (downward arrow).

For example, when the multiple-rotation A signal is on the rising edge, and the multiple-rotation B signal is on the L level, the angular position of the output shaft 11 is determined to be rotating in the direction of increasing its value. Similarly, when the multiple-rotation A and B signals are respectively on the H level and rising edge, the falling edge and H level, and the L level and falling edge, the angular position of the output shaft 11 is determined to be rotating in the direction of increasing its value.

On the other hand, when the multiple-rotation A and B signals are respectively on the rising edge and H level, the L level and rising edge, the falling edge and L level, and the H level and falling edge, the angular position of the output shaft 11 is determined to be rotating in the direction of decreasing its value.

In this way, the rotation direction detection section 3610 can detect the rotation direction of the output shaft 11 based on the displacement of the second position data having a transmission format of the multiple-rotation A and B signals. Moreover, the rotation direction detection section 3610 can detect whether the rotation direction of the input shaft 10 detected based on the displacement of the first position data and the rotation direction of the output shaft 11 detected based on the displacement of the second position data are the same directions or the reverse directions.

However, according to the detection method by the rotation direction detection section 3610 based on this direction, if the transmission ratio of the power transmission device 2 is n, for example, it is unable to know the rotation direction of the output shaft 11, namely the rotation direction of the second encoder 4 unless the output shaft 11 is rotated by an angle of 360°/4n. For example, if the value of the transmission ratio n is 100, the rotation direction becomes obscure unless the output shaft is rotated by about 0.9°. As a method of decreasing the value of 0.9°, by increasing the resolution of the second position data to be detected by the second encoder 4 (for example, the resolution is increased to 13 bit), it is possible to decrease the obscure angle to 0.04°.

The multiple-rotation A and B signals generated in this way change in a signal pattern in which they repeats H and L, H and H, L and H, and L and L twice whenever the input shaft makes one rotation, for example, rather than changing in the signal pattern in which they repeat H and L, H and H, L and H, and L and L once whenever the input shaft makes one rotation. In this manner, the transmission signal generation and output section 353 may generate and output a transmission signal which is a biphasic signal changing for a predetermined plural number of times corresponding to one rotation of the input shaft 10. In this way, the rotation direction detection section 3610 can detect the rotation direction of the output shaft 11 even when the output shaft 11 is rotated by a very small angular position.

The biphasic signal of the present embodiment is generated by the transmission signal generation and output section 353 based on the transmission ratio information and the like stored in the transmission ratio information storage section 356. Therefore, in the encoder system, even when the transmission ratio of the power transmission device 2 has a different value, the transmission signal generation and output section 353 can easily generate a biphasic signal corresponding to the different transmission ratio.

The transmission signal generation and output section 353 may generate and output a transmission signal which is serial data corresponding to the rotation of the input shaft 10 based on the second position data detected by the second position data detection circuit 350. Moreover, the rotation direction detection section 3610 may receive the transmission signal received from the transmission signal generation and output section 353 and detect the rotation direction of the output shaft 11 based on the received transmission signal.

In the conventional encoder system, the output shaft is rotated by the power transmission device such as a gear with the rotation of the input shaft in the same direction as the rotation of the input shaft. However, the output shaft may not be rotated with the rotation of the input shaft in the same direction as the rotation of the input shaft due to a failure in the input shaft, a failure in the output shaft, a failure in the power transmission device, and the like. For example, there is a possibility that the output shaft does not rotate with the rotation of the input shaft, or the output shaft rotates with the rotation of the input shaft in the opposite direction to the rotation of the input shaft. Such an abnormal rotation operation of the encoder system may cause secondary problems caused by the abnormal operation of the encoder system. Therefore, in the conventional encoder system, it is necessary to detect such an abnormal operation.

According to the present embodiment, it is possible to provide an encoder system and a signal processing method thereof, which is a multiple-rotation absolute encoder, which does not require an external battery for storing absolute position information, and which is capable of detecting whether or not the output shaft is rotating in the normal rotation direction with the rotation of the input shaft.

In the present embodiment, the encoder system having the power transmission device that rotates the output shaft at a predetermined transmission ratio in response to the rotation of the input shaft is configured to: detect the first position data representing the angular position of the input shaft and the second position data representing the angular position of the output shaft and combine the first position data and the second position data. Therefore, it is possible to provide an encoder system which is a multiple-rotation absolute encoder, which does not require an external battery for storing absolute position information. Moreover, in the present embodiment, the encoder system detects whether or not the rotation direction of the input shaft and the rotation direction of the output shaft are the same directions or the reverse directions based on the first position data and the second position data. Therefore, it is possible to detect whether or not the output shaft is rotating in the normal rotation direction with the rotation of the input shaft.

<Configuration for Improving Reliability and Stability>

Next, a configuration of an embodiment that improves the reliability and stability will be described using the block diagram shown in FIG. 15. In the embodiment described above, the signal transmitted from the second signal processing circuit 5 is input to the first signal processing circuit 6 and is subjected to signal processing by a substrate circuit in the first signal processing circuit 6. After that, the processed signal is transmitted from the first signal processing circuit 6 to the controller 8 which is a high-order device through the communication line 9 which is a single cable.

If there is a failure in a component on the substrate of the first signal processing circuit 6, there is a fault in the connector connecting the substrate and the cable, or the cable connecting the first signal processing circuit 6 and the controller 8 is broken, it is unable to transmit the signal from the second signal processing circuit 5 to the controller 8. Thus, there is a possibility that the reliability and standby state of the overall circuit of the encoder system is impaired.

Therefore, the configuration shown in FIG. 15 eliminates such a problem and improves the reliability and stability. That is, the first signal processing circuit 6 has a configuration in which the signal from the first encoder 3 and the signal from the second encoder 4 are not processed on the same substrate but are transmitted to the controller 8 through separated substrates, separate connectors, and separate cables.

For example, a first detection signal processing circuit 6A (first processing circuit) that has at least the first position data detection circuit 361 has a first external communication circuit that outputs the first position data detected by the first position data detection circuit 361 to the controller 8 which is a high-order device through a communication line 9A which is a first communication line. Moreover, a second detection signal processing circuit 6B (second processing circuit) that has at least the second position data correction circuit 362 has a second external communication circuit that outputs the second position data detected by the second position data correction circuit 362 to the controller 8 which is a high-order device through a communication line 913 which is a second communication line. Moreover, the first detection signal processing circuit 6A and the second detection signal processing circuit 6B are formed on different substrates.

Therefore, the detection signal detected by the first encoder 3 and the detection signal detected by the second encoder 4 are processed by totally different systems and are independent. Even when a failure occurs in one of the two detection and processing sections and it is unable to transmit one of the two detection signals, the failure will not have any influence on the transmission of the detection signal from the other detection section. In this way, the controller 8 can detect the failure in one of the two detection sections by comparing the two detection signals. Therefore, it is possible to improve the reliability and stability of the encoder system.

Due to space reasons, as shown by a dotted frame in the drawing, only a substrate member of the first signal processing circuit 6 may be shared so that the first detection signal processing circuit 6A and the second detection signal processing circuit 6B are completely separated in the shared substrate.

In order to improve the reliability and stability of the encoder system as described above, the following configuration may be used. That is, the first signal processing circuit 6 that has at least the first position data detection circuit 361 has a third external communication circuit (the external communication circuit 365) that outputs the first position data detected by the first position data detection circuit 361 to the controller 8 which is a high-order device.

Moreover, the second signal processing circuit 5 that has at least the second position data detection circuit 350 has a fourth external communication circuit that outputs the second position data detected by the second signal processing circuit 350 to the controller 8 which is a high-order device. Moreover, the first external communication circuit and the second external communication circuit are formed on different substrates.

The first encoder 3 and the second encoder 4 may be a magnetic encoder or may be an optical encoder.

The same kinds of information are stored in the transmission ratio information storage sections 356 and 366, the first resolution storage sections 357 and 367, and the second resolution storage sections 358 and 368, respectively. Therefore, the transmission ratio information storage sections 356 and 366, the first resolution storage sections 357 and 367, and the second resolution storage sections 358 and 368 may be configured as an integrated section, respectively, and the respective integrated storage sections may be provided in any one of the first and second signal processing circuits 6 and 5 or the encoder system. Moreover, the first and second signal processing circuits 6 and 5 may read out information from these respective integrated storage sections, respectively.

It is assumed that these storage sections are configured by a nonvolatile memory such as a hard disk device, an optomagnetic disk device, or a flash memory, a volatile memory such as a read-only storage medium (for example, CD-ROM), or RAM (Random Access Memory), or a combination thereof.

The respective constituent circuits of the first signal processing circuit 6 and the second signal processing circuit 5 shown in FIG. 11 may be realized by special-purpose hardware and may be realized by memories and microprocessors.

Moreover, the respective constituent circuits of the first signal processing circuit 6 and the second signal processing circuit 5 may be realized by special-purpose hardware. Furthermore, the respective constituent circuits of the first signal processing circuit 6 and the second signal processing circuit 5 may be configured by memories and CPUs (Central Processing Unit), and programs for realizing the functions of the respective constituent circuits of the first signal processing circuit 6 and the second Signal processing circuit 5 may be loaded into the memories and executed, whereby the functions are realized.

Next, a still further embodiment will be described. The same constituent elements as the above-described embodiment will be denoted by the same reference numerals, and description thereof will be omitted or simplified.

Figure 24:
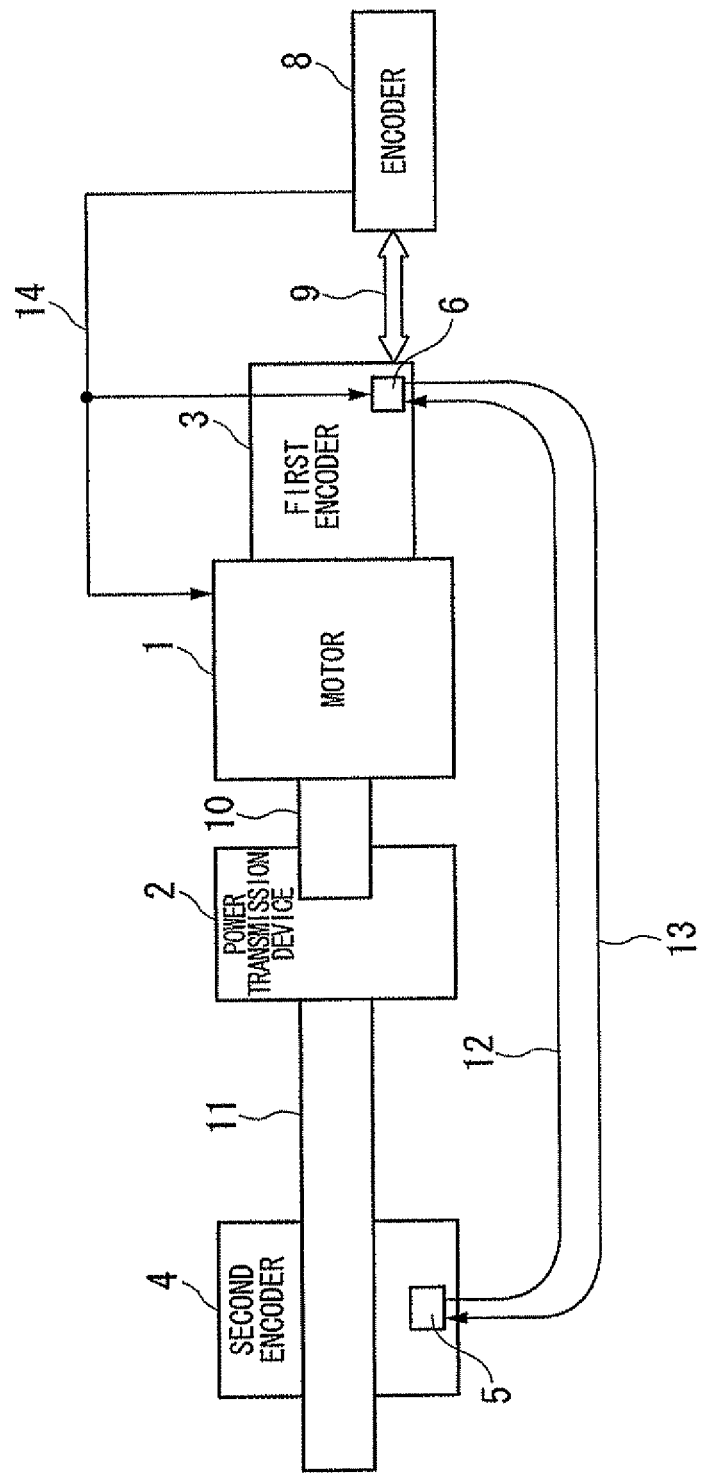
FIG. 24 is a block diagram showing a configuration of an encoder system according to another embodiment.

In the present embodiment, as shown in FIG. 24, an encoder system includes a motor 1, a power transmission device 2, a first encoder (first absolute position encoder) 3, a second encoder (second absolute position encoder) 4, an input shaft (first shaft) 10, and an output shaft (second shaft) 11. Moreover, the encoder system includes a controller 8 which is a high-order device, a communication line 9 which is a communication line between the controller 8 and the first encoder 3, and a motor control line 14 for connecting the controller 8 and the motor 1. Furthermore, the first encoder 3 and the second encoder 4 are connected by a communication line 12 and a setting control line 13.

The controller 8 outputs a rotation control signal to the motor 1 through the motor control line 14, thus controlling the rotation of the motor 1. The rotation control signal is a pulse wave for rotating the motor 1 which is a stepping motor, for example.

In the present embodiment, the encoder system also functions as a multiple-rotation absolute encoder as the whole encoder system using the first encoder 3 which is a single-rotation absolute encoder and the second encoder 4 which is a single-rotation absolute encoder. Therefore, this encoder system does not require an external battery for storing the absolute position information which was required in the encoder system of the conventional art.

In the present embodiment, the encoder system includes a first signal processing circuit 6 and a second signal processing circuit 5 (second position data detection circuit 450 described later). For example, the first encoder 3 has the first signal processing circuit 6 therein. Moreover, the second encoder 4 has the second signal processing circuit 5 therein.

The second signal processing circuit 5 receives the second detection signal detected by the second encoder 4. Moreover, the second signal processing circuit 5 detects second position data representing the positional displacement in the rotation of the output shaft 11 through predetermined signal processing (second signal processing) based on the second detection signal input from the second encoder 4. That is, the second signal processing circuit 5 interpolates the second detection signal to detect the second position data.

Moreover, the second signal processing circuit 5 outputs the detected second position data to the first encoder 3 through the communication line 12. When detecting the second position data, the second signal processing circuit 5 detects the second position data at a predetermined resolution that is, for example, at least twice of the transmission ratio of the power transmission device 2. Here, the reason why the resolution is made at least twice of the transmission ratio is to enable determining whether the rotation represented by the second position data is in the anterior half region of the rotation or the posterior half region as will be described later.

Moreover, the first encoder 3 has the first signal processing circuit 6 therein. The signal processing circuit 6 receives the second position data detected by the second encoder 4 through the communication line 12. Moreover, the first signal processing circuit 6 interpolates the first detection signal detected by the first encoder 3 to detect first position data representing the angular position of the input shaft 10.

Moreover, the first signal processing circuit 6 detects combined position data representing the rotation count of the input shaft 10 and the angular position within one rotation of the input shaft 10 based on the detected first position data and the input second position data. Then, the first signal processing circuit 6 outputs the detected combined position data to the controller 8 through the communication line 9.

In this way, the controller 8 is able to detect the rotation count of the input shaft and the angular position within one rotation of the input shaft 10 based on the combined position data from the encoder system serving as the multiple-rotation absolute encoder. Moreover, the controller 8 controls the rotation of the motor 1 through the motor control line 14 based on the input combined position data.

Moreover, the first signal processing circuit 6 receives the rotation control signal from the controller 8 through the motor control line 14. Moreover, the first signal processing circuit 6 compares the input shaft angular position which is the angular position of the input shaft 10 calculated based on the rotation control signal from the controller 8 and the first position data detected by the first position data detection circuit 461, compares the output shaft angular position which is the angular position of the output shaft 11 calculated based on the rotation control signal from the controller 8 and the second position data detected by the second position data detection circuit 450, and detects a focusing lens based on a combination of the comparison results. Furthermore, the first signal processing circuit 6 output information representing the content of the detected failure to the controller 8 through the communication line 9.

Figure 25:
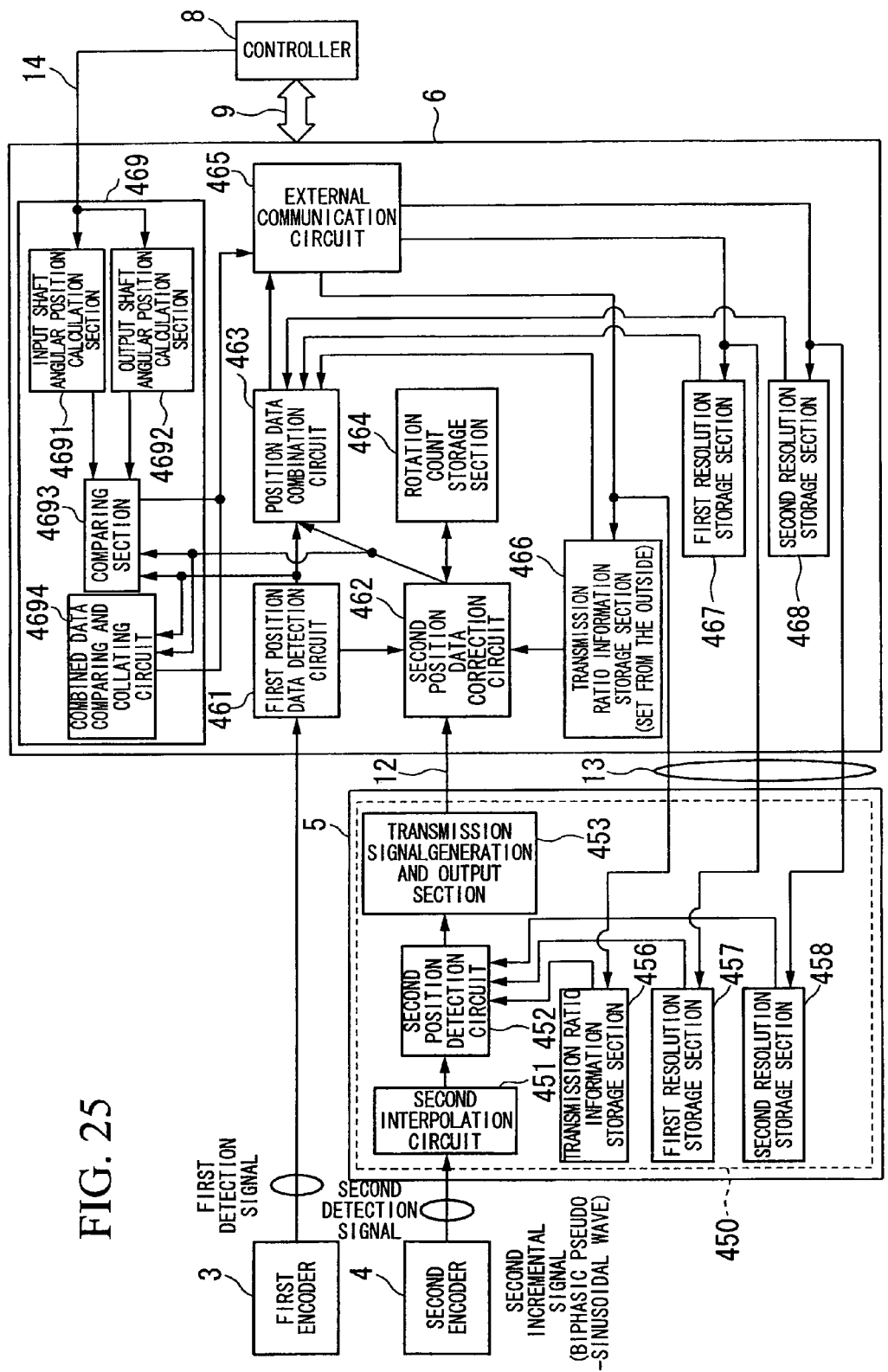
FIG. 25 is a block diagram showing a configuration of a signal processing circuit in the encoder system.

Next, the configuration of the encoder system described using FIG. 24, particularly the configuration of the first and second signal processing circuits 6 and 5 will be described using FIG. 25. In FIG. 25, the same constituent elements as those in FIG. 24 will be denoted by the same reference numerals, and description thereof will be omitted.

<Configuration of First and Second Signal Processing Circuits 6 and 5>

The second signal processing circuit 5 includes a second position data detection circuit 450. The second position data detection circuit 450 includes a second interpolation circuit 451, a second position detection circuit 452, a transmission signal generation and output section 453, a transmission ratio information storage section 456, a first resolution storage section 457, and a second resolution storage section 458. On the other hand, the first signal processing circuit 6 includes a first position data detection circuit 461, a second position data correction circuit 462, a position data combination circuit 463, a rotation count storage section 464, an external communication circuit 465, a transmission ratio information storage section 466, a first resolution storage section 467, a second resolution storage section 468, and a failure detection section 469.

<Respective Configurations of Second Signal Processing Circuit 5>

First, the respective configurations of the second position data detection circuit 450 of the second signal processing circuit 5 will be described. In the transmission ratio information storage section 456, information representing the value of a predetermined transmission ratio (for example, a gear ratio) of the power transmission device 2 connecting the first encoder 3 and the second encoder 4 is stored in advance as transmission ratio information. In the first resolution storage section 457, the resolution of the first position data detection circuit 461 is stored in advance as a first resolution. In the second resolution storage section 458, the resolution of the second position data detection circuit 450 is stored in advance as a second resolution.

The second interpolation circuit 451 interpolates the second detection signal input from the second encoder 4 to detect the second position data. The second position detection circuit 452 calculates a value of the integer part of a value obtained by dividing a value which is obtained by multiplying the second position data detected by the second interpolation circuit 451 and the transmission ratio information read out from the transmission ratio information storage section 456 by the value of the second resolution read out from the second resolution storage section 458 as the rotation count and calculates a value obtained by multiplying a value of the fractional part of the divided value and the value of the first resolution read out from the first resolution storage section 457 as the estimate. This estimate is the estimated position data of the accurate first position data detected by the first encoder 3, calculated based on the second detection signal detected by the second encoder 4.

For example, the second position detection circuit 452 calculates the rotation count m and the estimate s using Equations 10 and 11 below.

$$m = \mathrm{INT}(n(P2/R2)) \quad \text{(Equation 10)}$$

$$s = R1 \times (n(P2/R2) - m) \quad \text{(Equation 11)}$$

In Equations 10 and 11, P2 is the second position data detected by the second interpolation circuit 451, R1 is the first resolution stored in the first resolution storage section 457, R2 is the second resolution stored in the second resolution storage section 458, and n is the transmission ratio information read out from the transmission ratio information storage section 456. Moreover, INT is an operator that truncates the fractional part and extracts only the integer part.

In this way, the second position data detection circuit 450 calculates the rotation count of the first encoder 3 and calculates the position data corresponding to the first position data as the estimate based on the interpolated value of the second detection signal detected by the second encoder 4 and the transmission ratio information read out from the transmission ratio information storage section 456 by using the second interpolation circuit 451 and the second position detection circuit 452.

The transmission signal generation and output section 453 generates a transmission signal representing the value of the rotation count of the input shaft 10 based on the estimate calculated by the second position detection circuit 452 and outputs the transmission signal to the second position data correction circuit 462. The transmission signal generation and output section 453 generates and outputs biphasic signals which are multiple-rotation A and B signals which are first and second rectangular signals of which the phases are different by 90°, for example, as the transmission signal (see FIG. 11). The biphasic signals are preferably biphasic rectangular signals which have a rectangular waveform so as to have resistance to external noise or the like.

In FIG. 11, when the input shaft makes one rotation, namely when the first position data assumes the values from 0 to 131071, the multiple-rotation A signal and the multiple-rotation B signal change in the signal pattern of H and L; H and H; L and H, and L and L. Here, H and L are the potentials of an electrical signal and are, for example, high and low levels, respectively. Moreover, whenever the input shaft makes one rotation, the multiple-rotation A signal and the multiple-rotation B signal repeat the above-described signal pattern.

The multiple-rotation A and B signals generated by the transmission signal generation and output section 453 have the following reliability in accordance with the transmission ratio n and the resolution R2 of the second position data detection circuit 450 in one rotation of the input shaft.

The multiple-rotation A signal is H in a period where the residue of R2/4n is 0 to 2n and is L in the other periods. On the other hand, the multiple-rotation B signal is H in a period where the residue of R2/4n is n to 3n and is L in the other periods.

For example, the transmission signal generation and output section 453 generates the above-described multiple-rotation A and B signals in the following manner. The transmission signal generation and output section 453 outputs H for the multiple-rotation A signal when a value obtained by subtracting 4n from a value obtained by multiplying the resolution R2 of the second position data detection circuit 450 with the estimate calculated by the second position detection circuit 452 is within the range of 0 to 2n, and outputs L for the multiple-rotation A signal when the value is outside the range. Moreover, the transmission signal generation and output section 453 outputs H for the multiple-rotation B signal when a value obtained by subtracting 4n from a value obtained by multiplying the resolution R2 of the second position data detection circuit 450 with the estimate calculated by the second position detection circuit 452 is within the range of 1n to 3n, and outputs L for the multiple-rotation B signal when the value is outside the range.

The biphasic signal made up of the multiple-rotation A and B signals of the present embodiment is generated by the transmission signal generation and output section 453 based on the transmission ratio information and the like stored in the transmission ratio information storage section 456. Therefore, in the encoder system, even when the transmission ratio of the power transmission device 2 has a different value, the transmission signal generation and output section 453 can easily generate a biphasic signal corresponding to the different transmission ratio.

<Respective Configurations of First Signal Processing Circuit 6>

Next, the respective configurations of the first signal processing circuit 6 will be described. In the transmission ratio information storage section 466, similarly to the transmission ratio information storage section 456, information representing the value of a predetermined transmission ratio (for example, a gear ratio) of the power transmission device 2 connecting the first encoder 3 and the second encoder 4 is stored in advance as transmission ratio information. In the first resolution storage section 467, similarly to the first resolution storage section 457, the resolution of the first position data detection circuit 461 is stored in advance as a first resolution. In the second resolution storage section 468, similarly to the second resolution storage section 458, the resolution of the second position data detection circuit 450 is stored in advance as a second resolution.

The first position data detection circuit 461 detects first position data representing the angular position of the input shaft 10 through first predetermined signal processing (interpolation) based on the first detection signal input from the first encoder 3.

The second position data correction circuit 462 receives the second position data detected by the second position data detection circuit 450 from the transmission signal generation and output section 453 of the second position data detection circuit 450 as the multiple-rotation A and B signals. Moreover, the second position data correction circuit 462 corrects the second position data detected by the second position data detection circuit 450 through predetermined correction processing based on the second position data and the first position data detected by the first position data detection circuit 461.

The position data combination circuit 463 generates combined position data based on the value of the rotation count of the first encoder 3 corrected by the second position data correction circuit 462 and the value of the first position data detected by the first position data detection circuit 461. When combining the first position data detected by the first position data detection circuit 461 and the second position data detected by the second position data detection circuit 450, the position data combination circuit 463 generates the combined position data based on the transmission ratio information read out from the transmission ratio information storage section 466.

Specifically, when combining the first position data detected by the first position data detection circuit 461 and the second position data detected by the second position data detection circuit 450, the position data combination circuit 463 generates the combined position data by a predetermined calculation method based on the transmission ratio information read out from the transmission ratio information storage section 466, the first resolution read out from the first resolution storage section 467, and the second resolution read out from the second resolution storage section 468.

For example, the position data combination circuit 463 calculates the combined position data using Equation 12 below.

$$\text{Combined Position Data} = P1 + R1 \times \text{INT}(n \times P2/R2) \quad \text{(Equation 12)}$$

Here, P1 is the first position data, P2 is the second position data, and n is a transmission ratio. Moreover, R1 is the resolution of the first position data detection circuit 461, and R2 is the resolution of the second position data detection circuit 450. Moreover, INT is an operator that truncates the fractional part and extracts only the integer part.

The position data combination circuit 463 calculates the integer part (INT) of a value obtained by multiplying a positional ratio (P2/R2) within one rotation of the second position data detection circuit 450 with the gear ratio (n) and calculates a value obtained by adding the value of the first position data (P1) to a value obtained by multiplying the resolution (R1) of the first position data detection circuit 461 with the value of the calculated integer part as the combined position data using Equation 12.

Moreover, the position data combination circuit 463 outputs the generated combined position data to the controller 8 through the communication line 9 using the external communication circuit 465.

The failure detection section 469 receives the rotation control signal for allowing the controller 8 to control the motor 1 through the motor control line 14. Moreover, the failure detection section 469 compares the input shaft angular position which is the angular position of the input shaft 10 calculated based on the rotation control signal from the controller 8 and the first position data detected by the first position data detection circuit 461, compares the output shaft angular position which is the angular position of the output shaft 11 calculated based on the rotation control signal from the controller 8 and the second position data corrected by the second position data correction circuit 462, and detects a failure based on a combination of the comparison results. In this way, it is possible to detect whether or not the input shaft 10 and the output shaft 11 are rotating properly through the control of the controller 8.

For example, the failure detection section 469 includes an input shaft angular position calculation section 4691, an output shaft angular position calculation section 4692, and a comparing section 4693. The input shaft angular position calculation section 4691 calculates the input shaft angular position which is the angular position of the input shaft 10 based on the rotation control signal from the controller 8. Moreover, the output shaft angular position calculation section 4692 calculates the output shaft angular position which is the angular position of the output shaft 11 based on the rotation control signal from the controller 8.

When calculating the input shaft angular position based on the rotation control signal from the controller 8, the input shaft angular position calculation section 4691 may calculate the input shaft angular position by a predetermined calculation method based on the rotation control signal, the transmission ratio information read out from the transmission ratio information storage section 466, the first resolution read out from the first resolution storage section 467, and the second resolution read out from the second resolution storage section 468.

Moreover, when calculating the output shaft angular position based on the rotation control signal from the controller 8, the output shaft angular position calculation section 4692 may calculate the output shaft angular position by a predetermined calculation method based on the rotation control signal, the transmission ratio information read out from the transmission ratio information storage section 466, the first resolution read out from the first resolution storage section 467, and the second resolution read out from the second resolution storage section 468.

The comparing section 4693 compares the input shaft angular position calculated by the input shaft angular position calculation section 4691 and the first position data detected by the first position data detection circuit 461, compares the output shaft angular position calculated by the output shaft angular position calculation section 4692 and the second position data corrected by the second position data correction circuit 462, and detects a failure based on a combination of the comparison results.

For example, the comparing section 4693 of the failure detection section 469 detects whether or not the input shaft angular position is identical to the first position data and detects whether or not the output shaft angular position is identical to the second position data. Moreover, when the detection result shows that the input shaft angular position is not identical to the first position data, and the output shaft angular position is identical to the second position data, the comparing section 4693 of the failure detection section 469 outputs a signal to the controller 8, representing that there is a failure in an input shaft-side device which is any one of the first encoder 3 and the first position data detection circuit 461 or a combination thereof. On the other hand, when the detection result shows that the input shaft angular position is identical to the first position data, and the output shaft angular position is not identical to the second position data, the comparing section 4693 of the failure detection section 469 outputs a signal to the controller 8, representing that there is a failure in an output shaft-side device which is any one of the power transmission device 2, the second encoder 4, and the second position data detection circuit 450 or a combination thereof.

Moreover, when the input shaft angular position is not identical to the first position data, and the output shaft angular position is not identical to the second position data, the comparing section 4693 of the failure detection section 469 outputs a signal indicative of a failure to the controller 8.

In the case of the signal indicative of a failure output when the input shaft angular position is not identical to the first position data, and the output shaft angular position is not identical to the second position data, there is a possibility that there is a failure in any one of the motor 1, the controller 8, the first encoder 3, the first position data detection circuit 461, the power transmission device 2, the second encoder 4, and the second position data detection circuit 450 or a combination thereof.

As described above, the comparing section 4693 of the failure detection section 469 outputs a signal indicative of a failure in the input shaft-side device, a signal indicative of a failure in the output shaft-side device, or a signal indicative of a failure to the controller 8. In this way, the controller 8 is able to detect whether or not the input shaft and the output shaft are rotating properly based on the rotation control signal and detect the device in which the failure has occurred. Therefore, when repairing the failed device, the user performing the repairing can perform the repair quickly since the user can know the failed device in the encoder system.

Moreover, when detecting whether or not the input shaft angular position is identical to the first position data and whether or not the output shaft angular position is identical to the second position data, the comparing section 4693 of the failure detection section 469 detects that the input shaft angular position is identical to the first position data if a difference therebetween is equal to or smaller than a predetermined first allowable amount and detects that they are not identical if the difference is not equal to or smaller than the first allowable amount. Moreover, when detecting whether or not the input shaft angular position is identical to the first position data and whether or not the output shaft angular position is identical to the second position data, the comparing section 4693 of the failure detection section 469 detects that the input shaft angular position is identical to the second position data if a difference therebetween is equal to or smaller than a predetermined second allowable amount and detects that they are not identical if the difference is not equal to or smaller than the second allowable amount. The first allowable amount and the second allowable amount are rotation amounts corresponding to the half rotation or the 1/4 rotation of the input shaft 10, for example.

In general, there is not a great shift between the input shaft angular position and the first position data. However, a small shift may occur due to detection errors or the like. Even when there is such a shift, as described above, by detecting that the input shaft angular position is identical to the first position data if a difference therebetween is equal to or smaller than a predetermined first allowable amount and detects that they are not identical if the difference is not equal to or smaller than the first allowable amount, it is possible to detect properly whether they are identical or not considering the errors. The same can be applied to the case of comparing the output shaft angular position and the second position data.

Moreover, the failure detection section 469 includes a position data comparing and collating circuit 4694. The position data comparing and collating circuit 4694 calculates position data corresponding to the first position data to be detected by the first position data detection circuit 461 as an estimate based on the second position data detected by the second position data detection circuit 450, namely the second position data corrected by the second position data correction circuit 462 and the transmission ratio information read out from the transmission ratio information storage section 466. Moreover, the position data comparing and collating circuit 4694 calculates a difference between the calculated estimate and the first position data detected by the first position data detection circuit 461 as an error estimate.

Moreover, the position data comparing and collating circuit 4694 determines whether or not the calculated error estimate is within a predetermined range of values, and when the determination result shows that the calculated error estimate is not within the predetermined range of values, outputs a signal to the controller 8, representing that the first position data detected by the first position data detection circuit 461 is not identical to the second position data detected by the second position data detection circuit 450) or the second position data corrected by the second position data correction circuit 462).

When it is detected that the input shaft and the output shaft are not rotating properly in response to the reception of the signal indicative of a failure in the input shaft-side device, the signal indicative of a failure in the output shaft-side device, or the signal indicative of a failure from the comparing section 4693 of the failure detection section 469, the controller 8 stops the rotation of the motor 1 through the motor control line 14.

Moreover, in response to the reception of the signal representing that the first position data detected by the first position data detection circuit 461 is not identical to the second position data detected by the second position data detection circuit 450 (the second position data corrected by the second position data correction circuit 462) from the position data comparing and collating circuit 4694 of the failure detection section 469, the controller 8 stops the rotation of the motor 1 through the motor control line 14.

In this way, by allowing the controller 8 to stop the rotation of the motor 1 in response to detecting that the input shaft and the output shaft are not properly rotating, it is possible to prevent failures of the encoder system or secondary problems caused by abnormal operations.

The external communication circuit 465 executes processing for communication with the controller 8 through the communication line 9. Moreover, the external communication circuit 465 stores the transmission ratio information received from the controller 8 through the communication line 9 in the transmission ratio information storage section 466 and stores the transmission ratio information in the transmission ratio information storage section 456 through the setting control line 13.

Furthermore, the external communication circuit 465 stores the first resolution received from the controller 8 through the communication line 9 in the first resolution storage section 467 and stores the first resolution in the first resolution storage section 457 through the setting control line 13. In addition, the external communication circuit 465 stores the second resolution received from the controller 8 through the communication line 9 in the second resolution storage section 468 and stores the second resolution in the second resolution storage section 458 through the setting control line 13.

The transmission ratio information storage sections 466 and 456 are nonvolatile memories, for example. Therefore, once the value of the transmission ratio information stored in the transmission ratio information storage section 466 is set, it will not be erased even when the encoder system is powered off. According to this configuration, it is possible to broaden the choices for the power transmission device 2 and the transmission ratio of the power transmission device 2 usable in the encoder system.

Moreover, the first resolution storage sections 457 and 467 and the second resolution storage sections 458 and 468 are also nonvolatile memories, for example, similarly to the transmission ratio information storage sections 466 and 456. Therefore, it is similarly possible to broaden the choices for the values of the resolutions of the first and second position data detection circuits 461 and 450 usable in the encoder system.

In the rotation count storage section 464, the value of the rotation count of the input shaft 10 detected by the second encoder 4 is stored. Moreover, the second position data correction circuit 462 detects the value of the rotation count by increasing or decreasing the value of the rotation count stored in the rotation count storage section 464 by 1 in response to the reception of the transmission signal from the second signal processing circuit 5.

In the rotation count storage section 464, the value of the rotation count of the input shaft 10 detected by the second encoder 4 at the startup time of the encoder system is stored. For example, when the encoder system is started up, the transmission signal generation and output section 453 of the second signal processing circuit 5 outputs a multiple-rotation signal corresponding to the rotation count, which repeats the signal pattern of the multiple-rotation A and B signals described using FIG. 11 at a cycle of 1 KHz as an initial value setting signal. Moreover, the second position data correction circuit 462 stores a value corresponding to the initial value setting signal received from the transmission signal generation and output section 453 of the second signal processing circuit 5 in the rotation count storage section 464. As a result, the rotation count information is stored in the rotation count storage section 464.

After that, the second position data correction circuit 462 detects the value of the rotation count by increasing or decreasing the value of the rotation count stored in the rotation count storage section 464 in response to the reception of the transmission signal from the second signal processing circuit 5.

In this way, the second signal processing circuit 5 is able to transmit the value of the rotation count itself to the first signal processing circuit 6 using the transmission signal which is biphasic signal representing the value of the rotation count is increased or decreased.

<Details of Position Data Combination Circuit 463 and Position Data Comparing and Collating Circuit 4694>

Figure 26:
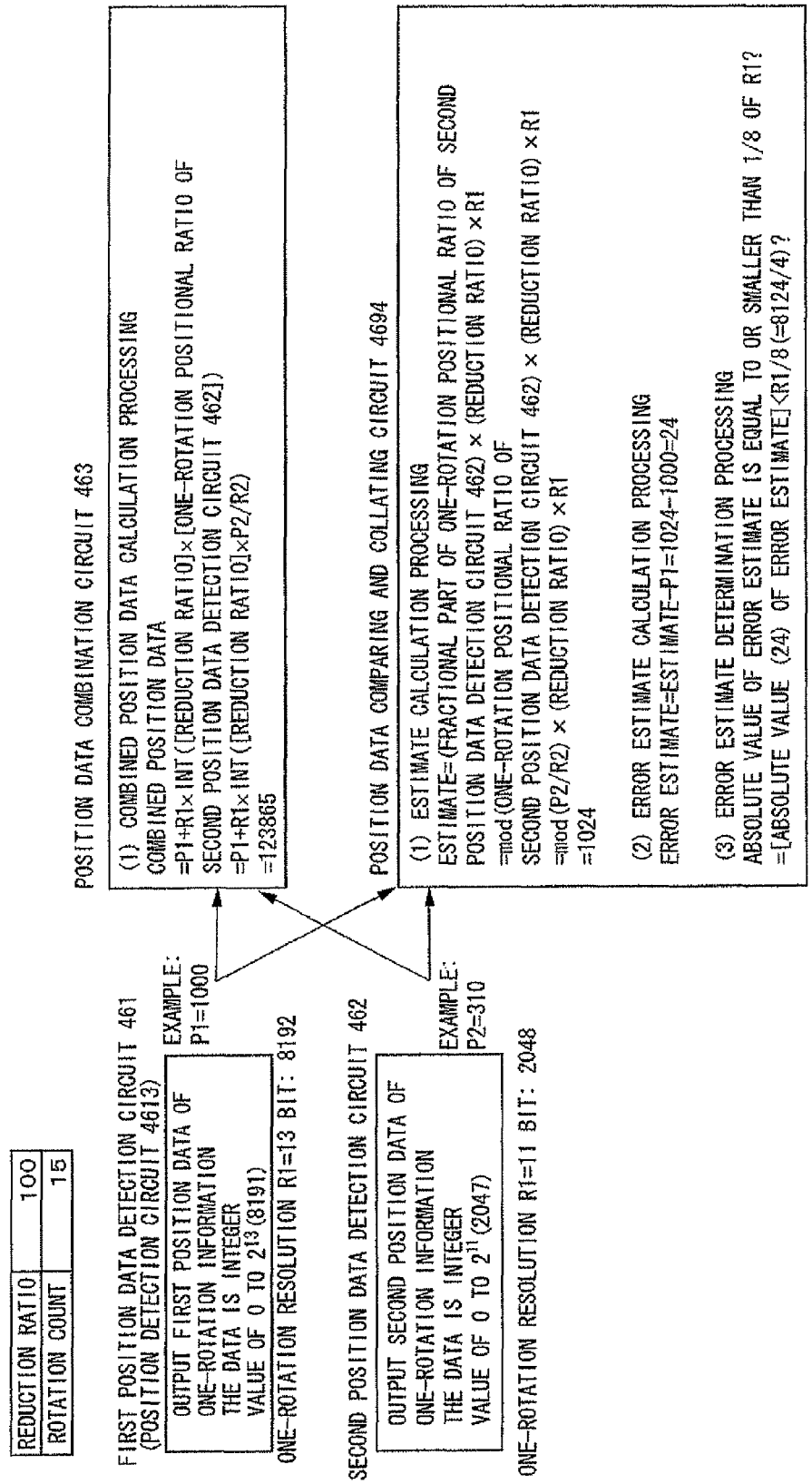
FIG. 26 is a diagram illustrating the operation of an exemplary position data combination circuit and an exemplary position data comparing and collating circuit.

Next, processing executed by the position data combination circuit 463 and the position data comparing and collating circuit 4694 will be described in detail using FIG. 26. In this description, it is assumed that the resolution of the first position data detection circuit 461 is 13 bit, and the resolution of the second position data detection circuit 450 (the second position detection circuit 452) is 11 bit. That is, the first position data detection circuit 461 output the first position data which is an integer value within the range of 0 to 8191 ($=2^{13}-1$). Moreover, the second position data detection circuit 450 outputs the second position data which is an integer value within the range of 0 to 2047 ($=2^{11}-1$). Moreover, it is assumed that the transmission ratio of the power transmission device 2 is 100, and the transmission ratio information having a value of 100 is stored in advance in the transmission ratio information storage section 466.

Here, a case in which the first position data detection circuit 461 outputs 1000 as the value of the first position data will be described as an example. Moreover, a case in which the second position data detection circuit 450 outputs 310 as the value of the second position data and the second position data correction circuit 462 also outputs 310 as the value of the second position data will be described. Moreover, it is assumed that the rotation count of the input shaft 10 is 15.

First, the position data combination circuit 463 will be described. The position data combination circuit 463 calculates the combined position data using Equation 12 described above. In this case, since the value of the first position data P1 is 1000, the value of the second position data P2 is 310, the value of the transmission ratio n is 100, the value of the resolution R1 of the first position data detection circuit 461 is 8192, and the value of the resolution R2 of the second position data detection circuit 450 is 2048, the position data combination circuit 463 calculates 123865 as the value of the combined position data using Equation 12.

Next, the position data comparing and collating circuit 4694 will be described. First, the position data comparing and collating circuit 4694 calculates the estimate using Equation 13 below.

$$\text{Estimate} = \text{mod}(P2/R2) \times n \times R1 \qquad \text{(Equation 13)}$$

Here, R1 is the resolution of the first position data detection circuit 461. Moreover, mod is an operator that truncates the integer part and extracts only the fractional part. In Equation 13, the same symbols as used in Equation 12 represent the same physical quantities as those of Equation 12.

The position data comparing and collating circuit 4694 calculates a value obtained by multiplying the value of the fractional part of the positional ratio (P2/R2) within one rotation of the second position data detection circuit 450 with the transmission ratio (n) and the resolution R1 of the first position data detection circuit 461 as the estimate using Equation 13.

In this case, since the value of the second position data P2 is 310, the value of the resolution R2 of the second position data detection circuit 450 is 2048, the value of the transmission ratio n is 100, and the value of the resolution R1 of the first position data detection circuit 461 is 8192, the position data comparing and collating circuit 4694 calculates 1024 as the value of the estimate using Equation 13.

Subsequently, the position data comparing and collating circuit 4694 calculates an error estimate using Equation 14 below.

$$\text{Error Estimate} = \text{Estimate} - P1 \qquad \text{(Equation 14)}.$$

Here, the estimate in Equation 14 is the estimate calculated by Equation 13. The position data comparing and collating circuit 4694 calculates a difference between the calculated estimate and the first position data P1 as the error estimate using Equation 14. In this case, since the value of the estimate is 1024, and the value of the first position data P1 is 1000, the position data comparing and collating circuit 4694 calculates 24 as the value of the error estimate using Equation 14.

Subsequently, the position data comparing and collating circuit 4694 determines whether or not the absolute value of the error estimate calculated by Equation 14 is equal to or smaller than, for example, 1/8 of the resolution R1 of the first position data detection circuit 461. In this case, since the value of the calculated error estimate is 24, the value of the resolution R1 of the first position data detection circuit 461 is 8192, and the absolute value of the calculated error estimate is equal to or smaller than 1/8 of the resolution R1 of the first position data detection circuit 461, the position data comparing and collating circuit 4694 outputs normal as the determination result. If the absolute value of the calculated error estimate is not equal to or smaller than 1/8 of the resolution R1 of the first position data detection circuit 461, the position data comparing and collating circuit 4694 outputs abnormal as the determination result. Moreover, when the determination result indicates abnormalities, the position data comparing and collating circuit 4694 output a signal to the controller 8, representing that the first position data detected by the first position data detection circuit 461 is not identical to the second position data detected by the second position data detection circuit 450 (or the second position data corrected by the second position data correction circuit 462).

<Details of Second Position Data Correction Circuit 462>

Next, the configuration of the second position data correction circuit 462 will be described in further detail using FIGS. 9 and 10. For example, there is a possibility that a shift occurs between the first position data representing the rotational position of the input shaft 10 and the second position data representing the rotational position of the output shaft 11. This shift results, for example, from the engagement between the input shaft 10 and the power transmission device 2 and the engagement between the power transmission device 2 and the output shaft 11 and occurs physically.

Therefore, as shown in FIG. 9, there is a possibility that a shift occurs between the time when the rotation count (m) calculated based on the second position data changes and the time when the first position data (P1) representing the rotational position of the input shaft 10 changes. When there is such a shift, the position data combination circuit 463 is unable to generate the combined position data properly. Therefore, the second position data correction circuit 462 calculates a correction value Δm and corrects the rotation count (m) by adding the calculated correction value Δm to the rotation count as shown in FIG. 10 so that the position data combination circuit 463 can generate the combined position data properly even when there is such a shift.

Next, a rotation count correction method by the second position data correction circuit 462 will be described using FIGS. 9 and 10. In this example, a case in which the value of the first position data is 17 bit will be described.

As shown in FIG. 9, the output shaft 11 rotates with the rotation of the input shaft 10, and the rotation count m is calculated based on the value P2 of the second position data. Moreover, the value P1 of the first position data repeats the values from 0 to 131071 ($=2^{17}-1$). That is, when the value P1 of the first position data repeats the values from 0 to 131071 ($=2^{17}-1$), the rotation count m changes in the order of 10, 11, 12. There is a shift between the position of change (for example, the time when the value P1 of the first position data becomes 0) in the input shaft rotation count detected based on the value P1 of the first position data and the time when the rotation count m changes.

As shown in FIG. 10, for example, when the value P1 of the first position data is within the range of 0 to 32767 ($=2^{17} \times 1/4-1$), and the calculated rotation count m is in the posterior half region, the second position data correction circuit 462 corrects the value of the rotation count m by adding a correction value Δm ($=1$) to the value of the rotation count m. Here, the calculated rotation count m being in the posterior half region means that the value of the calculated rotation count m is actually m but is close to m+1.

Moreover, as shown in FIG. 10, for example, when the value P1 of the first position data is within the range of 98304 ($=2^{17} \times 3/4-1$) to 131071 ($=2^{17}-1$), and the calculated rotation count m is in the anterior half region, the second position data correction circuit 462 corrects the value of the rotation count m by adding a correction value Δm ($=-1$) to the value of the rotation count m. Here, the calculated rotation count m being in the anterior half region means that the value of the calculated rotation count in is actually m but is close to m−1.

The determination as to whether the calculated rotation count m is in the posterior half region or the anterior half region is made based on the value of the estimate. For example, when the value of the estimate calculated by the second position detection circuit 452 is smaller than 0.5 (half cycle), the second position data correction circuit 462 determines that the rotation count m is in the anterior half region. When the value of the estimate is equal to or larger than 0.5 (half cycle), the rotation count m is determined to be in the posterior half region.

In FIG. 10, it was determined whether the rotational position of the input shaft 10 detected based on the value of the rotation count detected by the first encoder 3 in the anterior 1/4 region (0 to 32767) of the rotation in one rotation of the input shaft 10 or the posterior 1/4 region (98304 to 131071). However, in order to detect the shift, it may be determined whether the rotational position of the input shaft 10 detected based on the value of the rotation count detected by the first encoder 3 is in the anterior half region of the rotation in one rotation of the input shaft 10 or the posterior half region.

Therefore, the second position data correction circuit 462 may determine whether the rotational position of the input shaft 10 estimated based on the value of the estimate calculated by the second position detection circuit 452 is in the anterior half region of the rotation in one rotation of the input shaft 10 or the posterior half region and determine whether the rotational position of the input shaft 10 detected based on the value of the rotation count detected by the first encoder 3 is in the anterior half region of the rotation in one rotation of the input shaft 10 or the posterior half region. Moreover, when the two determination results are different, the second position data correction circuit 462 may correct the value of the rotation count calculated by the second position detection circuit 452.

Specifically, when the rotational position of the input shaft 10 estimated based on the value of the estimate calculated by the second position detection circuit 452 is in the posterior half region of the rotation in one rotation of the input shaft 10, and the rotational position of the input shaft 10 detected based on the value of the first position data detected by the first position data detection circuit 461 is in the anterior half region of the rotation in one rotation of the input shaft 10, the second position data correction circuit 462 corrects the value of the rotation count calculated by the second position detection circuit 452 by adding 1 to the value of the rotation count.

On the other hand, when the rotational position of the input shaft 10 estimated based on the value of the estimate calculated by the second position detection circuit 452 is in the anterior half region of the rotation in one rotation of the input shaft 10, and the rotational position of the input shaft 10 detected based on the value of the first position data detected by the first position data detection circuit 461 is in the posterior half region of the rotation in one rotation of the input shaft 10, the second position data correction circuit 462 corrects the value of the rotation count calculated by the second position detection circuit 452 by adding −1 to the value of the rotation count, namely by subtracting 1 from the value of the rotation count.

Then, the second position data correction circuit 462 determines whether the rotational position of the input shaft 10 corresponding to the rotation count is in the anterior half region of the rotation in one rotation of the input shaft 10 or the posterior half region based on the transmission signal input from the transmission signal generation and output section 453 of the second position data detection circuit 450 and corrects the value of the rotation count.

For example, as shown in FIG. 11, the multiple-rotation A and B signals change in the signal pattern of H and L; H and H; L and H; and L and L whenever the input shaft makes one rotation. Therefore, when the multiple-rotation A and B signals are H and L, or H and H, respectively, the second position data correction circuit 462 determines that the rotational position is in the anterior half region of the rotation in one rotation of the input shaft. On the other hand, when the multiple-rotation A and B signals are L and H, or L and L, respectively, the second position data correction circuit 462 determines that the rotational position is in the posterior half region of the rotation in one rotation of the input shaft.

More specifically, when the multiple-rotation A and B signals are H and L, respectively, the second position data correction circuit 462 determines that the rotational position is in the starting 1/4 region of the rotation in one rotation of the input shaft. Moreover, when the multiple-rotation A and B signals are L and L, respectively, the second position data correction circuit 462 determines that the rotational position is in the ending 1/4 region of the rotation in one rotation of the input shaft.

Moreover, the second position data correction circuit 462 detects that the input shaft has made one rotation by detecting that the input multiple-rotation A and B signals have changed sequentially in the signal pattern of H and L; H and H; L and H; and L and L. On the other hand, the second position data correction circuit 462 detects that the input shaft has made one rotation in a reverse direction, namely −1 rotation, by detecting that the input multiple-rotation A and B signals have changed sequentially in the signal pattern of L and L; L and H; H and H; and H and L.

In the conventional encoder system, the input shaft rotates under the control of the controller which is a high-order control device, and the output shaft is rotated with the rotation of the input shaft by the power transmission device. However, due to a failure in the input shaft, a failure in the output shaft, a failure in the power transmission device, and the like, the input shaft may not rotate properly under the control of the controller, and the output shaft may not rotate properly even when the input shaft rotates properly under the control of the controller. Such an abnormal rotation operation of the encoder system may cause secondary problems caused by the abnormal operation of the encoder system. Therefore, in the encoder system, it is necessary to detect such an abnormal operation.

According to the present embodiment, it is possible to provide an encoder system and a signal processing method capable of detecting whether or not the input shaft and the output shaft are rotating properly under the control of the controller.

In the present embodiment, the encoder system having the power transmission device that rotates the output shaft at a predetermined transmission ratio in response to the rotation of the input shaft is configured to: detect the first position data representing the angular position of the input shaft and the second position data representing the angular position of the output shaft and combine the first position data and the second position data. Therefore, it is possible to provide an encoder system which is a multiple-rotation absolute encoder, which does not require an external battery for storing absolute position information.

In the present embodiment, the failure detection section of the encoder system compares the input shaft angular position which is the angular position of the input shaft calculated based on the rotation control signal from the controller and the first position data detected by the first position data detection circuit. Moreover, in the present embodiment, the failure detection section compares the output shaft angular position which is the angular position of the output shaft calculated based on the rotation control signal and the second position data detected by the second position data detection circuit. Moreover, a failure is detected based on a combination of the comparison results. Therefore, it is possible to detect whether or not the input shaft and the output shaft are rotating properly under the control of the controller.

<Configuration for Improving Reliability and Stability>

Next, a configuration of an embodiment that improves the reliability and stability will be described using the block diagram shown in FIG. 15. In the embodiment described above, the signal transmitted from the second signal processing circuit 5 is input to the first signal processing circuit 6 and is subjected to signal processing by a substrate circuit in the first signal processing circuit 6. After that, the processed signal is transmitted from the first signal processing circuit 6 to the controller 8 which is a high-order device through the communication line 9 which is a single cable.

If there is a failure in a component on the substrate of the first signal processing circuit 6, there is a fault in the connector connecting the substrate and the cable, or the cable connecting the first signal processing circuit 6 and the controller 8 is broken, it is unable to transmit the signal from the second signal processing circuit 5 to the controller 8. Thus, there is a possibility that the reliability and standby state of the overall circuit of the encoder system is impaired.

Therefore, the configuration shown in FIG. 15 eliminates such a problem and improves the reliability and stability. That is, the first signal processing circuit 6 has a configuration in which the signal from the first encoder 3 and the signal from the second encoder 4 are not processed on the same substrate but are transmitted to the controller 8 through separated substrates, separate connectors, and separate cables.

For example, a first detection signal processing circuit 6A (first processing circuit) that has at least the first position data detection circuit 461 has a first external communication circuit that outputs the first position data detected by the first position data detection circuit 461 to the controller 8 which is a high-order device through a communication line 9A which is a first communication line. Moreover, a second detection signal processing circuit 6B (second processing circuit) that has at least the second position data correction circuit 462 has a second external communication circuit that outputs the second position data detected by the second position data correction circuit 462 to the controller 8 which is a high-order device through a communication line 9B which is a second communication line. Moreover, the first detection signal processing circuit 6A and the second detection signal processing circuit 6B are formed on different substrates.

Therefore, the detection signal detected by the first encoder 3 and the detection signal detected by the second encoder 4 are processed by totally different systems and are independent. Even when a failure occurs in one of the two detection and processing sections and it is unable to transmit one of the two detection signals, the failure will not have any influence on the transmission of the detection signal from the other detection section. In this way, the controller 8 can detect the failure in one of the two detection sections by comparing the two detection signals. Therefore, it is possible to improve the reliability and stability of the encoder system.

Due to space reasons, as shown by a dotted frame in the drawing, only a substrate member of the first signal processing circuit 6 may be shared so that the first detection signal processing circuit 6A and the second detection signal processing circuit 6B are completely separated in the shared substrate.

In order to improve the reliability and stability of the encoder system as described above, the following configuration may be used. That is, the first signal processing circuit 6 that has at least the first position data detection circuit 461 has a third external communication circuit (the external communication circuit 465) that outputs the first position data detected by the first position data detection circuit 461 to the controller 8 which is a high-order device.

Moreover, the second signal processing circuit 5 that has at least the second position data detection circuit 450 has a fourth external communication circuit that outputs the second position data detected by the second signal processing circuit 450 to the controller 8 which is a high-order device. Moreover, the first external communication circuit and the second external communication circuit are formed on different substrates.

The first encoder 3 and the second encoder 4 may be a magnetic encoder or may be an optical encoder.

In the encoder system described above, although the first signal processing circuit 6 has been described to have the failure detection section 469, the present invention is not limited to this.

For example, the controller 8 may have the failure detection section 469. In this case, for example, the first position data detection circuit 461 of the first signal processing circuit 6 may transmit the detected first position data to the controller 8 through the communication line 9 using the external communication circuit 465. Moreover, the second position data correction circuit 462 of the first signal processing circuit 6 may transmit the second position data to the controller 8 through the communication line 9 using the external communication circuit 465.

Then, the failure detection section 469 of the controller 8 may calculate the input shaft angular position and the output shaft angular position, compare the calculated input shaft angular position with the received first position data, compare the calculated output shaft angular position with the received second position data, and detect a failure based on a combination of the comparison results. That is, the controller 8 may include the input shaft angular position calculation section 4691, the output shaft angular position calculation section 4692, and the comparing section 4693 described using FIG. 25.

Moreover, the controller 8 may calculate the input shaft angular position and the output shaft angular position and transmit the calculated input shaft angular position and output shaft angular position to the failure detection section 469 of the first signal processing circuit 6 through the communication line 9 using the external communication circuit 465. Then, the failure detection section 469 of the first signal processing circuit 6 may compare the received input shaft angular position with the first position data, compare the received output shaft angular position with the second position data, and detect a failure based on a combination of the comparison results. That is, the controller 8 may include the input shaft angular position calculation section 4691 and the output shaft angular position calculation section 4692 described using FIG. 25, and the failure detection section 469 of the first signal processing circuit 6 may have the comparing section 4693.

In the description above, although the second position data detection circuit 450 and the second position data correction circuit 462 have been described to be different configurations, the second position data detection circuit 450 and the second position data correction circuit 462 may be integrated as the second position data detection circuit 450.

The same kinds of information are stored in the transmission ratio information storage sections 456 and 466, the first resolution storage sections 457 and 467, and the second resolution storage sections 458 and 468, respectively. Therefore, the transmission ratio information storage sections 456 and 466, the first resolution storage sections 457 and 467, and the second resolution storage sections 458 and 468 may be configured as an integrated section, respectively, and the respective integrated storage sections may be provided in any one of the first and second signal processing circuits 6 and 5 or the encoder system. Moreover, the first and second signal processing circuits 6 and 5 may read out information from these respective integrated storage sections, respectively.

It is assumed that these storage sections are configured by a nonvolatile memory such as a hard disk device, an optomagnetic disk device, or a flash memory, a volatile memory such as a read-only storage medium (for example, CD-ROM), or RAM (Random Access Memory), or a combination thereof.

The respective constituent circuits of the first signal processing circuit 6 and the second signal processing circuit 5 shown in FIG. 25 may be realized by special-purpose hardware and may be realized by memories and microprocessors.

Moreover, the respective constituent circuits of the first signal processing circuit 6 and the second signal processing circuit 5 may be realized by special-purpose hardware. Furthermore, the respective constituent circuits of the first signal processing circuit 6 and the second signal processing circuit 5 may be configured by memories and CPUs (Central Processing Unit), and programs for realizing the functions of the respective constituent circuits of the first signal processing circuit 6 and the second signal processing circuit 5 may be loaded into the memories and executed, whereby the functions are realized.

Next, a still further embodiment will be described. The same constituent elements as the above-described embodiment will be denoted by the same reference numerals, and description thereof will be omitted or simplified.

In the present embodiment, as shown in FIG. 5, an encoder system includes a motor 1, a power transmission device 2, a first encoder (first absolute position encoder) 3, a second encoder (second absolute position encoder) 4, an input shaft (first shaft) 10, and an output shaft (second shaft) 11. Moreover, the encoder system includes a controller 8 which is a high-order device, a communication line 9 which is a communication line between the controller 8 and the first encoder 3, and a motor control line 14 for connecting the controller 8 and the motor 1. Furthermore, the first encoder 3 and the second encoder 4 are connected by a communication line 12 and a setting control line 13.

Here, for example, it is assumed that the first encoder 3 outputs N signals for one rotation, the second encoder 4 outputs M signals for one rotation, and the power transmission device 2 connects the input shaft 10 and the output shaft 11 at a ratio of 1:N. In this case, since the second encoder 4 rotates by one digit whenever the first encoder 3 makes one rotation, it is possible to detect the rotation count of the input shaft 10 and to detect the angular position of the input shaft 10. Therefore, this encoder system is capable of detecting N×M rotational positions, namely the absolute position in the rotation of the input shaft 10 until the output shaft 11 makes M rotations.

That is, this encoder system functions as a multiple-rotation absolute encoder as the whole encoder system using the first encoder 3 which is a single-rotation absolute encoder and the second encoder 4 which is a single-rotation absolute encoder.

In the present embodiment, the encoder system includes a first signal processing circuit 6 and a second signal processing circuit 5 (second position data detection circuit 550 described later). For example, the first encoder 3 has the first signal processing circuit 6 therein. Moreover, the second encoder 4 has the second signal processing circuit 5 therein.

The second signal processing circuit 5 receives the second detection signal detected by the second encoder 4. Moreover, the second signal processing circuit 5 detects second position data representing the angular position of the output shaft 11 through predetermined signal processing (second signal processing) based on the second detection signal input from the second encoder 4. That is, the second signal processing circuit 5 interpolates the second detection signal to detect the second position data.

Moreover, the second signal processing circuit 5 outputs the detected second position data to the first encoder 3 through the communication line 12. When detecting the second position data, the second signal processing circuit 5 detects the second position data at a predetermined resolution that is, for example, at least twice of the transmission ratio of the power transmission device 2. Here, the reason why the resolution is made at least twice of the transmission ratio is to enable determining whether the rotation represented by the second position data is in the anterior half region of the rotation or the posterior half region as will be described later.

Moreover, the first encoder 3 has the first signal processing circuit 6 therein. The first signal processing circuit 6 receives the second position data detected by the second encoder 4 through the communication line 12. Moreover, the first signal processing circuit 6 interpolates the first detection signal detected by the first encoder 3 to detect first position data representing the angular position of the input shaft 10.

Moreover, the first signal processing circuit 6 detects combined position data representing the rotation count of the input shaft 10 and the angular position within one rotation of the input shaft 10 based on the detected first position data and the input second position data. Then, the first signal processing circuit 6 outputs the detected combined position data to the controller 8 through the communication line 9.

In this way, the controller 8 is able to detect the rotation count of the input shaft and the angular position within one rotation of the input shaft 10 based on the combined position data from the encoder system serving as the multiple-rotation absolute encoder. Moreover, the controller 8 controls the rotation of the motor 1 through the motor control line 14 based on the input combined position data.

The first signal processing circuit 6 and the second signal processing circuit 5 are connected by a setting control line 13. The first signal processing circuit 6 changes the setting values stored in a storage section, described later, included in the second signal processing circuit 5 through the setting control line 13.

Figure 27:
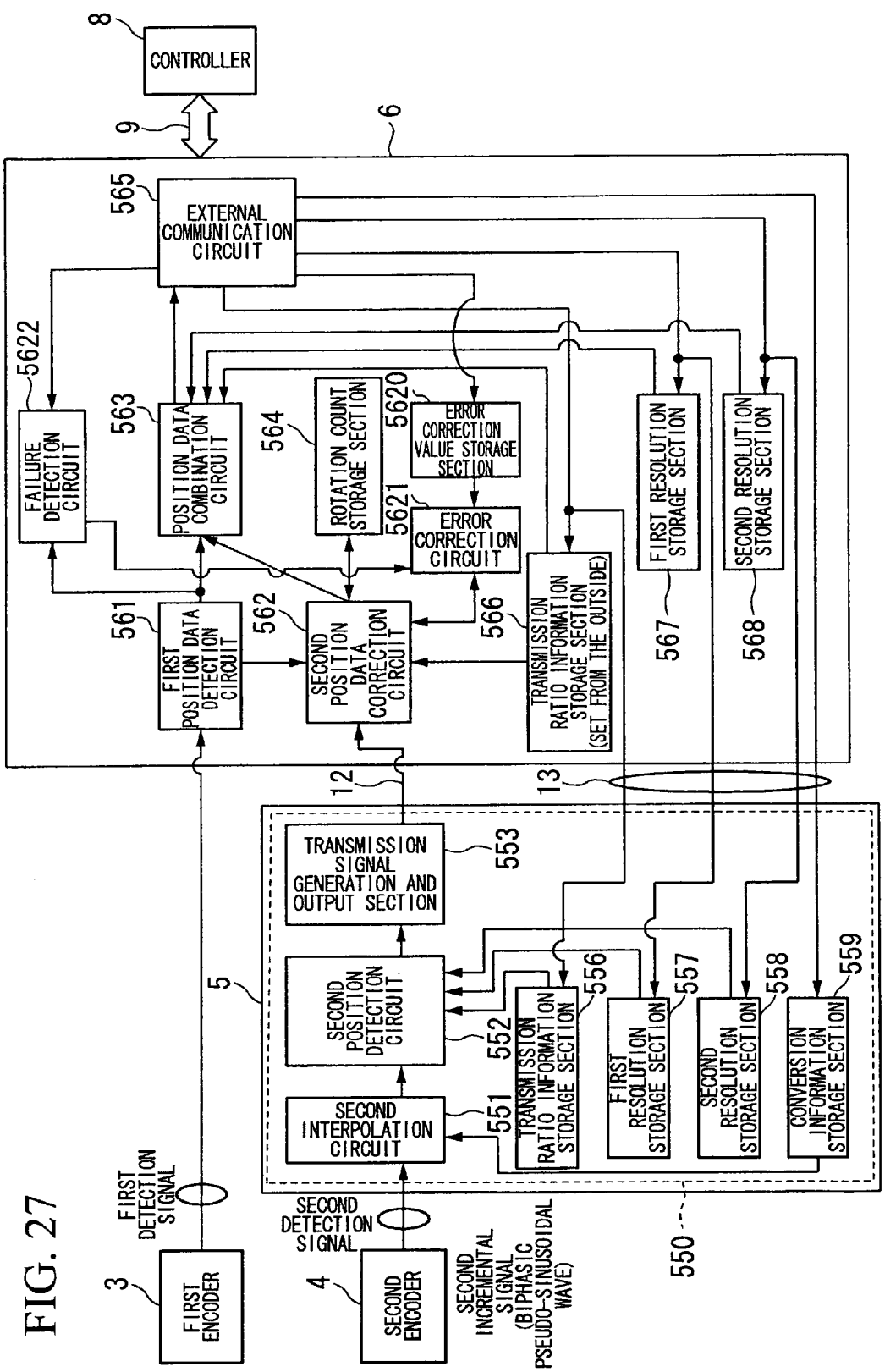
FIG. 27 is a block diagram showing a configuration of a signal processing circuit in an encoder system according to another embodiment.

Next, the configuration of the encoder system described using FIG. 5, particularly the configuration of the first and second signal processing circuits 6 and 5 will be described using FIG. 27. In FIG. 27, the same constituent elements as those in FIG. 5 will be denoted by the same reference numerals, and description thereof will be omitted.

<Configuration of First and Second Signal Processing Circuits 6 and 5>

The second signal processing circuit 5 includes a second position data detection circuit 550. The second position data detection circuit 550 includes a second interpolation circuit 551, a second position detection circuit 552, a transmission signal generation and output section 553, a transmission ratio information storage section 556, a first resolution storage section 557, and a second resolution storage section 558. On the other hand, the first signal processing circuit 6 includes a first position data detection circuit 561, a second position data correction circuit 562, a position data combination circuit 563, a rotation count storage section 564, an external communication circuit 565, a transmission ratio information storage section 566, a first resolution storage section 567, a second resolution storage section 568, a rotation direction detection section 5610, a power supply monitoring circuit 5611, a rotation direction information storage section 5612, and a rotation direction information setting section 5613.

<Respective Configurations of Second Signal Processing Circuit 5>

First, the respective configurations of the second position data detection circuit 550 of the second signal processing circuit 5 will be described. In the transmission ratio information storage section 556, information representing the value of a predetermined transmission ratio (for example, a gear ratio) of the power transmission device 2 connecting the first encoder 3 and the second encoder 4 is stored in advance as transmission ratio information. In the first resolution storage section 557, the resolution of the first position data detection circuit 561 is stored in advance as a first resolution. In the second resolution storage section 558, the resolution of the second position data detection circuit 550 is stored in advance as a second resolution.

The second interpolation circuit 551 interpolates the second detection signal input from the second encoder 4 to detect the second position data. The second position detection circuit 552 calculates a value of the integer part of a value obtained by dividing a value which is obtained by multiplying the second position data detected by the second interpolation circuit 551 and the transmission ratio information read out from the transmission ratio information storage section 556 by the value of the second resolution read out from the second resolution storage section 558 as the rotation count and calculates a value obtained by multiplying a value of the fractional part of the divided value and the value of the first resolution read out from the first resolution storage section 557 as the estimate. This estimate is the estimated position data of the accurate first position data detected by the first encoder 3, calculated based on the second detection signal detected by the second encoder 4.

For example, the second position detection circuit 552 calculates the rotation count m and the estimate s using Equations 15 and 16 below.

$$m = \text{INT}(n(P2/R2)) \quad \text{(Equation 15)}$$

$$s = R1 \times (n(P2/R2) - m) \quad \text{(Equation 16)}$$

In Equations 15 and 16, P2 is the second position data detected by the second interpolation circuit 551, R1 is the first resolution stored in the first resolution storage section 557, R2 is the second resolution stored in the second resolution storage section 558, and n is the transmission ratio information read out from the transmission ratio information storage section 556. Moreover, INT is an operator that truncates the fractional part and extracts only the integer part.

In this way, the second position data detection circuit 550 calculates the rotation count of the first encoder 3 and calculates the position data corresponding to the first position data as the estimate based on the interpolated value of the second detection signal detected by the second encoder 4 and the transmission ratio information read out from the transmission ratio information storage section 556 by using the second interpolation circuit 551 and the second position detection circuit 552.

The transmission signal generation and output section 553 generates a transmission signal representing the value of the rotation count of the input shaft 10 based on the estimate calculated by the second position detection circuit 552 and outputs the transmission signal to the second position data correction circuit 562. The transmission signal generation and output section 553 generates and outputs biphasic signals which are multiple-rotation A and B signals which are first and second rectangular signals of which the phases are different by 90°, for example, as the transmission signal (see FIG. 11). The biphasic signals are preferably biphasic rectangular signals which have a rectangular waveform so as to have resistance to external noise or the like.

In FIG. 11, when the input shaft makes one rotation, namely when the first position data assumes the values from 0 to 131071, the multiple-rotation A signal and the multiple-rotation B signal change in the signal pattern of H and L; H and H; L and H, and L and L. Here, H and L are the potentials of an electrical signal and are, for example, high and low levels, respectively. Moreover, whenever the input shaft makes one rotation, the multiple-rotation A signal and the multiple-rotation B signal repeat the above-described signal pattern.

The multiple-rotation A and B signals generated by the transmission signal generation and output section 553 have the following reliability in accordance with the transmission ratio n and the resolution R2 of the second position data detection circuit 550 in one rotation of the input shaft.

The multiple-rotation A signal is H in a period where the residue of R2/4n is 0 to 2n and is L in the other periods. On the other hand, the multiple-rotation B signal is H in a period where the residue of R2/4n is n to 3n and is L in the other periods.

For example, the transmission signal generation and output section 553 generates the above-described multiple-rotation A and B signals in the following manner. The transmission signal generation and output section 553 outputs H for the multiple-rotation A signal when a value obtained by subtracting 4n from a value obtained by multiplying the resolution R2 of the second position data detection circuit 550 with the estimate calculated by the second position detection circuit 552 is within the range of 0 to 2n, and outputs L for the multiple-rotation A signal when the value is outside the range. Moreover, the transmission signal generation and output section 553 outputs H for the multiple-rotation B signal when a value obtained by subtracting 4n from a value obtained by multiplying the resolution R2 of the second position data detection circuit 550 with the estimate calculated by the second position detection circuit 552 is within the range of 1n to 3n, and outputs L for the multiple-rotation B signal when the value is outside the range.

<Respective Configurations of First Signal Processing Circuit 6>

Next, the respective configurations of the first signal processing circuit 6 will be described. In the transmission ratio information storage section 566, similarly to the transmission ratio information storage section 556, information representing the value of a predetermined transmission ratio (for example, a gear ratio) of the power transmission device 2 connecting the first encoder 3 and the second encoder 4 is stored in advance as transmission ratio information. In the first resolution storage section 567, similarly to the first resolution storage section 557, the resolution of the first position data detection circuit 561 is stored in advance as a first resolution. In the second resolution storage section 568, similarly to the second resolution storage section 558, the resolution of the second position data detection circuit 550 is stored in advance as a second resolution.

The first position data detection circuit 561 detects first position data representing the angular position of the input shaft 10 through first predetermined signal processing (interpolation) based on the first detection signal input from the first encoder 3.

The second position data correction circuit 562 corrects the second position data detected by the second position data detection circuit 550 through predetermined correction processing based on the second position data and the first position data detected by the first position data detection circuit 561.

The position data combination circuit 563 generates combined position data based on the value of the rotation count of the first encoder 3 corrected by the second position data correction circuit 562 and the value of the first position data detected by the first position data detection circuit 561. When combining the first position data detected by the first position data detection circuit 561 and the second position data detected by the second position data detection circuit 550, the position data combination circuit 563 generates the combined position data based on the transmission ratio information read out from the transmission ratio information storage section 566.

Specifically, when combining the first position data detected by the first position data detection circuit 561 and the second position data detected by the second position data detection circuit 550, the position data combination circuit 563 generates the combined position data by a predetermined calculation method based on the transmission ratio information read out from the transmission ratio information storage section 566, the first resolution read out from the first resolution storage section 567, and the second resolution read out from the second resolution storage section 568.

For example, the position data combination circuit 563 calculates the combined position data using Equation 17 below.

Combined Position Data=$P1+R1 \times \text{INT}(n \times P2/R2)$     (Equation 17)

Here, P1 is the first position data, P2 is the second position data, and n is a transmission ratio. Moreover, R1 is the resolution of the first position data detection circuit 561, and R2 is the resolution of the second position data detection circuit 550. Moreover, INT is an operator that truncates the fractional part and extracts only the integer part.

The position data combination circuit 563 calculates the integer part (INT) of a value obtained by multiplying a positional ratio (P2/R2) within one rotation of the second position data detection circuit 550 with the gear ratio (n) and calculates a value obtained by adding the value of the first position data (P1) to a value obtained by multiplying the value (R1) of the resolution of the first position data detection circuit 550 with the value of the calculated integer part as the combined position data using Equation 17.

Moreover, the position data combination circuit 563 outputs the combined position data generated by the position data combination circuit 563 to the controller 8 through the communication line 9 using the external communication circuit 565.

The external communication circuit 565 executes processing for communication with the controller 8 through the communication line 9. Moreover, the external communication circuit 565 stores the transmission ratio information received from the controller 8 through the communication line 9 in the transmission ratio information storage section 566 and stores the transmission ratio information in the transmission ratio information storage section 556 through the setting control line 13.

Furthermore, the external communication circuit 565 stores the first resolution received from the controller 8 through the communication line 9 in the first resolution storage section 567 and stores the first resolution in the first resolution storage section 557 through the setting control line 13. In addition, the external communication circuit 565 stores the second resolution received from the controller 8 through the communication line 9 in the second resolution storage section 568 and stores the second resolution in the second resolution storage section 558 through the setting control line 13.

The transmission ratio information storage sections 566 and 556 are nonvolatile memories, for example. Therefore, once the value of the transmission ratio information stored in the transmission ratio information storage section 566 is set, it will not be erased even when the encoder system is powered off. According to this configuration, it is possible to broaden the choices for the power transmission device 2 and the transmission ratio of the power transmission device 2 usable in the encoder system.

Moreover, the first resolution storage sections 557 and 567 and the second resolution storage sections 558 and 568 are also nonvolatile memories, for example, similarly to the transmission ratio information storage sections 566 and 556. Therefore, it is similarly possible to broaden the choices for the values of the resolutions of the first and second position data detection circuits 561 and 550 usable in the encoder system.

In the error correction value storage section 5620, an error correction value for correcting the combined position data is stored in advance, in which the error correction value is obtained by driving the entire power transmission device that rotates the output shaft 11 in advance in a state where the entire power transmission device is incorporated into the encoder system.

The entire power transmission device may be, for example, a module in which the encoder system is incorporated. The module is the arm or the like of an industrial robot, for example, and may be a component that constitutes a product, namely the industrial robot.

In the error correction value storage section 5620, an error angle (rotational angular position error) which is obtained by comparing a detection angle (rotation angle) based on the second position data detected by the second encoder 4 and an angle measured with reference to a detection angle (rotation angle) based on the first position data detected by the first encoder 3, and which is obtained from the entire power transmission device is stored in advance as the error correction value in a previous layer where the encoder system operated actually.

Specifically, in the error correction value storage section 5620, the error correction value detected when the entire power transmission device incorporated in the encoder system is driven in advance is stored in advance so as to be correlated with the second position data and the first position data.

The error correction circuit 5621 corrects the combined position data to be generated by the position data combination circuit 563 based on the error correction value read out from the error correction value storage section 5620. Specifically, when the input shaft 10 is rotated, the error correction circuit 5621 reads out the error correction value correlated with the first position data detected by the first position data detection circuit 561 and the second position data detected by the second position data detection circuit 550 from the error correction value storage section 5620 and corrects the combined position data to be generated by the position data combination circuit 563 based on the read error correction value.

<First Method of Obtaining Error Correction Value Stored in Error Correction Value Storage Section 5620>

Here, a method of obtaining the error correction value stored in the error correction value storage section 5620 and a method of storing the error correction value in the error correction value storage section 5620 will be described.

In general, in a power transmission device such as a gear and a belt pulley, an angular error in the rotation angle may occur due to the influence of the engagement error of the gear teeth, rotational eccentricity of the pulley, a load fluctuation, and the like.

As described above, if the power transmission device has a rotation angle error, there is a problem in that it is unable to control the motor or the like with an accurate rotation angle even when a system including the encoder system is controlled based on the angle of the output shaft 11 which is estimated through conversion from the angle of the input shaft 10.

In order to solve this problem, the detection angle of the first encoder 3 on the input shaft 10 and the detection angle of the second encoder 4 on the output shaft 11 are measured in advance while causing the output shaft 11 to make at least one rotation. Then, the detection angle of the first encoder 3 on the input shaft 10 is compared with a theoretical rotation angle (a rotation angle calculated based on a reduction ratio) of the input shaft 10 corresponding to the detection angle of the output shaft 11 detected by the second encoder 4, whereby the error angle is detected.

For example, in a calibration step before shipping the encoder system of the present embodiment, the error angle is measured using special-purpose measuring equipment. Then, the error angle measured using the special-purpose measuring equipment is input from the controller 8 to the encoder system, and the external communication circuit 565 stores the error correction value δP in the error correction value storage section 5620 so as to be correlated with the first position data detected by the first position data detection circuit 561 and the second position data detected by the second position data detection circuit 550.

The error correction value storage section 5620 is also a nonvolatile memory. Therefore, once the error correction value δP is stored in the error correction value storage section 5620, even after the encoder system is shipped, the encoder system can correct the combined position data to be generated by the position data combination circuit 563 based on the error correction value δP stored in the error correction value storage section 5620.

Moreover, in the calibration step before shipping the encoder system, by measuring the actual error angle for each encoder system, it is possible to correct the error for each encoder system.

Figure 28:
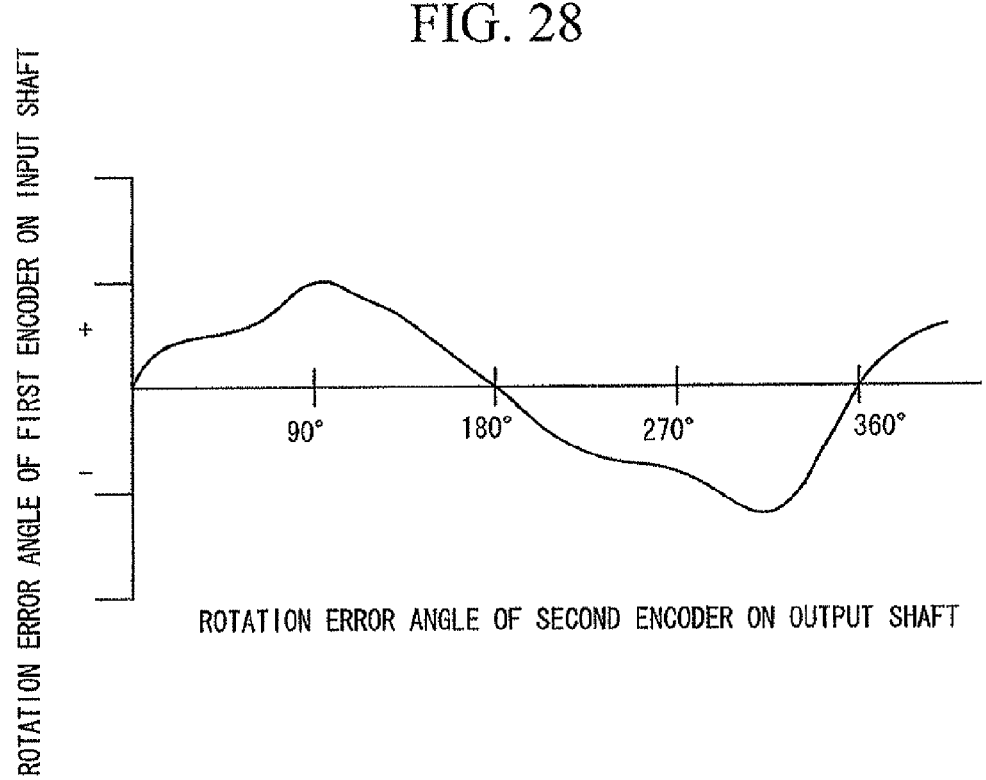
FIG. 28 is a diagram showing a rotation angle error of a first encoder 3 on the input shaft with respect to the rotation angle of a second encoder 4 on the output shaft.

FIG. 28 shows an example of the error angle of the input shaft 10 of the first encoder 3 with respect to the theoretical rotation angle of the first encoder 3 within one rotation of the second encoder 4.

That is, the error angle becomes the rotation angle error of the power transmission device. Moreover, the rotation angle error is stored in advance in the error correction value storage section 5620 as the error correction value δP. At the time of driving the encoder system actually, the error correction circuit 5621 corrects the angle based on the error correction value δP stored in the error correction value storage section 5620 and transmits the corrected angle to the controller 8 so that the combined position data can be calculated accurately.

For example, the error correction value δP is stored in advance in the error correction value storage section 5620 so as to be correlated with the value P2 of the second position data and the value P1 of the first position data. Here, it is assumed that the error correction value SP is an error correction value (δP2) for correcting the value P2 of the second position data.

When the combined position data is calculated by Equation 17, the error correction circuit 5621 reads out the error correction value (δP2) corresponding to the value P2 of the second position data and the value P1 of the first position data used in Equation 17 from the error correction value storage section 5620 and corrects the value P2 of the second position data by adding the read error correction value (δP2) to the value P2. Then, the position data combination circuit 563 calculates the combined position data based on the value P2 of the second position data corrected based on the error correction value (δP2).

That is, the position data combination circuit 563 generates the combined position data using Equation 18 below.

Combined Position Data=$P1+R1 \times \text{INT}(n \times (P2+\delta P2)/R2)$ (Equation 18)

In Equation 18, the term (P2+δP2) is a term that is corrected by the position data combination circuit 563 in Equation 17 described above.

When calculating the combined position data using Equation 18, for example, the error correction circuit 5621 reads out the error correction value (δP2) corresponding to the value P2 of the second position data and the value P1 of the first position data from the error correction value storage section 5620 and corrects the value P2 of the second position data corrected by the second position data correction circuit 562 based on the error correction value (δP2). Then, the corrected value P2 of the second position data is output from the second position data correction circuit 562 to the position data combination circuit 563, and the position data combination circuit 563 calculates the combined position data using Equation 18 described above.

This method has features in that it can detect the error angle of the power transmission device easily from the error angle which is obtained by the two encoders of the second encoder 4 and the first encoder 3 with reference to the rotation angle of the first encoder 3. Showing from the second encoder 4, the first encoder 3 of which the resolution is increased by the factor of the transmission ratio of the power transmission device is used as a reference.

As described above, in the present embodiment, the error correction value δP which is obtained by driving the entire power transmission device that rotates the output shaft 11 in advance in a state where the entire power transmission device is incorporated into the encoder system is stored in advance. Moreover, the error correction circuit 5621 corrects the combined position data corrected by the position data combination circuit 563 based on the error correction value δP read out from the error correction value storage section 5620. In this way, it is possible to generate the combined position properly even when there is a shift (for example, a shift in the multiple-rotation count) between the rotation of the input shaft 10 and the rotation of the output shaft 11.

<Second Method of Obtaining Error Correction Value Stored in Error Correction Value Storage Section 5620>

Figure 29:
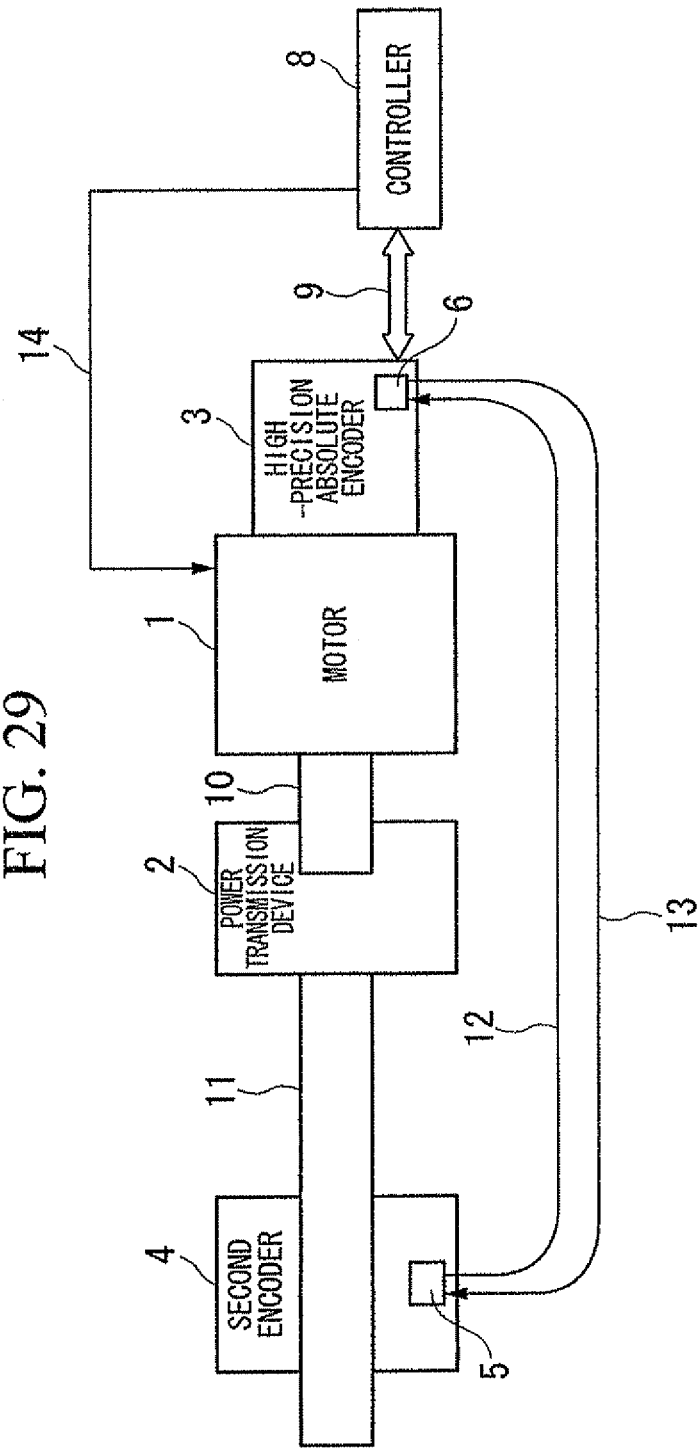
FIG. 29 is a block diagram showing a configuration of an encoder system when an error correction value is obtained by a second method.

FIG. 29 shows a second method of detecting the error angle with higher precision. In the present embodiment, a high-precision absolute encoder 31 which serves as an error detection reference is temporarily mounted instead of the first encoder 3, and in this state, the rotation angle error of the power transmission device is detected while causing the output shaft 11 to make at least one rotation similarly to the first method described above. Moreover, the detected rotation angle error is stored in the error correction value storage section 5620 similarly to the first method.

After that, the first encoder 3 serving as a product is mounted instead of the high-precision absolute encoder 31 serving as the reference, thus assembling the product. Since a method of correcting the combined position data based on the error correction value δP stored in the error correction value storage section 5620 at the time of driving the encoder system actually is the same as the first method described above, description thereof will be omitted.

As described above, in the error correction value storage section 5620, an error angle which is obtained by comparing the detection angle detected by the second encoder 4 and an angle measured with reference to the detection angle detected by the high-precision absolute encoder 31 (absolute position reference detector) instead of the first encoder 3, and which is obtained from the entire power transmission device may be stored in advance as the error correction value δP.

This method has features in that it can detect the rotation angle error easily with high precision by using the special-purpose high-precision absolute encoder 31 at the time of manufacturing the device.

In the above-described embodiment, the rotation angle error of the power transmission device when no load torque is applied to the output shaft 11 has been described. However, when the magnitude of a load torque is understood under the actual use environment, by detecting the rotation angle error of the power transmission device in a state where the load torque is applied to the output shaft 11, it is possible to detect a more accurate rotation angle error. Moreover, in the case of using the above-described planetary reduction gear, additional gears, pulleys, timing belts, and the like are used in order to further decelerate the output shaft. According to the present embodiment, it is possible to correct the motor angle considering the rotation angle error of the entire power transmission device including the pulleys and the like as well as the error of the planetary reduction gear. Moreover, in the present embodiment, for example, since the first encoder 3 is disposed on the input shaft and the second encoder 4 is disposed on the output shaft, it is possible to detect the rotation angle error (for example, the rotation angle error and the like of the output shaft) occurring due to a load fluctuation or the like with high precision and to correct the combined position data accurately.

The error correction circuit 5621 may read out the estimate estimated as the first position data to be detected by the first position data detection circuit 561 based on the second position data detected by the second position data detection circuit 550 and the error correction value δP correlated with the second position data detected by the second position data detection circuit 550 from the error correction value storage section 5620 and correct the combined position data to be generated by the position data combination circuit based on the read error correction value δP.

For example, when the first position data has an abnormal value due to a failure in the first encoder 3 or the first position data detection circuit 561, the error correction circuit 5621 may use the above-described estimate instead of the first position data as described above. The estimate is the estimate s calculated by Equation 16.

For example, the second position detection circuit 552 calculates the estimate s and transmits the calculated estimate s to the second position data correction circuit 562. As a method of transmitting the estimate s, for example, the transmission signal generation and output section 553 may transmit the estimate s to the second position data correction circuit 562 together with the rotation count m as a biphasic sinusoidal signal. Moreover, the error correction circuit 5621 reads out the error correction value δP from the error correction value storage section 5620 based on the estimate s received from the second position data correction circuit 562 and corrects the combined position data to be generated by the position data combination circuit based on the read error correction value δP.

Although the estimate s has been described to be output from the second signal processing circuit 5 to the first signal processing circuit 6 as the biphasic sinusoidal signal, the transmission method is arbitrary, and for example, the estimate may be transmitted through a different communication line from the communication line 12 and may be transmitted in an arbitrary transmission format.

In order to detect whether or not the first position data has an abnormal value, the first signal processing circuit 6 may include a failure detection circuit 5622 that detects an abnormality of the first position data, for example. It is assumed that the failure detection circuit 5622 receives the control signal for driving the motor 1 from the controller 8 using the external communication circuit 565 and is able to calculate the value that should be assumed by the first position data based on the control signal.

Moreover, the failure detection circuit 5622 compares the value of the first position data output from the first position data detection circuit 561 with the value that should be assumed by the first position data calculated based on the control signal from the controller 8, and when the two value are not identical, detects that the first position data is abnormal.

When the failure detection circuit 5622 has not detected an abnormality of the first position data, the error correction circuit 5621 reads out the error correction value δP correlated with the first position data detected by the first position data detection circuit 561 and the second position data detected by the second position data detection circuit 550 from the error correction value storage section 5620 and corrects the combined position data to be generated by the position data combination circuit based on the read error correction value δP.

On the other hand, when the failure detection circuit 5622 has detected an abnormality of the first position data, the error correction circuit 5621 reads out the estimate estimated as the first position data to be detected by the first position data detection circuit 561 based on the second position data detected by the second position data detection circuit 550 and the error correction value δP correlated with the second position data detected by the second position data detection circuit 550 from the error correction value storage section 5620 and corrects the combined position data to be generated by the position data combination circuit based on the read error correction value δP.

By doing so, the failure detection circuit 5622 can correct the combined position data to be generated by the position data combination circuit even when the first position data has an abnormal value due to a failure in the first encoder 3 or the first position data detection circuit 561, for example.

Moreover, the position data combination circuit 563 may generate the combined position data by Equation 19 below using the estimate s estimated as the first position data to be detected by the first position data detection circuit 561 based on the second position data detected by the second position data detection circuit 550 instead of the first position data (P1) detected by the first position data detection circuit 561.

Combined Position Data=$s+R1 \times \text{INT}(n \times (P2+\delta P2)/R2)$ (Equation 19)

For example, when the failure detection circuit 5622 has not detected an abnormality of the first position data, the position data combination circuit 563 generates the combined position data by Equation 17 based on the first position data detected by the first position data detection circuit 561.

On the other hand, the failure detection circuit 5622 has detected an abnormality of the first position data, the position data combination circuit 563 generates the combined position data by Equation 19 using the estimate s estimated as the first position data to be detected by the first position data detection circuit 561 based on the second position data detected by the second position data detection circuit 550 instead of the first position data (P1) detected by the first position data detection circuit 561.

By doing so, the position data combination circuit 563 can generate the combined position data even when the first position data has an abnormal value due to a failure in the first encoder 3 or the first position data detection circuit 561, for example.

Returning to the description of FIG. 27, in the rotation count storage section 564, the value of the rotation count of the input shaft 10 detected by the second encoder 4 is stored. Moreover, the second position data correction circuit 562 detects the value of the rotation count by increasing or decreasing the value of the rotation count stored in the rotation count storage section 564 by 1 in response to the reception of the transmission signal from the second signal processing circuit 5.

In the rotation count storage section 564, the value of the rotation count of the input shaft 10 detected by the second encoder 4 at the startup time of the encoder system is stored. For example, when the encoder system is started up, the transmission signal generation and output section 553 of the second signal processing circuit 5 outputs a multiple-rotation signal corresponding to the rotation count, which repeats the signal pattern of the multiple-rotation A and B signals described using FIG. 11 at a cycle of 1 KHz as an initial value setting signal. Moreover, the second position data correction circuit 562 stores a value corresponding to the initial value setting signal received from the transmission signal generation and output section 553 of the second signal processing circuit 5 in the rotation count storage section 564. As a result, the rotation count information is stored in the rotation count storage section 564.

After that, the second position data correction circuit 562 increases or decreases the value of the rotation count stored in the rotation count storage section 564 in response to the reception of the transmission signal from the second signal processing circuit 5. Moreover, the error correction circuit 5621 corrects the angular error of the power transmission device. In this way, the value of the rotation count of the input shaft 10 is detected based on the rotation of the output shaft 11.

<Details of Second Position Data Correction Circuit 562>

Next, the configuration of the second position data correction circuit 562 will be described in further detail. For example, there is a possibility that a shift occurs between the first position data representing the rotational position of the input shaft 10 and the second position data representing the rotational position of the output shaft 11. This shift results, for example, from the engagement between the input shaft 10 and the power transmission device 2 and the engagement between the power transmission device 2 and the output shaft 11 and occurs physically.

Therefore, as shown in FIG. 9, there is a possibility that a shift occurs between the time when the rotation count (m) calculated based on the second position data changes and the time when the first position data (P1) representing the rotational position of the input shaft 10 changes. When there is such a shift, the position data combination circuit 563 is unable to generate the combined position data properly. Therefore, the second position data correction circuit 562 calculates a correction value Δm and corrects the rotation count (m) by adding the calculated correction value Δm to the rotation count as shown in FIG. 10 so that the position data combination circuit 563 can generate the combined position data properly even when there is such a shift.

Next, a rotation count correction method by the second position data correction circuit 562 will be described using FIGS. 9 and 10. In this example, a case in which the value of the first position data is 17 bit will be described.

As shown in FIG. 9, the output shaft 11 rotates with the rotation of the input shaft 10, and the rotation count m is calculated based on the value P2 of the second position data. Moreover, the value P1 of the first position data repeats the values from 0 to 131071 ($=2^{17}-1$). That is, when the value P1 of the first position data repeats the values from 0 to 131071 ($=2^{17}-1$), the rotation count m changes in the order of 10, 11, 12. There is a shift between the position of change (for example, the time when the value P1 of the first position data becomes 0) in the input shaft rotation count detected based on the value P1 of the first position data and the time when the rotation count m changes.

As shown in FIG. 10, for example, when the value P1 of the first position data is within the range of 0 to 32767 ($=2^{17}\times1/4-1$), and the calculated rotation count m is in the posterior half region, the second position data correction circuit 562 corrects the value of the rotation count m by adding a correction value Δm ($=1$) to the value of the rotation count m. Here, the calculated rotation count m being in the posterior half region means that the value of the calculated rotation count m is actually m but is close to m+1.

Moreover, as shown in FIG. 10, for example, when the value P1 of the first position data is within the range of 98304 ($=2^{17}\times3/4-1$) to 131071 ($=2^{17}-1$), and the calculated rotation count m is in the anterior half region, the second position data correction circuit 562 corrects the value of the rotation count m by adding a correction value Δm ($=-1$) to the value of the rotation count m. Here, the calculated rotation count m being in the anterior half region means that the value of the calculated rotation count m is actually m but is close to m−1.

The determination as to whether the calculated rotation count m is in the posterior half region or the anterior half region is made based on the value of the estimate. For example, when the value of the estimate calculated by the second position detection circuit 552 is smaller than 0.5 (half cycle), the second position data correction circuit 562 determines that the rotation count m is in the anterior half region. When the value of the estimate is equal to or larger than 0.5 (half cycle), the rotation count m is determined to be in the posterior half region.

In FIG. 10, it was determined whether the rotational position of the input shaft 10 detected based on the value of the rotation count detected by the first encoder 3 is in the anterior 1/4 region (0 to 32767) of the rotation in one rotation of the input shaft 10 or the posterior 1/4 region (98304 to 131071). However, in order to detect the shift, it may be determined whether the rotational position of the input shaft 10 detected based on the value of the rotation count detected by the first encoder 3 is in the anterior half region of the rotation in one rotation of the input shaft 10 or the posterior half region.

Therefore, the second position data correction circuit 562 may determine whether the rotational position of the input shaft 10 estimated based on the value of the estimate calculated by the second position detection circuit 552 is in the anterior half region of the rotation in one rotation of the input shaft 10 or the posterior half region and determine whether the rotational position of the input shaft 10 detected based on the value of the rotation count detected by the first encoder 3 is in the anterior half region of the rotation in one rotation of the input shaft 10 or the posterior half region. Moreover, when the two determination results are different, the second position data correction circuit 562 may correct the value of the rotation count calculated by the second position detection circuit 552.

Specifically, when the rotational position of the input shaft 10 estimated based on the value of the estimate calculated by the second position detection circuit 552 is in the posterior half region of the rotation in one rotation of the input shaft 10, and the rotational position of the input shaft 10 detected based on the value of the first position data detected by the first position data detection circuit 561 is in the anterior half region of the rotation in one rotation of the input shaft 10, the second position data correction circuit 562 corrects the value of the rotation count calculated by the second position detection circuit 552 by adding 1 to the value of the rotation count.

On the other hand, when the rotational position of the input shaft 10 estimated based on the value of the estimate calculated by the second position detection circuit 552 is in the anterior half region of the rotation in one rotation of the input shaft 10, and the rotational position of the input shaft 10 detected based on the value of the first position data detected by the first position data detection circuit 561 is in the posterior half region of the rotation in one rotation of the input shaft 10, the second position data correction circuit 562 corrects the value of the rotation count calculated by the second position detection circuit 552 by adding −1 to the value of the rotation count, namely by subtracting 1 from the value of the rotation count.

Then, the second position data correction circuit 562 determines whether the rotational position of the input shaft 10 corresponding to the rotation count is in the anterior half region of the rotation in one rotation of the input shaft 10 or the posterior half region based on the transmission signal input from the transmission signal generation and output section 553 of the second position data detection circuit 550 and corrects the value of the rotation count.

In this example, a case in which the signal input to the second position data correction circuit 562 is a biphasic rectangular wave including the multiple-rotation A and B signals as shown in FIG. 11 will be described.

For example, as shown in FIG. 11, the multiple-rotation A and B signals change in the signal pattern of H and L; H and H; L and H; and L and L whenever the input shaft makes one rotation. Therefore, when the multiple-rotation A and B signals are H and L, or H and H, respectively, the second position data correction circuit 562 determines that the rotational position is in the anterior half region of the rotation in one rotation of the input shaft. On the other hand, when the multiple-rotation A and B signals are L and H, or L and L, respectively, the second position data correction circuit 562 determines that the rotational position is in the posterior half region of the rotation in one rotation of the input shaft.

More specifically, when the multiple-rotation A and B signals are H and L, respectively, the second position data correction circuit 562 determines that the rotational position is in the starting 1/4 region of the rotation in one rotation of the input shaft. Moreover, when the multiple-rotation A and B signals are L and L, respectively, the second position data correction circuit 562 determines that the rotational position is in the ending 1/4 region of the rotation in one rotation of the input shaft.

Moreover, the second position data correction circuit 562 detects that the input shaft has made one rotation by detecting that the input multiple-rotation A and B signals have changed sequentially in the signal pattern of H and L; H and H; L and H; and L and L. On the other hand, the second position data correction circuit 562 detects that the input shaft has made one rotation in a reverse direction, namely −1 rotation, by detecting that the input multiple-rotation A and B signals have changed sequentially in the signal pattern of L and L; L and H; H and H; and H and L.

In the description above, although the case in which the signal input to the second position data correction circuit 562 is a biphasic rectangular wave including the multiple-rotation A and B signals as shown in FIG. 11 has been described, the same signal processing in the second position data correction circuit 562 is applied to a case in which the biphasic rectangular wave is a biphasic sinusoidal signal.

For example, in the case of the biphasic sinusoidal signal, the biphasic sinusoidal signal may be converted into a biphasic rectangular wave by the internal section of the second position data correction circuit 562, and the second position data correction circuit 562 may execute the signal processing described using FIGS. 9 and 10 based on the converted biphasic rectangular wave.

Moreover, the biphasic sinusoidal signal may be the same signal as that used when outputting the estimate s from the second signal processing circuit 5 to the first signal processing circuit 6. In this case, the position data combination circuit 563 can also generate the combined position data using the value corrected by the failure detection circuit 5622 and the second position data correction circuit 562.

Moreover, in the case of the biphasic sinusoidal signal, since it is possible to output the estimate s from the second signal processing circuit 5 to the first signal processing circuit 6, even when the first position data has an abnormal value, the position data combination circuit 563 can generate the combined position data by Equation 19 described above using the estimate s instead of the first position data.

In the conventional art, there was a problem in that since the rotation angle error of a planetary reduction gear, for example, changes with the fluctuation of a load, it was not possible to correct the rotation angle accurately.

In the conventional art, in general, there is a possibility that a rotation angle error occurs between the rotation of the input shaft and the rotation of the output shaft due to a load fluctuation, for example. Therefore, in the encoder system, there was a problem in that it is unable to accurately correct the rotation angle error occurring between the rotation of the input shaft and the rotation of the output shaft.

According to the present embodiment, it is possible to provide an encoder system and a signal processing method capable of accurately correcting the rotation angle error occurring between the rotation of the input shaft and the rotation of the output shaft.

According to the present embodiment, it is possible to accurately correct the rotation angle error occurring between the rotation of the input shaft and the rotation of the output shaft.

In the embodiment described using FIG. 27, although the error correction circuit 5621 has been described to be connected to the second position data correction circuit 562, a configuration having the same function as the error correction circuit 5621 may be connected to the second position detection circuit 552 in the second signal processing circuit 5. In such a configuration, after the second position data is corrected by the second position detection circuit 552; that is, a power transmission error is corrected in the second signal processing circuit 5, the corrected second position data may be transmitted to the second position data correction circuit 562.

Figure 30:
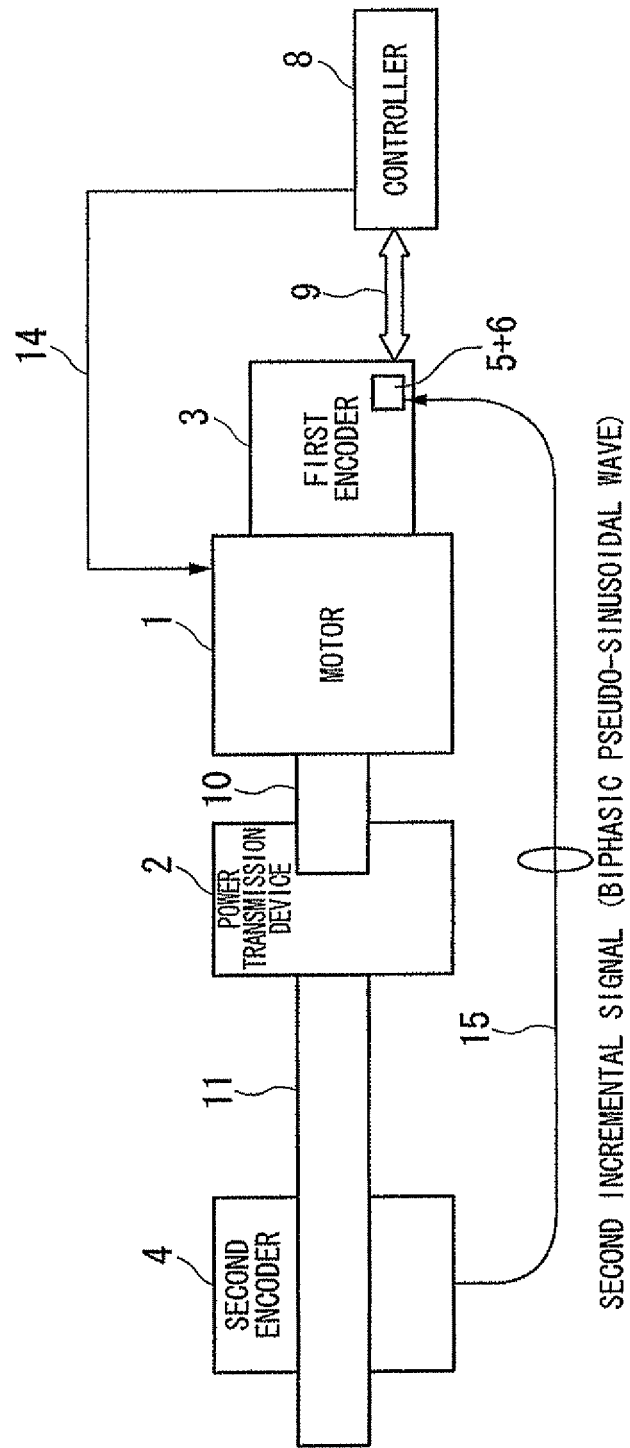
FIG. 30 is a block diagram showing an encoder system having a different configuration from that shown in FIG. 1.

As shown in FIG. 30, the first encoder 3 may include the first signal processing circuit 6 and the second signal processing circuit 5 which are integrated with each other. For example, the second detection signal detected by the second encoder 4 is input to the second interpolation circuit 551 of the first and second signal processing circuits 6 and 5 which are integrated with each other through the signal line 15 (see FIG. 31).

Figure 31:
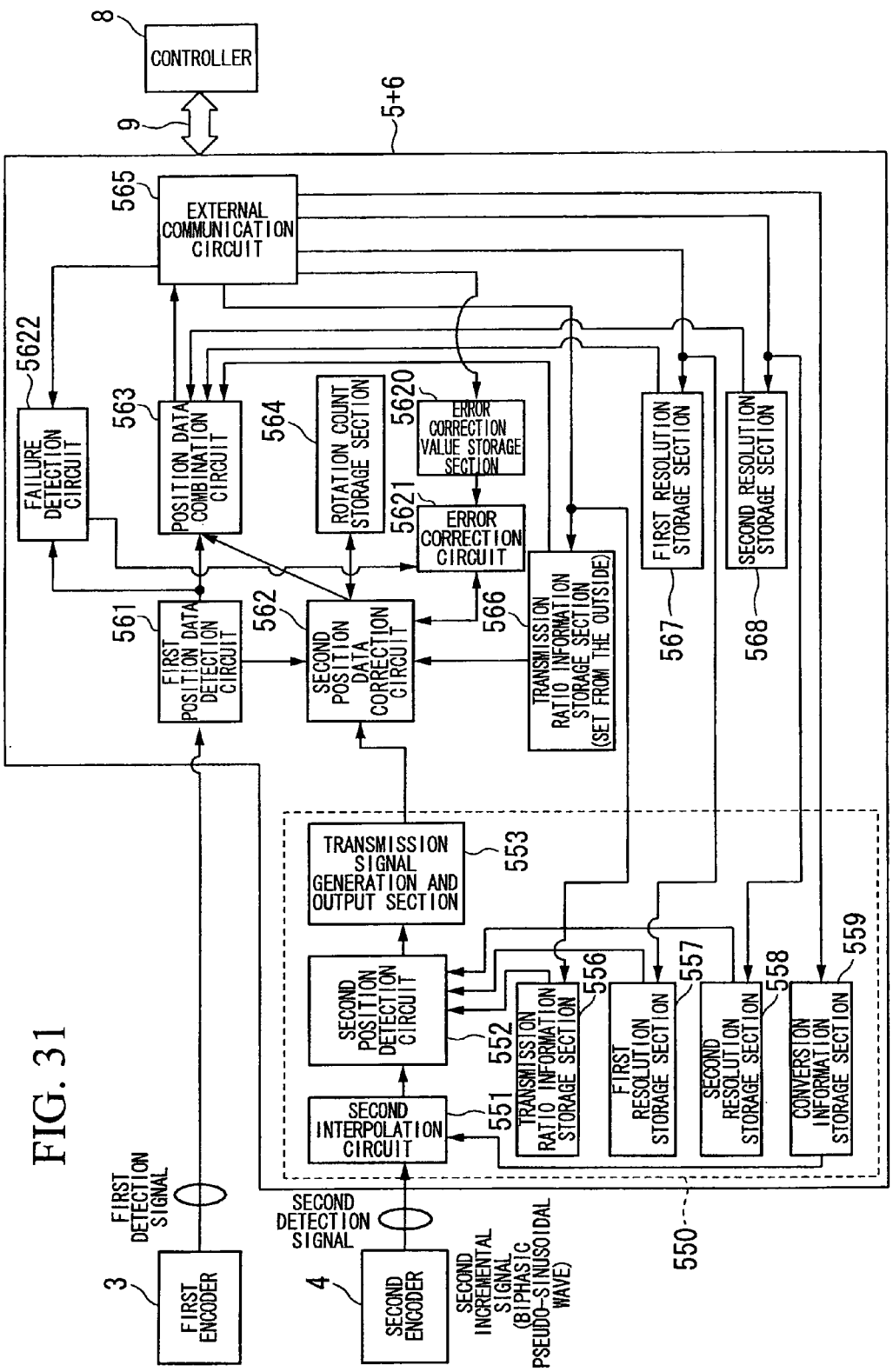
FIG. 31 is a block diagram showing a configuration of a signal processing circuit in the encoder system shown in FIG. 30.

Moreover, in this case, as shown in FIG. 31, the second position detection circuit 552 may output the calculated rotation count m and the estimate s to the second position data correction circuit 562.

In the configuration shown in FIGS. 30 and 31, the error correction circuit 5621 can also correct the combined position data to be generated by the position data combination circuit 563 based on the error correction circuit δP read out from the error correction value storage section 5620. In this way, it is possible to generate the combined position properly even when there is a shift between the rotation of the input shaft 10 and the rotation of the output shaft 11.

The first encoder 3 and the second encoder 4 may be a magnetic encoder or may be an optical encoder.

Moreover, the function of the error correction circuit 5621 may be provided to the second position data correction circuit 562 or the second position detection circuit 552. Alternatively, the error correction circuit 5621 may be integrated with the second position data correction circuit 562 or the second position detection circuit 552.

Moreover, in the description above, when the failure detection circuit 5622 has detected an abnormality in the first position data, the error correction circuit 5621 or the error correction circuit 5621 and the position data combination circuit 563 have been described to use the estimate s of the first position data to be detected by the first position data detection circuit 561 estimated based on the second position data detected by the second position data detection circuit 550, instead of using the first position data (P1) detected by the first position data detection circuit 561.

However, the present invention is not limited to this, and when the failure detection circuit 5622 has detected an abnormality in the first position data, only the position data combination circuit 563 may use the estimate s of the first position data to be detected by the first position data detection circuit 561 estimated based on the second position data detected by the second position data detection circuit 550, instead of using the first position data (P1) detected by the first position data detection circuit 561.

That is, the position data combination circuit 563 may generate the combined position data by Equation 20 below using the estimate s instead of the first position data (P1).

$$\text{Combined Position Data} = s + R1 \times \text{INT}(n \times P2/R2) \quad \text{(Equation 20)}$$

By doing so, for example, even when the error correction value SP is not stored in the error correction value storage section 5620, or the encoder system does not have the error correction circuit 5621, and the first position data has an abnormal value, the position data combination circuit 563 can generate the combined position data.

The same kinds of information are stored in the transmission ratio information storage sections 556 and 566, the first resolution storage sections 557 and 567, and the second resolution storage sections 558 and 568, respectively. Therefore, the transmission ratio information storage sections 556 and 566, the first resolution storage sections 557 and 567, and the second resolution storage sections 558 and 568 may be configured as an integrated section, respectively, and the respective integrated storage sections may be provided in any one of the first and second signal processing circuits 6 and 5 or the encoder system. Moreover, the first and second signal processing circuits 6 and 5 may read out information from these respective integrated storage sections, respectively.

Moreover, the error correction value δP stored in the error correction value storage section 5620 may include a plurality of error correction values δP such as an acceleration, torque, and the like of the motor, and the plurality of error correction values δP may be selected as necessary.

It is assumed that these storage sections and the error correction value storage section 5620 are configured by a nonvolatile memory such as a hard disk device, an optomagnetic disk device, or a flash memory, a volatile memory such as a read-only storage medium (for example, CD-ROM), or RAM (Random Access Memory), or a combination thereof.

The respective constituent circuits of the first signal processing circuit 6 and the second signal processing circuit 5 shown in FIG. 27 may be realized by special-purpose hardware and may be realized by memories and microprocessors.

Moreover, the respective constituent circuits of the first signal processing circuit 6 and the second signal processing circuit 5 may be realized by special-purpose hardware. Furthermore, the respective constituent circuits of the first signal processing circuit 6 and the second signal processing circuit 5 may be configured by memories and CPUs (Central Processing Unit), and programs for realizing the functions of the respective constituent circuits of the first signal processing circuit 6 and the second signal processing circuit 5 may be loaded into the memories and executed, whereby the functions are realized.

While the embodiments of the present invention have been described in detail with reference to the drawings, the specific configuration is not limited to the embodiments, and various changes and modifications may be made without departing from the spirit of the present invention.

What is claimed is:

1. An encoder system comprising:
   a first absolute position encoder that is a single-rotation absolute encoder and that outputs a first detection signal corresponding to an angular position of a rotating input shaft;
   a second absolute position encoder that is a single-rotation absolute encoder and that outputs a second detection signal corresponding to an angular position of an output shaft rotating at a predetermined transmission ratio in response to the rotation of the input shaft;
   a first position data detection circuit that detects first position data representing the angular position of the input shaft through first predetermined signal processing based on the first detection signal input from the first absolute position encoder;
   a second position data detection circuit that detects second position data representing the angular position of the input shaft through second predetermined signal processing based on the second detection signal input from the second absolute position encoder;
   a position data combination circuit that combines the first position data and the second position data to generate combined position data representing a multiple-rotation count of the input shaft and the angular position within one rotation of the input shaft;
   an error correction value storage section in which an error correction value for correcting the combined position data is stored in advance, the error correction value being a value which is obtained by driving an entire power transmission device that rotates the output shaft in advance in a state where the entire power transmission device is incorporated into the encoder system; and
   an error correction circuit that corrects the combined position data generated by the position data combination circuit based on the error correction value read out from the error correction value storage section,
   wherein the error correction value includes an error angle which is obtained by comparing a second detection angle based on the second position data detected by the second data detection circuit based on the second detection signal input from the second absolute position encoder and an angle measured with reference to a first detection angle based on the first position data detected by the first data detection circuit based on the first detection signal input from the first absolute position encoder.

2. The encoder system according to claim 1,
   wherein the error correction value detected by driving the entire power transmission device incorporated into the encoder system in advance is stored in advance in the error correction value storage section so as to be correlated to the second position data and the first position data, and wherein the error correction circuit corrects the combined position data to be generated by the position data combination circuit based on the error correction value read out from the error correction value storage section.

3. The encoder system according to claim 1, wherein the error correction circuit reads out the error correction value correlated to the second position data and an estimate estimated as the first position data based on the second position data from the error correction value storage section and corrects the combined position data to be generated by the position data combination circuit based on the read error correction value.

4. The encoder system according to claim 2, further comprising a failure detection circuit that detects an abnormality of the first position data, wherein the error correction circuit is configured to:

when the failure detection circuit has not detected an abnormality of the first position data, read out the error correction value correlated to the first position data and the second position data from the error correction value storage section and correct the combined position data to be generated by the position data combination circuit based on the read error correction value; and when the failure detection circuit has detected an abnormality of the first position data, read out the error correction value correlated to the second position data and an estimate estimated as the first position data based on the second position data from the error correction value storage section and correct the combined position data to be generated by the position data combination circuit based on the read error correction value.

5. The encoder system according to claim 1, wherein the position data combination circuit combines the second position data and an estimate estimated as the first position data based on the second position data to generate the combined position data representing the multiple-rotation count of the input shaft and the angular position within one rotation of the input shaft.

6. A robot provided with the encoder system of claim 1.

7. A signal processing method used in an encoder system which includes:

a first absolute position encoder that is a single-rotation absolute encoder and that outputs a first detection signal corresponding to an angular position of a rotating input shaft;

a second absolute position encoder that is a single-rotation absolute encoder and that outputs a second detection signal corresponding to an angular position of an output shaft rotating at a predetermined transmission ratio in response to the rotation of the input shaft;

a first position data detection circuit that detects first position data representing the angular position of the input shaft through first predetermined signal processing based on the first detection signal input from the first absolute position encoder; and a second position data detection circuit that detects second position data representing the angular position of the output shaft through second predetermined signal processing based on the second detection signal input from the second absolute position encoder, the method comprising:

combining, with a position data combination circuit of the encoder system, the first position data and the second position data to generate combined position data representing a multiple-rotation count of the input shaft and the angular position within one rotation of the input shaft; and correcting, with an error correction circuit of the encoder system, the combined position data to be generated by the position data combination circuit based on an error correction value read out from an error correction value storage section in which the error correction value for correcting the combined position data is stored in advance, the error correction value being a value which is obtained by driving an entire power transmission device that rotates the output shaft in advance in a state where the entire power transmission device is incorporated into the encoder system, wherein the error correction value includes an error angle which is obtained by comparing a second detection angle based on the second position data detected by the second data detection circuit based on the second detection signal input from the second absolute position encoder and an angle measured with reference to a first detection angle based on the first position data detected by the first data detection circuit based on the first detection signal input from the first absolute position encoder.

8. An encoder system comprising:

a first absolute position encoder that is a single-rotation absolute encoder and that outputs a first detection signal corresponding to an angular position of a rotating input shaft;

a second absolute position encoder that is a single-rotation absolute encoder and that outputs a second detection signal corresponding to an angular position of an output shaft rotating at a predetermined transmission ratio in response to the rotation of the input shaft;

a first position data detection circuit that detects first position data representing the angular position of the input shaft through first predetermined signal processing based on the first detection signal input from the first absolute position encoder;

a second position data detection circuit that detects second position data representing the angular position of the input shaft through second predetermined signal processing based on the second detection signal input from the second absolute position encoder;

a position data combination circuit that combines the first position data and the second position data to generate combined position data representing a multiple-rotation count of the input shaft and the angular position within one rotation of the input shaft;

an error correction value storage section in which an error correction value for correcting the combined position data is stored in advance, the error correction value being a value which is obtained by driving an entire power transmission device that rotates the output shaft in advance in a state where the entire power transmission device is incorporated into the encoder system; and an error correction circuit that corrects the combined position data generated by the position data combination circuit based on the error correction value read out from the error correction value storage section, wherein the error correction value includes an error angle which is obtained by comparing a second detection angle based on the second position data detected by the second data detection circuit based on the second detection signal input from the second absolute position encoder and an angle measured with reference to a first detection angle based on the first position data which is detected by the first data detection circuit based on the first detection signal input from a high-precision absolute position reference detector instead of the first absolute position encoder.

9. A robot provided with the encoder system of claim 8.

10. An encoder system comprising:
a first absolute position encoder that is a single-rotation absolute encoder and that outputs a first detection signal corresponding to an angular position of a rotating input shaft;
a second absolute position encoder that is a single-rotation absolute encoder and that outputs a second detection signal corresponding to an angular position of an output shaft rotating at a predetermined transmission ratio in response to the rotation of the input shaft;
a first position data detection circuit that detects first position data representing the angular position of the input shaft through first predetermined signal processing based on the first detection signal input from the first absolute position encoder;
a second position data detection circuit that detects second position data representing the angular position of the input shaft through second predetermined signal processing based on the second detection signal input from the second absolute position encoder;
a position data combination circuit that combines the first position data and the second position data to generate combined position data representing a multiple-rotation count of the input shaft and the angular position within one rotation of the input shaft;
an error correction value storage section in which an error correction value for correcting the combined position data is stored in advance, the error correction value being a value which is obtained by driving an entire power transmission device that rotates the output shaft in advance in a state where the entire power transmission device is incorporated into the encoder system; and
an error correction circuit that corrects the combined position data generated by the position data combination circuit based on the error correction value read out from the error correction value storage section,
wherein the error correction circuit reads out the error correction value correlated to the second position data and an estimate estimated as the first position data based on the second position data from the error correction value storage section and corrects the combined position data to be generated by the position data combination circuit based on the read error correction value.

11. A robot provided with the encoder system of claim 10.

12. An encoder system comprising:
a first absolute position encoder that is a single-rotation absolute encoder and that outputs a first detection signal corresponding to an angular position of a rotating input shaft;
a second absolute position encoder that is a single-rotation absolute encoder and that outputs a second detection signal corresponding to an angular position of an output shaft rotating at a predetermined transmission ratio in response to the rotation of the input shaft;
a first position data detection circuit that detects first position data representing the angular position of the input shaft through first predetermined signal processing based on the first detection signal input from the first absolute position encoder;
a second position data detection circuit that detects second position data representing the angular position of the input shaft through second predetermined signal processing based on the second detection signal input from the second absolute position encoder;
a position data combination circuit that combines the first position data and the second position data to generate combined position data representing a multiple-rotation count of the input shaft and the angular position within one rotation of the input shaft;
an error correction value storage section in which an error correction value for correcting the combined position data is stored in advance, the error correction value being a value which is obtained by driving an entire power transmission device that rotates the output shaft in advance in a state where the entire power transmission device is incorporated into the encoder system; and
an error correction circuit that corrects the combined position data generated by the position data combination circuit based on the error correction value read out from the error correction value storage section,
wherein the position data combination circuit combines the second position data and an estimate estimated as the first position data based on the second position data to generate the combined position data representing the multiple-rotation count of the input shaft and the angular position within one rotation of the input shaft.

13. A robot provided with the encoder system of claim 12.

* * * * *